United States Patent [19]
Sato et al.

[11] Patent Number: 5,943,056
[45] Date of Patent: Aug. 24, 1999

[54] INTERFERENCE CHECKING METHOD

[75] Inventors: Yuichi Sato; Mitsunori Hirata; Tsugito Maruyama, all of Kawasaki, Japan

[73] Assignee: Fujitsu Ltd., Kawasaki, Japan

[21] Appl. No.: 08/668,145

[22] Filed: Jun. 21, 1996

[30] Foreign Application Priority Data

Jul. 11, 1995 [JP] Japan .................................. 7-174627

[51] Int. Cl.$^6$ .................................................. G06T 17/00
[52] U.S. Cl. ............................................................. 345/419
[58] Field of Search .................................. 345/418–420, 345/423, 433–38

[56] References Cited

U.S. PATENT DOCUMENTS

| | | | |
|---|---|---|---|
| 4,578,757 | 3/1986 | Stark | 250/363.02 |
| 4,922,430 | 5/1990 | Wavish | 364/528.37 |
| 5,056,031 | 10/1991 | Nakano et al. | 364/528.37 |
| 5,150,452 | 9/1992 | Pollack et al. | 701/301 |
| 5,347,459 | 9/1994 | Greenspan et al. | 345/424 |
| 5,444,838 | 8/1995 | Kommrusch et al. | 345/441 |
| 5,619,629 | 4/1997 | Yutaka | 345/420 |
| 5,675,720 | 10/1997 | Sato et al. | 345/419 |

FOREIGN PATENT DOCUMENTS

| | | |
|---|---|---|
| 0 268 317 | 5/1988 | European Pat. Off. . |
| 2-224004 | 9/1990 | Japan . |
| 5-94500 | 4/1993 | Japan . |
| 6-83422 | 3/1994 | Japan . |
| 6-259506 | 9/1994 | Japan . |
| 7-100733 | 4/1995 | Japan . |
| 7-134735 | 5/1995 | Japan . |

OTHER PUBLICATIONS

Preparata, et al, "Convex Hulls of Finite Sets of Points in Two and Three Dimensions", *Communications of the ACM*, pp. 87–93, Feb. 1977.

Edelsbrunner, et al, "Simulation of Simplicity: A Technique to Cope with Degenerate Cases in Geometric Algorithms", *ACM Transactions on Graphics*, 9(1). pp. 66–104, 1990.

Miller, et al, "Efficient Parallel Convex Hull Algorithms", *IEEE Transactions on Computers*, vol. 37, No. 12, pp. 1605–1618, Dec. 1988.

D. Henrich, et al., "Fast Distance Computation for On–Line Collision Detection with Multi–Arm Robots", 1992 IEEE, pp. 2514–2519.

S. Quinlan, "Efficient Distance Computation Between Non–Convex Objects", 1994 IEEE, pp. 3324–3329.

(List continued on next page.)

*Primary Examiner*—Mark R. Powell
*Attorney, Agent, or Firm*—Staas & Halsey

[57] ABSTRACT

An interference checking method for checking the interference between two objects in the shape of non-convex polyhedrons, comprising the steps of producing a convex hull for each of the non-convex polyhedrons, and checking the interference of the convex hull of one object with the convex hull of the other object; covering each of polygons which constitute each of the non-convex polyhedrons with a plurality of leaf spheres which have a predetermined radius and which are arranged on each polygon when the distance between the convex hulls becomes not more than a preset value, and sequentially enveloping the leaf spheres with hierarchical spheres so as to produce a binary tree of hierarchical envelope spheres; obtaining a pair of nearby spheres closest by checking the interference between envelope spheres of an upper grade on the basis of the structure of the binary tree, disassembling the interfering envelope spheres into envelope spheres of a lower grade, checking the interference between the envelope spheres of the lower grade, and repeating the interference check process and the disassembly process until no interference is detected; obtaining a nearby polygon pair which corresponds to the pair of nearby spheres; and checking the interference between the nearby polygon pair.

20 Claims, 65 Drawing Sheets

CONVEX HULL

OTHER PUBLICATIONS

Gilbert et al., A Fast Procedure for Computing the Distance Between Complex Objects in Three–Dimensional Space, IEEE, Journal of Robotics and Automation, vol. 4, No. 2, 1988, pp. 193–203.

F. Thomas, et al., "Interference Detection Between Non–Convex Polyhedra Revisited With a Practical Aim", 1994 IEEE, pp. 587–594.

Liu et al., A New Solid Model Named HSM for Checking an Interference between Moving Objects, The 6th Science of Lecture of Japan Society of Robotics, Oct. 1988, pp. 105–108.

TRIANGULAR PATCH

CONVEX HULL

FIG. 7

```
Class Facet{
      int color;
      int searchflg;
};

Class Vertex{
      int color;
      Vertex *next;
      Vertex *pre;
         // VERTEX COORDINATES
      Vector3 v;
         // perturbation of v
      Vector3 dv;
};

Class Edge{
      int color;
      Apex *orig;
      Facet *left;
      Edge *sym;
      Edge *onext;
      Edge *lnext;
};

Class Convex{
      int side;
      int vcnt;
      Vertex *vertexes;
      Eedge *edge;
      Eedge *edgemin;
      Vertex *maxX;
      Vertex *minX;
      Vertex *maxY;
      Vertex *minY;
};

Class List{
      Edge *u;
      Edge *v;
      Edge *win;
      Vertex *eu;
      Vertex *ev;
      int side;
      List *next;
};
```

FIG. 9

```
MakeConvex2Dim(con){
  if(maxY!=null){maxY = con->CalcMaxY();};
  if(minY!=null){minY = con->CalcMinY();};
  if(|maxY->v(1)-minY->v(1)|< ε){            // CALCULATE min, max IN THE Y-AXIS DIRECTION
                                             //    FROM MODEL DATA "con"            ---- 1201
    MakeConvex1Dim(con);                     // PRODUCE ONE-DIMENSIONAL CONVEX HULL IF THE
    return;                                  //    DIFFERENCE BETWEEN min AND max IS SMALLER
  }                                          //    THAN THE VERY SMALL AMOUNT ε

Convex *conLeft = new Convex;              // STORED IN MEMORY
  Convex *conRight = new Convex;

con->DivideY(conLeft, conRight);           // DIVIDE con INTO conLeft AND conRight WITH THE
  MakeConvex2Dim(conLeft);                   //    CENTER VALUE AS THE CENTER
  MakeConvex2Dim(conRight);                  // REFLECTIVELY PRODUCE CONVEX HULL FROM conLeft
  Merge2Dim(conLeft, conRight);              //    AND conRight                       ---- 1202
  return;                                    // MERGE CONVEX HULLS conLeft, conRight
}
```

FIG. 12

```
Merge2Dim(conLeft, conRight){
  vlup = conLeft->maxY;
  vrup = conRight->minY;
  vldown = conLeft->maxY;
  vrdown = conRight->minY;
                                        // SET INITIAL VALUES FOR UPPER BRIDGE
                                        // SET INITIAL VALUES FOR LOWER BRIDGE    ----1301
  do{                                   // PRODUCE UPPER BRIDGE    ----1302
    RC0=vlup->next->ConvexJudgeUp2Dim(vlup,vrup);  //JUDGE WHETHER THE VERTEX vlup->next IS ABOVE OR BELOW THE LINE Line(vlup,vrup)
    RC1=vrup->pre->ConvexJudgeUp2Dim(vlup,vrup);   //JUDGE WHETHER THE VERTEX vrup->pre IS ABOVE OR BELOW THE LINE Line (vlup,vrup)
    if(RC0>0.0)vlup=vlup->next;         // IF vlup->next IS ABOVE Line(vlup,vrup), MOVE vlup IN THE "next" DIRECTION
    if(RC1>0.0)vrup=vrup->pre;          // IF vrup->pre IS ABOVE Line(vlup,vrup), MOVE vrup IN THE "pre" DIRECTION
  }while(RC0>0.0 :: RC1>0.0);           // CONTINUE UNTIL vlup->next AND vrup->pre COME BELOW THE LINE Line (vlup,vrup)

do{                                   // SIMILARLY PRODUCE LOWER BRIDGE    ----1303
    RC0=vldown->pre->ConvexJudgeUp2Dim(vldown,vrdown);
    RC1=vrdown->next->ConvexJudgeUp2Dim(vldown,vrdown);
    if(RC0<0.0)vldown=vldown->pre;
    if(RC1<0.0)vrdown=vrdown->down;
  }while(RC0<0.0 :: RC1<0.0);
}
```

IN THE CASE OF $x = x_2$

FIG. 17

```
Merge3Dim(conLeft, conRight){
//Phase 0
if(conLeft->vent <=3 && conRight->vent <=3){  // DIRECT MERGE WHEN THE NUMBER OF VERTEXES IS NOT
    MakeConvexLowNumber(conLeft, conRight);       MORE THAN 6
    return;
} if( 1 <=conLeft->vent <= 3){                  // PRODUCTION OF CONVEX HULL USING BACKUP ALGORITHM
    MakeConvexBackL(conLeft, conRight);          WHEN THE NUMBER OF VERTEXES OF conLeft IS NOT
    return;                                       MORE THAN 3
} if( 1 <=conRight->vent <= 3){                 // PRODUCTION OF CONVEX HULL USING BACKUP ALGORITHM
    MakeConvexBackR(conLeft, conRight);          WHEN THE NUMBER OF VERTEXES OF conRight IS NOT
    return;                                       MORE THAN 3
}

// Phase 1
MakeBridge3Dim(conLeft, conRight);            // PRODUCTION OF Upper Bridge
// Phase 2
Wrap(utop, vtop);                             // WRAPPING PROCESS
// Phase 3
PatchTriangles(L);                            // TRIANGULAR POLYGON PATCHING PROCESS
// Phase 4
L->ResetColor();                              // RESETTING PURPLE EDGES
edge = MaxEdge(conRight->edge);
edgemin = MinEdge(conLeft->edgemin);          // SETTING OF MAXIMUM EDGE edge AND MINIMUM EDGE edgemin
maxX = conRight->maxX;
minX = conLeft->minX;                         // SET maxX, minX
delete L;
return;
}
```

FIG. 21

```
PatchTriangles(L){
  Edge * edumy;
  List *ldumy;
  if(L->side==LEFT){
    edumy=PatchTriangle(L->win->sym, L->v->orig);
    edtop=edumy->lnext->sym;
  }else if(L->side==RIGHT){
    edumy=PatchTriangle(L->win, L->u->orig);
    edumy=edumy->lnext;                              // SET INITIAL PATCH
  }
  ldumy=L->next;
  while(ldumy->next){
    if(ldumy->side==LEFT){
      edumy=PatchTriangle(ldumy->win->sym, edumy);
    }else if(ldumy->side==RIGHT){
      edumy=PatchTriangle(edumy->sym, ldumy->win->sym);   // SET INTERMEDIATE PATCH
    }
    ldumy=ldumy->next;
  }
  if(ldumy->side==LEFT){
    PatchTriangleLast(ldumy->win->sym, edumy, edtop);
  }else if(L->side==RIGHT){
    PatchTriangleLast(edumy->sym, ldumy->win->sym, edtop);   // SET FINAL PATCH
  }
}
```

FIG.23
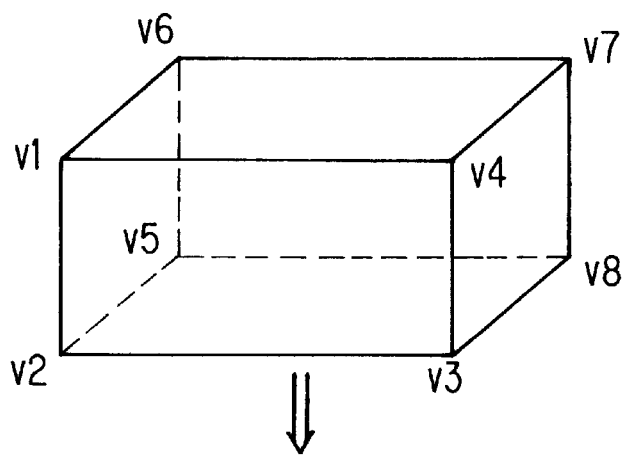
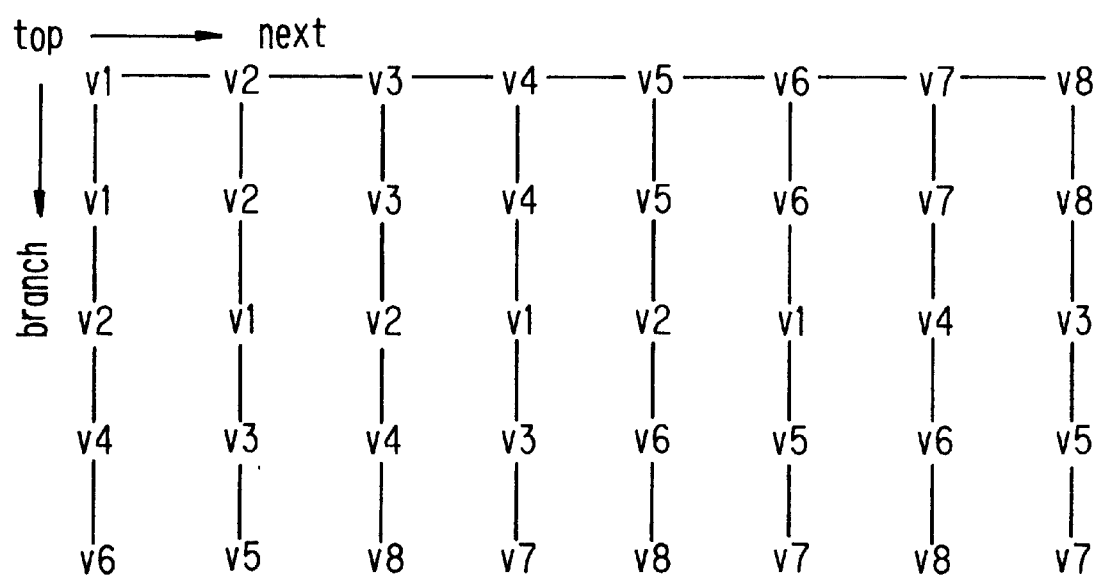

FIG.26

```
Convex    Dfund.L.0                                    //CONVEX HULL NAME
    count 10                                           //TOTAL NUMBER OF VERTEXES
    R       1.224745e+00                               //RADIUS OF ENVELOPE SPHERE
    Pc      1.00000e+00  5.000000e-01  5.000000e-01    //CENTER OF ENVELOPE SPHERE
    com     1.00000e+00  5.000000e-01  6.000000e-01    //GEOMETRICAL CENTER
    max     2.00000e+00  1.000000e+00  1.000000e+00
    min     0.00000e+00  0.000000e+00  0.000000e+00
    ┌─ Vertex                                          // -TH VERTEX
    │      pnum   0                                    //VERTEX NUMBER
    │      bcount 5                                    //NUMBER OF NEARBY POINTS
    │      vertex 0.00000e+00  1.000000e+00  1.000000e+00 //VERTEX COORDINATES
    │         Branch  0
    │         Branch  9
    │         Branch  1                                //NUMBER OF NEARBY POINT
    │         Branch  7
    │         Branch  8
    └─ EndVertex
    ┌─ Vertex
    │
    └─ EndVertex
           ⋮                                           //REPEAT // Vertex
    ┌─ Vertex
    │
    └─ EndVertex
EndConvex   Dfund.L.0                                   //FILE END
```

FIG. 31

```
class Leaf{
  Vector3 center;
  Scalar r;
  Leaf *next;
  Plane *plane;
};

class Leaves{
  Leaf *leaves;
  Vector3 max;
  Vector3 min;
  Vector3 avcenter;
  int leafcnt;
};

class Sphere{
  Vector3 center;
  Scalar r;
  Sphere *left;
  Sphere *right;
  Leaves *leaves;
};
```

FIG. 34

```
BubbleCheck(Sphere *sp, Sphere *sptop, CollisionQue *cq){
  Scalar ldist, rdist, dist;
  Leaf *lf, *lftop;
  if(cq->dist>SphereDist(sp, sptop)){                          ---- 2101
    if(sp->leaves->leafcnt>1 && sptop->leaves->leafcnt>1 ){
      if(sp->r>sptop->r){
        if(sp->left!=0 && sp->right==0){                       ---- 2102
          BubbleCheck(sp->left, sptop);
        }else if(sp->left==0 && sp->right!=0){
          BubbleCheck(sp->right, sptop);
        }else{
          ldist = SphereDist(sp->left, sptop);
          rdist = SphereDist(sp->right, sptop);
          if(ldist<rdist){                                     ---- 2103
            BubbleCheck(sp->left, sptop);
            BubbleCheck(sp->right, sptop);
          }else{
            BubbleCheck(sp->right, sptop);                     ---- 2104
            BubbleCheck(sp->left, sptop);
          }
        }
      }else{                                                   ---- 2105
        if(sptop->left!=0 && sptop->right==0){
          BubbleCheck(sp, sptop->left);
        }else if(sptop->left==0 && sptop->right!=0){
          BubbleCheck(sp, sptop->right);
        }else{
          ldist = SphereDist(sp, sptop->left);
          rdist = SphereDist(sp, sptop->right);
          if(ldist<rdist){
            BubbleCheck(sp, sptop->left);
            BubbleCheck(sp, sptop->right);
          }else{
            BubbleCheck(sp, sptop->right);
            BubbleCheck(sp, sptop->left);
          }
        }
      }
    }
  }
}
```

FIG. 35

```
}else if(sp->leaves->leafcnt>1 && sptop->leaves->leafcnt==1 ){    ----2106
    if(sp->left!=0 && sp->right==0){
        BubbleCheck(sp->left, sptop);
    }else if(sp->left==0 && sp->right!=0){
        BubbleCheck(sp->right, sptop);
    }else{
        ldist = SphereDist(sp->left, sptop);
        rdist = SphereDist(sp->right, sptop);
        if(ldist<rdist){
            BubbleCheck(sp->left, sptop);
            BubbleCheck(sp->right, sptop);
        }else{
            BubbleCheck(sp->right, sptop);
            BubbleCheck(sp->left, sptop);
        }
    }
}else if(sp->leaves->leafcnt==1 && sptop->leaves->leafcnt>1 ){    ----2107
    if(sptop->left!=0 && sptop->right==0){
        BubbleCheck(sp, sptop->left);
    }else if(sptop->left==0 && sptop->right!=0){
        BubbleCheck(sp, sptop->right);
    }else{
        ldist = SphereDist(sp, sptop->left);
        rdist = SphereDist(sp, sptop->right);
        if(ldist<rdist){
            BubbleCheck(sp, sptop->left);
            BubbleCheck(sp, sptop->right);
        }else{
            BubbleCheck(sp, sptop->right);
            BubbleCheck(sp, sptop->left);
        }
    }
}else{
    lf = sp->leaves->leaves;                                       ----2108
    while(lp){
        lftop = sptop->leaves->leaves;
        while(lftop){
            if(Hash.Insert(lf, lftop)==TRUE){                      ----2109
                dist = lf->plane->CheckConvex(lftop->plane);       ---- 2110
                if(dist<cq->dist){
                    cq->dist=dist*(1.0-cq->alpha);                 ---- 2111
                }
            }
            lftop=lftop->next;
        }
        lf=lf->next;
    }
}
}
}
```

FIG. 37

```
class ColQue{
    Sphere *spheres;      // SPHERE TREE FOR BUBBLE COLLISION
    int colflg;           // COLLISION FLAG
    int contflg;          // CONTINUOUS, DISCONTINUOUS FLAG
    Vector3 zisol;        // POINTS OF CLOSEST APPROACH OF OBJECT i
    Vector3 zjsol;        // POINTS OF CLOSEST APPROACH OF OBJECT j
    Vector3 zsol;         // LATEST VECTOR
    Scalar dist;          // LATEST DISTANCE
    Matrix *RO:           // COORDINATE TRANSFORMATION MATRIX
    Vector3 *PO;          // COORDINATE TRANSFORMATION VECTOR
    ConvexHull *convex;   // CONVEX HULL
    Prims *vertex;        // SET OF VERTEXES CONSTITUTING OBJECT
    Prims *v;             // TRANSFORMATION OF COORDINATES OF VERTEX
    ColQue *next;         // POINTER FOR ColQue LIST
    ColQue *qcolq;        // LATEST ColQue PAIR
};

class MetaLeaf{
    Vector3 center;
    Scalar r;
    MetaLeaf *next;
    int colqnum;
    ColQue *colq;
};

class MetaLeaves{
    MetaLeaf *metaleaves;
    Vector3 max;
    Vector3 min;
    Vector3 avcenter;
    int metaleafcnt;
};
```

FIG.38

```
class MetaSphere{
  Vector3 center;
  Scalar r;
  MetaSphere *left;
  MetaSphere *right;
  MetaLeaves *metaleaves;
};

class CollisionQue{
  ColQue *next;              // FIRST ColQue LIST
  ColQue *next2;             // SECOND ColQue LIST
  int colqnum;
  int colqnum2;
  MetaLeaf **MLfs;
  MetaLeaves **MLvleft;
  MetaLeaves **MLvright;
  MetaSphere **MSps;
  MetaLeaves *metaleaves;
  MetaSphere *metaspheres;
  MetaLeaf **MLfs2;
  MetaLeaves **MLvleft2;
  MetaLeaves **MLvright2;
  MetaSphere **MSps2;
  MetaLeaves *metaleaves2;
  MetaSphere *metaspheres2;
  Scalar Geps;   //VERY SMALL CONSTANT FOR COLLISION JUDGEMENT
  Scalar dist;   //VARIABLE FOR DISTANCE JUDGEMENT FOR BUBBLE COLLISION
  Scalar dist0;  //VARIABLE FOR DISTANCE JUDGEMENT FOR METABUBBLE COLLISION
  Scalar alpha;  //RELATIVE ERROR FOR BUBBLE COLLISION
  int gcolflg;   //COLLISION FLAG FOR SWITCHING
  ColQue *colqi; //FOR METABUBBLE COLLISION
  ColQue *colpj;
  CollidePoint *cpoint;   // FOR DISPLAYING MULTIPLE POINTS OF CONTACT
  CollidePlane *cplane;   //FOR SUCCESSIVE TYPE BUBBLE COLLISION
};
```

FIG.39

```
class Prims{
    Vector3 p;        // VERTEX COORDINATES
    Vector3 n;        // VERTEX NORMAL
    Prims *next;      // POINTER FOR VERTEX LIST
    Prims *branch;    // POINTER FOR NEARBY VERTEX LIST
    int bcount;       // THE NUMBER OF NEARBY VERTEX
    int pnum;         // VERTEX NUMBER
};

class ConvexHull{
    Prims *top;       // SET OF VERTEXES OF CONVEX HULL
    int count;        // TOTAL NUMBER OF VERTEXES
    Vector3 com;      // THE CENTER OF GRAVITY
    Vector3 Pc;       // CENTER OF ENVELOPE SPHERE OF CONVEX HULL
    Scalar R;         //RADIUS OF ENVELOPE SPHERE OF CONVEX HULL
    Vector3 max;      // MAXIMUM, MINIMUM VECTORS FOR
    Vector3 min;         THREE-DIMENSIONAL ELEMENTS
};
```

$\max_i \{ -V_0 \cdot X^1_i \}$  $\max_i \{ V_0 \cdot X^2_i \}$ $\max_i \{ -V_1 \cdot X^1_i \}$  $\max_i \{ V_1 \cdot X^2_i \}$ Repeat $V_k = V_{final}$ $\max_i \{ -V_k \cdot X^1_i \}$  $\max_i \{ V_k \cdot X^2_i \}$

FIG.51
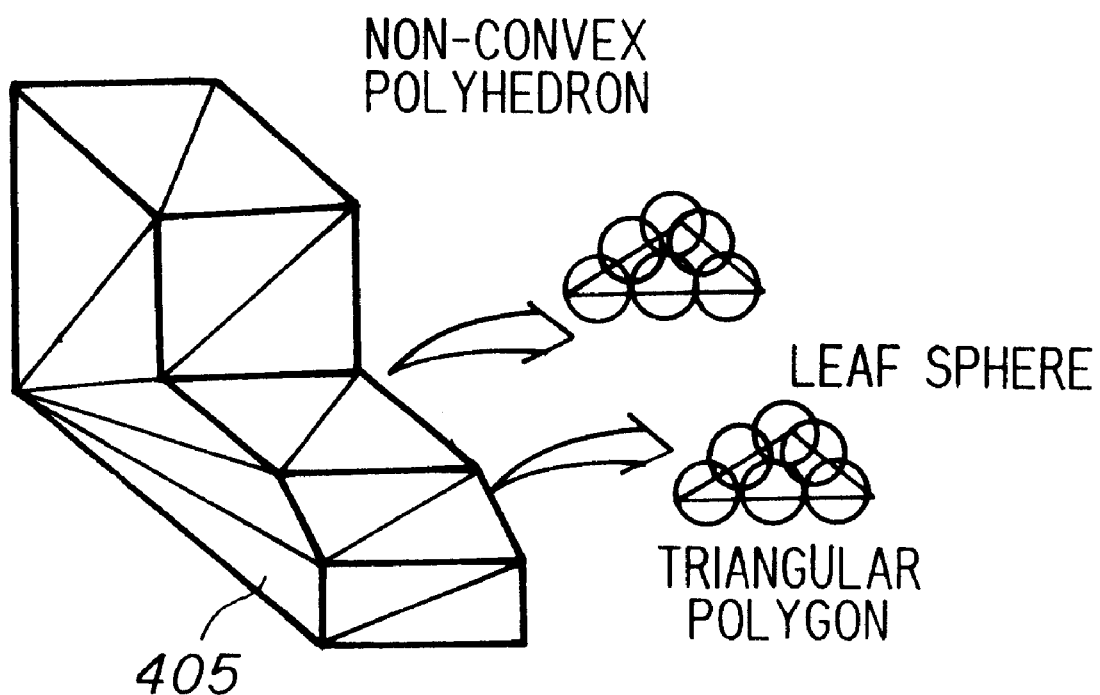
NON-CONVEX POLYHEDRON
LEAF SPHERE
TRIANGULAR POLYGON
405
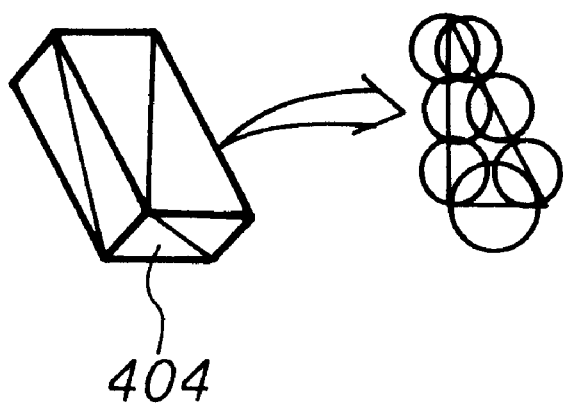
404

COARSE LEAF SPHERES

FINE LEAF SPHERES

INTERFERENCE CHECK BETWEEN NEARBY POLYGON PAIR

BUBBLE COLLISION METHOD (EVERY SEVERAL CYCLES)

DISASSEMBLE ENVELOPE SPHERE

DISASSEMBLE ENVELOPE SPHERE

DISASSEMBLE INTERFERED ENVELOPE SPHERES

DISASSEMBLE INTERFERED ENVELOPE SPHERES

DISASSEMBLE INTERFERED ENVELOPE SPHERES (LENGTH OF THE LARGEST SIDE OF MOVING OBJECT Lmax)/$\beta$ (RADIUS OF THE TOPMOST SPHERE OF MOVING OBJECT RO )/$\beta$ (LARGEST RADIUS OF LEAF SPHERES OF MOVING OBJECT RLmax)×$\beta$

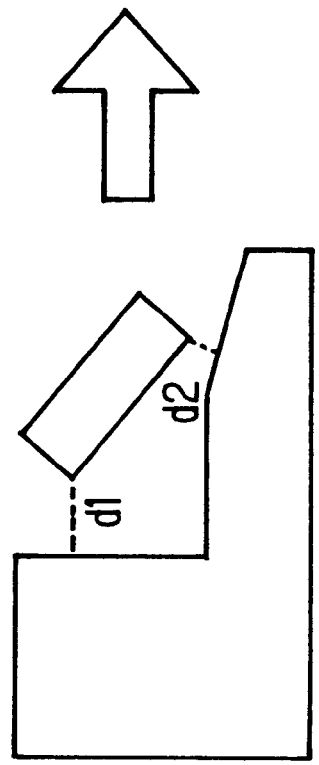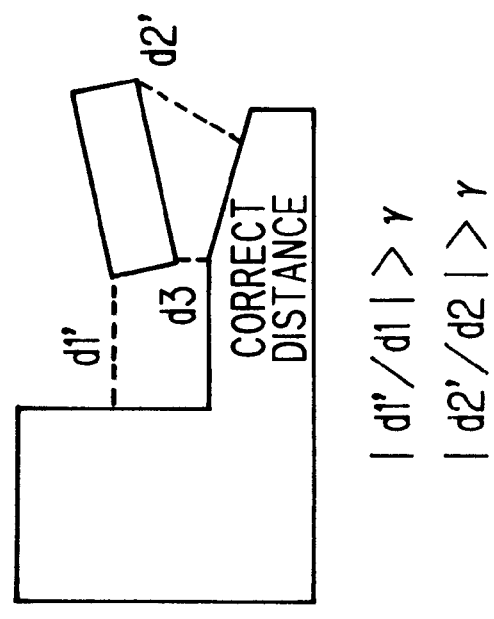
FIG. 67

INTERFERENCE CHECKING METHOD

BACKGROUND OF THE INVENTION

FIELD OF THE INVENTION

The present invention relates to an interference checking method for two non-convex polyhedrons and, more particularly, to an interference checking method for judging whether the CG models of objects constructed in a computer are spaced apart from or in contact with one another by the computer, and calculating the points of closest approach, the point of contact and the distance between the points of closest approach in real time. The present invention is applicable to various fields to which computer graphics is applied such as CAD systems for designing a mechanism, path generation for manipulators and mobile robots such as self-propelled vehicles, creation of animations for multimedia use and game software.

When a plurality of CG models (CG model is a set of polygons for determining the shape of an object) are constructed in a graphic computer, it is desired to judge whether the CG models having arbitrary convex and concave parts are spaced apart from or in contact with one another and to calculate the points of closest approach in the former case and the point of contact in the latter case in real time. Not only in the case of CG models in a graphic computer but also when mathematical models (each consisting of vertexes in three-dimensional coordinates, a set of edges and a set of faces) of objects are given, search for the points of closest approach/point of contact of the mathematical models is generally called "search for the points of closest approach".

The basic method used to search for the points of closest approach is to enter data representing the shape, position and attitude of a particular object in a computer and solving the problem by elementary geometrical calculations. A graphic simulator used in the field of CAD usually expresses a single object by pasting together a plurality of planar convex polygons. Accordingly, the simplest method of checking the state of interference between two objects is therefore a method of checking the interference between a pair of polygons which constitute the respective objects with respect to all kinds of combinations. More specifically, in a pair of polygons disposed arbitrarily in a space, the points of closest approach are searched for with respect to each lattice point, side and face, and the distance between the points of closest approach is calculated. It goes without saying that if the distance between the points of closest approach is zero, two polygons are in the state of interference. Since this method is accompanied by a large computation load of $O(M_1 \cdot M_2)$, wherein $M_1$, $M_2$ represent the number of lattice points expressing the two objects, it lacks in real-timeness.

Historically, methods of searching for the points of closest approach include a method using a Voronoi diagram illustrating the proximity relationship of each lattice point by connecting the perpendicular bisectors between lattice points, as well as the oct-tree method in which three-dimensional space is successively divided into eight equal portions quadrant by quadrant and the exclusive area of the object is made a data base. Both of these methods are useful in cases where an object is fixed statically, but they are unsuitable when the object of interference check successively changes dynamically due to disassembly or assembly.

In the field of robotics, the Boblow method, the Lin/Canny method and the Gilbert method are known as a high-speed interference checking algorithm, and any of these methods enables the points of closest approach to be calculated in a space of time of not more than O(N) (N: the total number of lattice points of the object of interference check). However, the objects of inspection to which these methods are applicable are limited to convex polyhedrons.

Most of the shapes which can be designed by using a commercially available three-dimensional CAD system such as Pro/Engineer are non-convex polyhedrons, so that a method having real-timeness such as the Boblow method, the Lin/Canny method and the Gilbert method is not adopted when the interference between parts with non-convex polyhedrons is checked, and a method of respectively checking the interference between each pair of polygons which constitute the respective parts of a shape or a method of analytically and gradually solving the equation which defines a shape is adopted.

As an interference checking method for non-convex polyhedrons, the Quinlan method is known. This is a method of covering a polyhedron with a set of spheres which are hierarchically arranged, checking the interference between each pair of spheres so as to obtain a pair of polygons which are approaching closest, and then adopting the Gilbert method. Although this method is a very general method which is applicable to an arbitrary non-convex polyhedron, it is defective in that when the strict distance between two objects is computed, the number of spaces to be searched increases, so that the computation time is greatly prolonged.

In addition, such a conventional interference checking method is disadvantageous in that it is impossible in real-time to judge whether non-convex polyhedrons are spaced apart from or in contact with one another, and to calculate the points of closest approach in the former case and the point of contact in the latter case.

SUMMARY OF THE INVENTION

Accordingly, it is an object of the present invention to eliminate the above-described problems in the related art and to provide a method of checking the interference between non-convex polyhedrons at a high speed.

It is another object of the present invention to provide an interference checking method which is capable of producing convex hulls, a nearby-point linear list and hierarchical spheres at a high speed with good efficiency as preprocessing to an interference check.

It is still another object of the present invention to provide a method of checking the interference between non-convex polyhedrons at a high speed by adopting a bubble collision method when the non-convex polyhedrons are closely approaching, and efficiently checking the interference between objects when they are stationary.

To achieve these objects, in one aspect of the present invention, there is provided an interference checking method for checking the interference between two objects in the shape of non-convex polyhedrons, comprising the steps of producing a convex hull for each of the non-convex polyhedrons, and checking the interference of the convex hull of one object with the convex hull of the other object; covering each of polygons which constitute each of the non-convex polyhedrons with a plurality of leaf spheres which have a predetermined radius and which are arranged on each polygon when the distance between the convex hulls becomes not more than a preset value, and sequentially enveloping the leaf spheres with hierarchical spheres so as to produce a binary tree of hierarchical envelope spheres; obtaining a pair of nearby spheres between said two objects by checking the interference between envelope spheres of an upper grade on the basis of the structure of the binary tree, disassembling the interfering envelope spheres into envelope spheres of a lower grade, checking the interference between the envelope spheres of the lower grade, and repeating the interference check process and the disassembly process until no interference is detected; obtaining the pair of polygons which correspond to the pair of nearby spheres as a nearby polygon pair; and checking the interference between the nearby polygon pair.

In another aspect of the present invention, there is provided an interference checking method for checking the interference between two objects in the shape of a polyhedron, comprising the steps of: covering each of polygons which constitute each of the polyhedrons with a plurality of spheres which have a predetermined radius and which are arranged on each polygon, and sequentially enveloping the spheres with hierarchical spheres so as to produce a binary tree of hierarchical envelope spheres as preprocessing; performing a bubble collision algorithm which includes a first step of obtaining a pair of nearby spheres by checking the interference between envelope spheres of an upper grade on the basis of the structure of the binary tree, disassembling the interfering envelope spheres into envelope spheres of a lower grade, checking the interference between the envelope spheres of the lower grade, and repeating the interference check process and the disassembly process until no interference is detected, a second step of obtaining and storing the pair of polygons which correspond to the pair of nearby spheres as a nearby polygon pair, and a third step of executing an interference check for the nearby polygon pair; repeating an interference check for the nearby polygon pair for a predetermined number of times; updating the nearby polygon pair in accordance with the bubble collision algorithm every time the predetermined number interference checks for said near polygon pair are finished; and repeating the interference check for a new nearby polygon pair.

Other features and advantages of the present invention will be apparent from the following description taken in conjunction with the accompanying drawings.

BRIEF DESCRIPTION OF THE DRAWINGS

FIG. 7 is an explanatory view of data structure representing a polyhedron by using the C language;

FIG. 9 shows the basic function for producing a two-dimensional convex hull expressed by the C language;

FIG. 12 shows the structure of the two-dimensional convex hull merging function expressed by the C language;

FIGS. 16A to 16C are explanatory views of a process of producing a convex hull;

FIG. 17 shows the structure of the merging function for producing a three-dimensional convex hull expressed by the C language;

FIG. 21 shows a function for patching triangular polygons expressed by the C language;

FIG. 23 is an explanatory view of a nearby-point linear list;

FIG. 26 shows a format of a dump file of a nearby-point linear list;

FIG. 31 shows the data structure for a binary tree using the C language;

FIG. 34 shows the basic function (part 1) of a bubble collision check;

FIG. 35 shows the basic function (part 2) of a bubble collision check;

FIG. 37 shows a data structure (part 1) for an interference check using the C language;

FIG. 38 shows a data structure (part 2) for an interference check using the C language;

FIG. 39 shows a data structure (part 3) for an interference check using the C language;

FIG. 51 is an explanatory view of a method of producing leaf spheres;

FIG. 67 is an explanatory view of a method of modifying the successive bubble collision method using the ratio of the current distance between the points of closest approach and the preceding distance between the points of closest approach;

DESCRIPTION OF THE PREFERRED EMBODIMENTS (A) Schematic explanation of the invention (a) Construction In FIG. 1, the reference numeral 1 represents a convex hull producing portion for producing the smallest convex polyhedron (referred to as a convex hull hereinafter) which envelops a non-convex polyhedron using the shape data of the non-convex polyhedron, 2 a nearby-point linear list producing portion for producing a nearby-point linear list of the convex hull, 3 a binary hierarchical envelope sphere tree producing portion for producing a binary tree of hierarchical envelope spheres by covering each of polygons which constitute the non-convex polyhedron with a plurality of spheres (referred to as leaf spheres) which have a predetermined radius and which are arranged on each polygon and sequentially enveloping the leaf spheres with hierarchical envelope spheres so as to produce a binary tree of hierarchical envelope spheres, 4 a storage portion for storing the data on the convex hull, the nearby-point linear list and the binary hierarchical envelope sphere tree produced, 5 a convex hull interference checking portion for checking the interference between convex hulls in accordance with the Gilbert method and the like, 6 a bubble collision process executing portion for executing a bubble collision process for obtaining a pair of nearby spheres by checking the interference between hierarchical envelope spheres of an upper grade, disassembling each of the interfering envelope spheres into envelope spheres of a lower grade which constitute the respective interfering envelope spheres, checking the interference between the hierarchical envelope spheres of the lower grade, and repeating the disassembly process and the interference check process until no interference is detected, and obtaining a pair of polygons which correspond to the pair of nearby spheres as a pair of nearby polygons; and 7 a nearby polygon interference checking portion for checking the interference between a pair of nearby polygons.

(b) High-speed preprocessing to interference check

Figure 1:
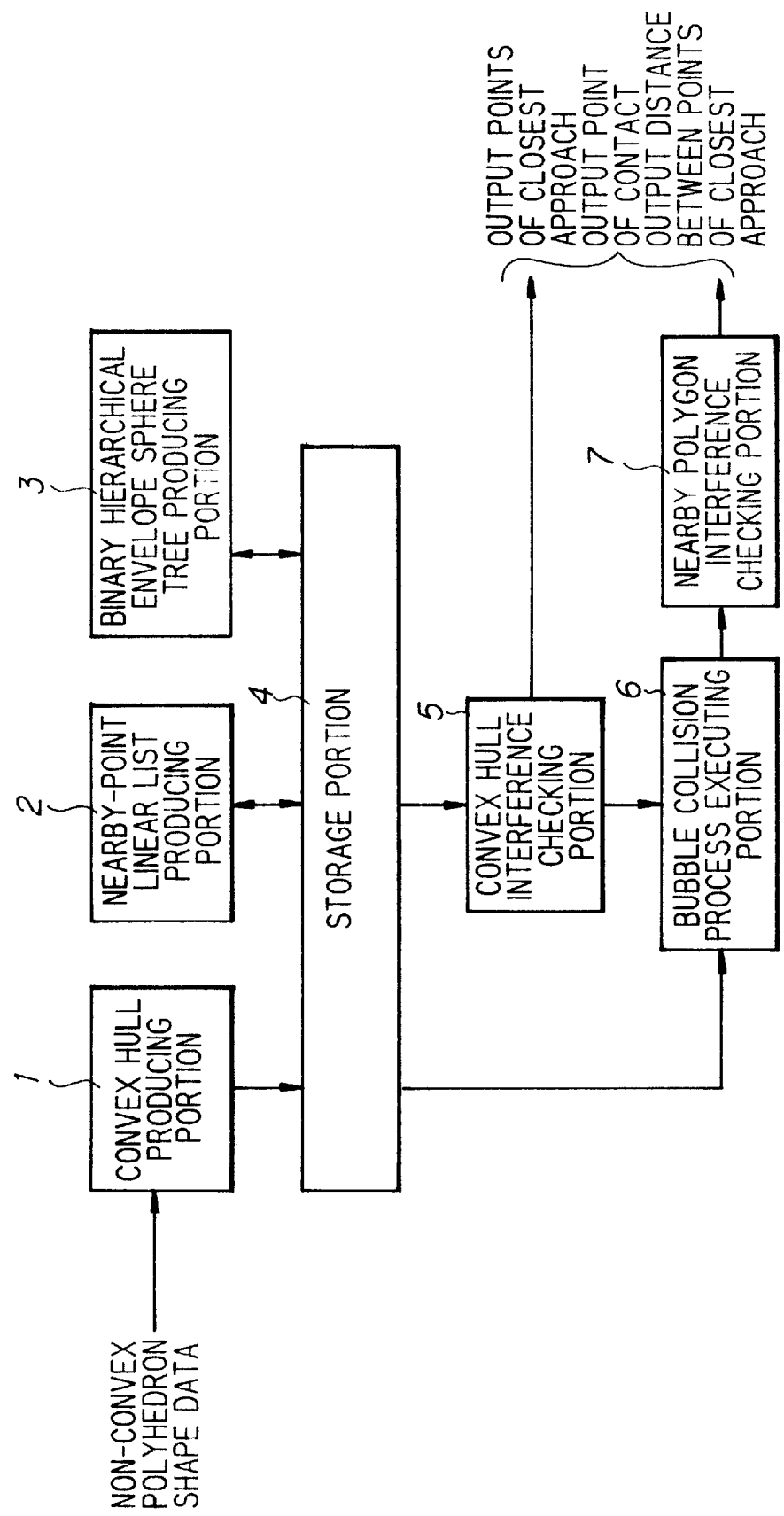
FIG. 1 is a schematic explanatory view of the present invention.

In order to execute an interference check process for non-convex polyhedrons at a high speed, it is necessary to produce convex hulls, a nearby point linear list and hierarchical spheres for enveloping an object at a high speed as preprocessing. In the present invention, the convex hull producing portion 1, the nearby point linear list producing portion 2 and the binary hierarchical envelope sphere tree producing portion 3 produce a convex hull, a nearby point linear list and a binary hierarchical envelope sphere tree, respectively, in high-speed preprocessing to an interference check. It is therefore possible to produce a nearby point linear list for successive search for the points of closest approach between convex hulls of arbitrary non-convex polyhedrons having N vertexes in a space of time of N·log N and further to envelop an object by hierarchical envelope spheres for a bubble collision method.

1) High-speed preprocessing to interference check (production of convex hull)

In an interference checking method for producing a convex hull of a non-convex polyhedron, checking the interference between the convex hull and the other object, and checking the interference between the non-convex polyhedron and the other object when there is interference, the convex hull producing portion 1 divides the vertexes which constitute the non-convex polyhedron into a plurality of vertex groups in each of which the difference between the coordinate values of a first axis (e.g., X-axis) of two arbitrary vertexes is zero or not more than a very small value ε, produces a two-dimensional convex hull for each vertex group on the plane of second and third axes (e.g., Y-Z plane), produces three-dimensional convex hulls by merging each pair of adjacent two-dimensional convex hulls, and thereafter sequentially merges adjacent three-dimensional convex hulls, thereby producing a convex hull of the non-convex polyhedron as the object.

2) Preprocessing to interference check (Production of nearby point linear list)

This preprocessing is preprocessing for successively searching for the points of closest approach in the interference check process for convex polyhedrons. The preprocessing greatly enhances the speed of the successive search for the points of closest approach. The nearby-point linear list is a data structure obtained by linking each vertex which constitutes a CG model with the other vertexes which are connected thereto via the respective edges. It is possible to pick up all the nearby-points which are connected to a vertex of interest by sequentially following the list from the top.

The nearby-point linear list producing portion 2 produces a nearby-point linear list having a data structure obtained by arranging the vertexes of all triangular polygons which constitute the convex hull so as to link the vertexes in a first direction ("next" direction) and arranging vertexes each of, which is connected to a vertex of interest via a polygon edge, so as to link the vertexes to the vertex of interest in a second direction ("branch" direction).

This preprocessing is executed immediately after the production of a convex hull.

3) High-speed preprocessing to interference check (dumping of the results of nearby-point linear list and high-speed loading thereof)

The results of process for producing the nearby-point linear list are dumped and the dump file thereof is loaded on a memory at a high speed. With respect to a non-convex polyhedron in a CG model which is not preprocessed, a convex hull is produced and a nearby-point linear list there for is produced. But, once the file of the nearby-point linear list is produced, the nearby-point linear list is loaded on the memory at a high speed. In this manner, it is possible to develop the nearby-point linear list of a CG model consisting of N polygons, in the memory in a space of time of O(N).

This preprocessing is executed immediately after the production of a convex hull and the production of the nearby-point linear list.

4) Preprocessing to interference check (enveloping of an object by hierarchical envelope spheres)

Each polygon which constitutes a non-convex polyhedron is covered with a combination of a plurality of spheres each of which has a center on the corresponding polygon, and the spheres enveloping those spheres are produced hierarchically. In this manner, it is possible to check the interference between spheres hierarchically and to search for a pair of polygons which correspond to a pair of spheres which are approaching closest at a high speed. The hierarchical envelope spheres are produced by a divide-and-conquer method, and the processing is finished in a space of time of O(N·log N) with respect to a CG model consisting of N polygons.

The binary hierarchical envelope sphere tree producing portion 3 arranges a plurality of spheres (leaf spheres) having a predetermined radius on each polygon which constitutes a non-convex polyhedron so as to cover each polygon, and sequentially envelops the spheres with hierarchical envelope spheres in accordance with a divide-and-conquer algorithm, thereby producing a binary hierarchical envelope sphere tree structure. In this case, the radius of a leaf sphere is set to be a value which corresponds to the radius of a sphere enveloping the non-convex polyhedron, and when the number of polygons constituting the non-convex polyhedron is small, the radius is set to be a small value, while when the number of polygons is large, the radius is set to be a large value.

This processing is different from the process of producing hierarchical envelope spheres in the Quinlan method in that although the latter is similar to scan conversion, in the present invention, spheres are efficiently produced with the value of a scale S as a parameter with the number of polygons taken into consideration.

5) Bubble collision method in interference check process for non-convex polyhedrons In order to check the interference between non-convex polyhedrons at a high speed, the binary hierarchical envelope sphere tree producing portion 3 envelops each non-convex polyhedron with hierarchical envelope spheres and produces a tree consisting of the envelope spheres. The bubble collision process executing portion 6 checks interference between spheres on the basis of the tree by a depth-first search method, and searches for the pair of spheres which are approaching closest. The nearby polygon interference checking portion 7 calculates the point of closest approach of the two non-convex polyhedrons by adopting the Gilbert method to the pair of the polygons on which the centers of the searched spheres lie. In this case, the bubble collision process executing portion 6 calculates the point of closest approach on the assumption that the distance between leaf spheres is the distance between the centers of the leaf spheres, that the distance between a leaf sphere and a non-leaf sphere is the distance obtained by subtracting the radius of the non-leaf sphere from the distance between the centers of the two spheres, and that the distance between non-leaf spheres is the distance obtained by subtracting the radii of the two non-leaf spheres from the distance between the centers of the two non-leaf spheres.

This method is different from the Quinlan method in the calculation method of the distance between spheres. In this method, when the distance between spheres is obtained, the definition of the distance between spheres is changed in accordance with the depth of the hierarchical envelope sphere tree at which the spheres exist. Consequently, it is possible for this invention to reduce the number of polygon pairs to be checked finally, although it is a problem of a bubble collision method that the number of polygon pairs to be checked finally is large.

(c) Merge with bubble collision method

1) Merge of the successive type Gilbert method for convex hulls with a bubble collision method for non-convex polyhedrons In order to check the interference between non-convex polyhedrons with as little waste as possible, when non-convex polyhedrons are adequately spaced apart from each other, a convex hull enveloping each non-convex polyhedron is produced and the successive type Gilbert method is adopted to check the interference between the convex hulls. When the convex hulls begin to interfere, the successive type Gilbert method is automatically switched over to a bubble collision method. The switching timing is determined by the distance between the convex hulls. The convex hull producing portion 1 produces a convex hull for each, and when the non-convex polyhedrons are adequately spaced apart from each other, the convex hull interference checking portion 5 checks the interference between the convex hulls. When the convex hulls begin to interfere, the bubble collision process executing portion 6 checks interference between the non-convex polyhedrons by adopting a bubble collision method. In this manner, by merging the successive type Gilbert method for convex hulls and with a bubble collision method (by the susceptive type bubble collision method), wasteful calculation is omitted as much as possible at the time of obtaining the points of closest approach.

2) Four-dimensional Gilbert method

When the successive type Gilbert method for convex hulls is automatically switched over to a bubble collision method, or vice versa, the switching timing is determined by the distance between the convex hulls calculated by the successive type Gilbert method for convex hulls. When the convex hulls begin to interfere, the algorithm for calculating the distance is switched from the three-dimensional successive type Gilbert method over to the four-dimensional successive type Gilbert method. In this manner, even when one convex hull is absorbed into the other convex hull, smooth switching is possible without contradiction.

3) Enhancement of the calculation speed by a metatree

With regard to the interference check between two objects each of which is composed of a set of non-convex polyhedrons, in order to calculate the pair of non-convex polyhedrons which are approaching closest, a metatree is produced by covering each non-convex polyhedron with spheres and then hierarchically enveloping these spheres with envelope spheres. In place of respectively checking the interference between each pair of the non-convex polyhedrons which constitute respective objects, interference between envelope spheres is checked on the basis of the metatree by a depth-first search method so as to retrieve the pair of spheres which are approaching closest. By applying the successive type Gilbert method to the interference check between the convex hulls of the non-convex polyhedrons on which the centers of the retrieved spheres lie, it is possible to calculate the points of closest approach with high efficiency.

This process is characterized by the process of producing a metatree, and the process of switching the depth-first search method on the basis of the metatree over to the successive type Gilbert method and the bubble collision method.

4) Successive interference checking method including the production of a metatree When the points of closest approach between arbitrary non-convex polyhedrons are successively searched for, each of the production process of a metatree, the process by the Gilbert method and the bubble collision process is executed only once every several cycles, and in the other cycles, the Gilbert method is applied repeatedly to the polygon pairs used in the preceding cycle to obtain the shortest distance, thereby greatly reducing the computation load.

5) Successive interference checking method with cycle time automatically adjusted In a successive interference checking method, the cycle in which the production of a metatree, the Gilbert process and the bubble collision process are executed is automatically determined by measuring the computation time necessary for the execution of the bubble collision process.

(d) Interference check by successive type bubble collision method

1) Successive type bubble collision method

If convex hulls interfere with each other at the time of checking interference, an interference check within the convex hulls is executed by a bubble collision method. Since the interference check by the bubble collision method takes a long time, the bubble collision process executing portion 6 executes a bubble collision process not in every cycle but once every several cycles, and several pairs of nearby polygons as the results of the execution of the bubble collision process are stored. If the distance of movement/ change of attitude is small, since the pairs remain as they are, the nearby polygon interference checking portion 7 executes an interference check with respect to only the several pairs of nearby polygons, and obtains and outputs the points of closest approach and the points of contact. By executing an interference check with respect to only the several pairs of nearby polygons which are stored, it is possible to reduce the number of times of the processing of the bubble collision method which takes a long time, thereby shortening the computation time.

2) Method of automatically determining the cycle of updating process in the successive type bubble collision method from the computation time necessary for the execution of the bubble collision process.

In the successive bubble collision method, it is necessary to adjust the cycle of nearby polygon pair updating process (cycle of bubble collision process) on the basis of the shape and the moving speed of an object. If this cycle is too long, updating of the nearby polygon pair is delayed so that many false results are output. On the other hand, if the cycle of nearby polygon pair updating process is too short, since the updating process takes a long time, the real-timeness lessens. Adjustment of the cycle by the method of trial and error is difficult. In the present invention, the computation time necessary for the execution of a bubble collision process is measured each time, and the cycle of nearby polygon pair updating process is automatically determined from the computation time.

3) Correction in the successive bubble collision method (judgment from the amount of movement of an object)

Since the distance of movement/change of attitude is assumed to be small in the successive bubble collision method, if an object moves by a large amount, false results are frequently output. When the distance of movement/ change of attitude is larger than a predetermined threshold value, the bubble collision process executing portion 6 executes a bubble collision process to update the nearby polygon pair even if the polygon pair update cycle does not come. In this manner, correct results of the interference check are obtained.

4) Correction in the successive bubble collision method (judgment from the speed of movement of an object)

Since the distance of movement/change of attitude is assumed to be small in the successive bubble collision method, if an object moves by a large amount, false results are frequently output. When the speed of movement of an object is larger than a predetermined threshold value, the bubble collision process executing portion 6 executes the bubble collision process to update the nearby polygon pairs even if the polygon pair update cycle does not come. In this manner, correct results of the interference check are obtained.

5) Correction in the successive bubble collision method (judgment from the ratio of the distances between the points of closest approach)

Since the distance of movement/change of attitude is assumed to be small in the successive bubble collision method, if an object moves by a large amount, false results are frequently output. When the ratio of the distance between the points of closest approach at the current time and that at the preceding time is larger than a predetermined threshold value, the bubble collision process executing portion 6 executes a bubble collision process to update the nearby polygon pair even if the polygon pair update cycle does not come. In this manner, correct results of the interference check are obtained.

6) Enhancement of the efficiency of an interference check outside of the convex hulls when the objects are stationary After an interference check is executed once, if all the objects of check are stationary, it is not necessary to update the results of the interference check in the preceding cycle. If the speed command and the position deviation are zero, the results of the interference check in the preceding cycle are used as they are so as to omit the calculation in the interference check. According to this method, when there exist not less than two groups of objects of interference check, calculation is necessary only in the interference check of groups which contain a moving object, so that the efficiency is enhanced.

7) Enhancement of the efficiency of interference check within convex hulls when the objects are stationary After an interference check is executed once in the convex hulls by the successive bubble collision method, if all the objects of check are stationary, it is not necessary to update the results of the interference check in the preceding cycle. If the speed command and the position deviation are zero, the results of the interference check in the preceding cycle are used as they are so as to omit the calculation in the interference check. It is, however, necessary to execute the bubble collision process once to obtain the correct pair of nearby polygons in the nearby polygon update cycle after the objects become stationary. According to this method, when there exist not less than two groups of objects of interference check, calculation is necessary only in the interference check of groups which contain a moving object, so that the efficiency is enhanced.

Figure 2:
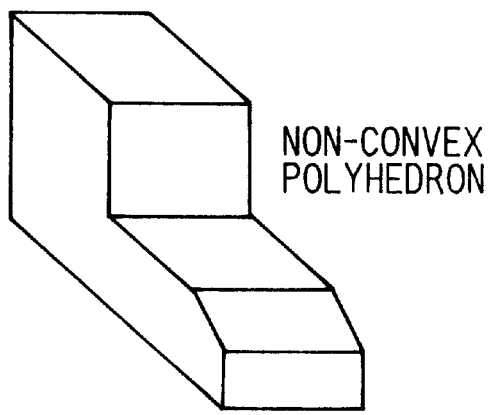
FIG. 2 is an explanatory view of a non-convex polyhedron.
Figure 3:
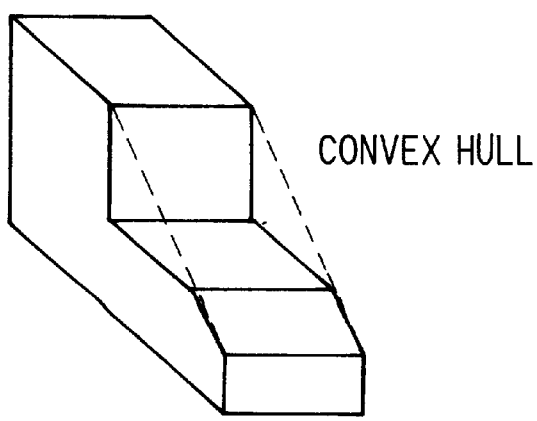
FIG. 3 is an explanatory view of a convex hull.

(B) Production of convex hull (a) Schematic explanation of interference check process for non-convex polyhedrons In order to check the interference between non-convex polyhedrons, a minimum convex polyhedron (convex hull) (FIG. 3) enveloping each non-convex polyhedron (FIG. 2) is produced, and the interference between the convex hulls is checked when the distance between the non-convex polyhedrons is adequately long. When the convex hulls begin to interfere, the interference between the non-convex polyhedrons is checked by adopting the bubble collision method. For this interference check for non-convex polyhedrons, it is necessary to produce a convex hull for each non-convex polyhedron as preprocessing.

(b) System structure

Figure 4:
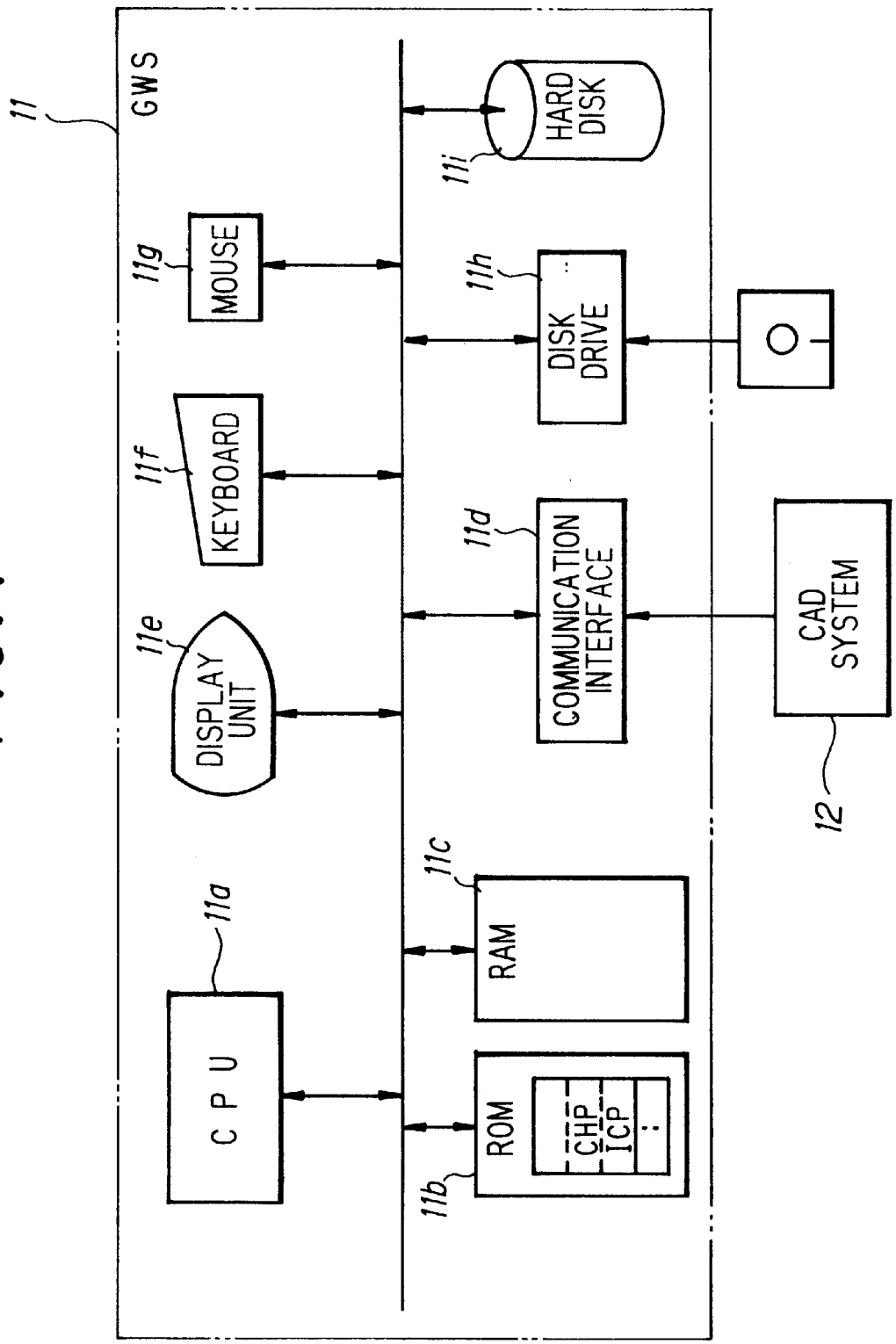
FIG. 4 shows the system structure for an interference check.

FIG. 4 shows the system structure for executing the production of a convex hull as preprocessing and an interference check process. In FIG. 4, the reference numeral 11 represents a graphic work station GWS, and 12 a three-dimensional CAD system. In the work station 11, the reference numeral 11a represents a processor for executing preprocessing to an interference check, an interference check process and other processes, 11b a ROM for storing a preprocessing program CHP for producing a convex hull, an interference check program ICP, etc., 11c a RAM for storing the shape data designed by the three-dimensional CAD system 12, other design data and the results of computation, 11d a communication interface between the graphic work station and the CAD system 12, 11e a display unit, 11f a keyboard, 11g an operating portion such as a mouse, 11h a disk drive for floppy disks and 11i a hard disk.

(c) Schematic flow

Figure 5:
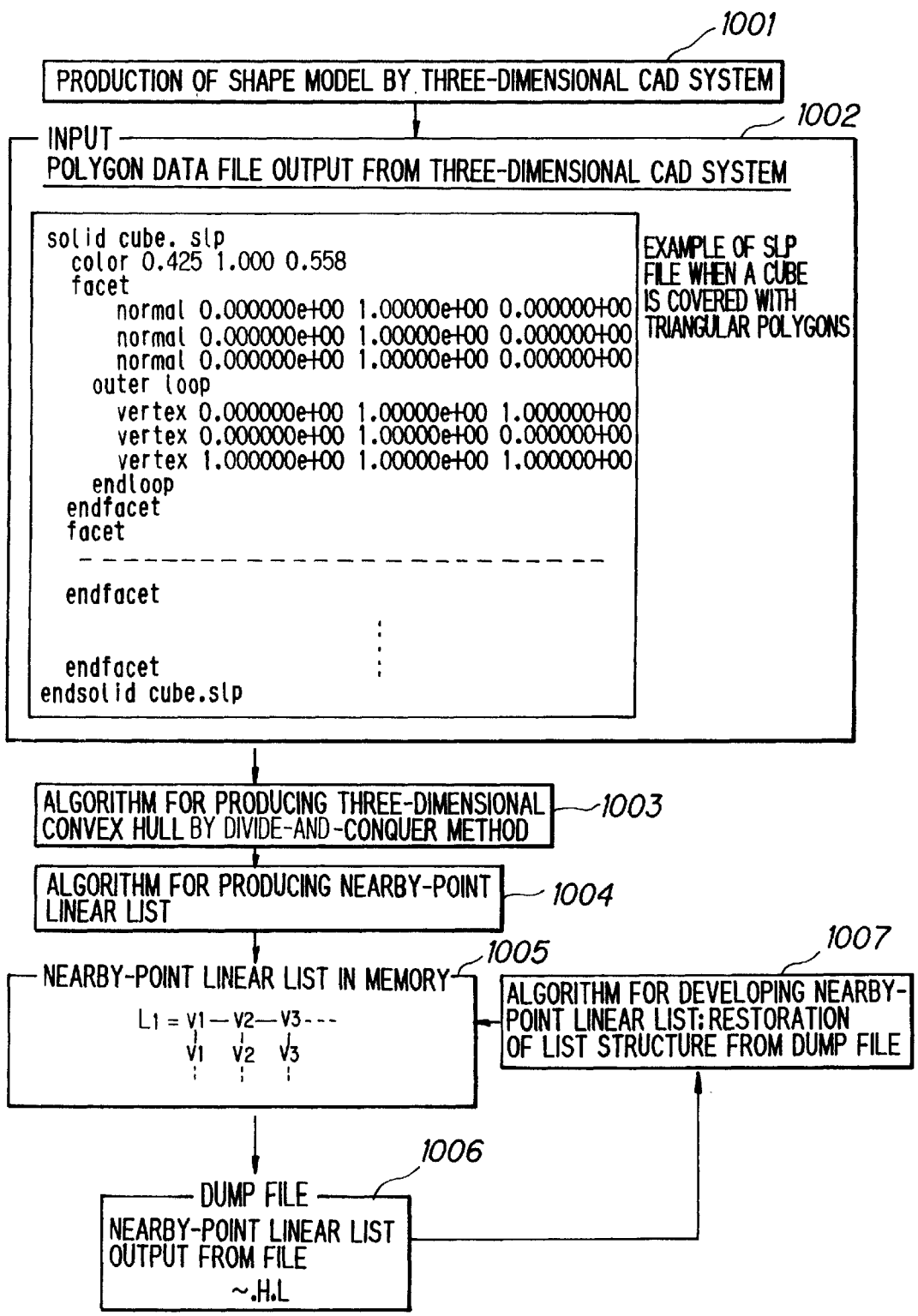
FIG. 5 shows a schematic flow of preprocessing to an interference check.

FIG. 5 shows a schematic flow of the processing (preprocessing to interference check) of the production of a convex hull.

The three-dimensional CAD system 12 produces a shape model (non-convex polyhedron) and inputs it to the graphic work station 11 to store it in the RAM 11c (steps 1001, 1002). The CAD system 12 inputs all polygon data as the shape model data obtained when the non-convex polyhedron is covered by the polygons. The polygon data contains the coordinate values of each vertex of a polygon and information indicating the direction in which light is reflected at this point. The most general polygon data is represented by pasting triangular polygons together. In the triangular polygon data shown in FIG. 5, the three real numbers that follow "normal" indicate the direction in which light is reflected, and the three real numbers that follow "vertex" represent the coordinate values of the vertex.

When the execution of the preprocessing (production of a convex hull) is commanded, the processor 11a produces a convex hull by using the shape data of the non-convex polyhedron on the basis of the program CHP for producing a convex hull stored in the ROM 11b (step 1003). After the production of the convex hull, a nearby-point linear list which will be described later is produced by using an algorithm for producing a nearby-point linear list and develops it in the RAM 11c (steps 1004, 1005). An exclusive dump file HL is then produced on the basis of the nearby-point linear list and is stored in the hard disk 11i or the like. If the nearby-point linear list is necessary thereafter, a new nearby-point linear list is not produced, but the information in the exclusive dump file is reproduced in the form of data through an algorithm for developing a nearby-point linear list (step 1007).

(d) Data structure for representing polyhedron

It is now assumed that a polyhedron is composed of a set of triangular patches. If each triangular patch (see FIG. 6A) is represented by the C language, it has the data structure in the form shown in FIG. 7.

In FIG. 7, the most basic expression class is not "Vertex" but "Edge". Each edge has a direction, and it is assumed that the pointer variable which indicates the edge heading from a vertex u toward a vertex v is e, the pointer which indicates the origin is orig, the pointer which indicates the edge heading from the vertex u toward the vertex v is sym, the pointer which indicates the edge heading from the vertex v toward a vertex w is lnext, and the pointer which indicates the edge heading from the vertex u toward the vertex w is next. An integer variable "color" is necessary in the process of producing a convex hull, and it takes one of the values "blue", "purple" and "red". The meaning of "blue", "purple" and "red" will be described later. As a class expressing a triangle u-v-w, Facet is prepared, and each edge has a pointer variable "left" which indicates "Facet" on the left side.

The class "Vertex" which expresses a vertex includes a three-dimensional vector v which represents coordinates of the vertex and a vector dv which is a vector v with a random deviation added (Vector 3 is the type name repressing a three-dimensional real vector), and pointer variables "next", pre for representing the contour structure.

Figure 6A:
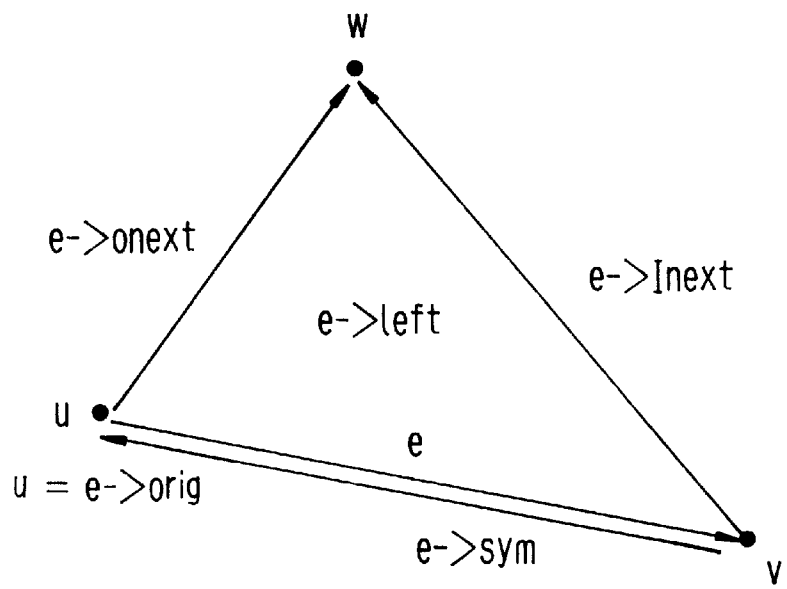
FIGS. 6A and 6B are explanatory views of data structure representing a polyhedron.
Figure 6B:
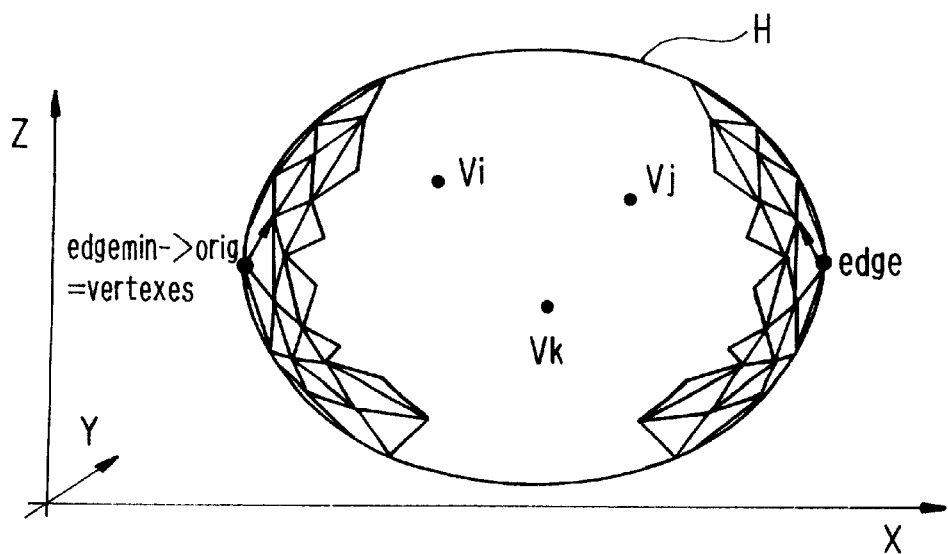

"Convex" is a class which expresses a convex hull, and has a pointer variable "edge" which indicates the leading element of an edge constituting the convex hull. As shown in FIG. 6B, edge→orig, edgemin→orig are variables which indicate the maximum vertex and the minimum vertex, respectively, with respect to the direction of the X-axis of the convex hull H. Pointer variables maxA. minX, maxY and minY which indicate vertexes are used only in the first half of the process of producing a convex hull. The pointer "side" indicates right or left in the divide-and-conquer method, and "vent" indicates the total number of vertexes of the triangular patches of the convex hull. The pointer variable "vertexes" indicates the same vertex as edgemin→orig and it is possible to search for all the vertexes constituting the convex hull in an ascending order of coordinate value by following the vertexes in the "next" direction starting from "vertexes". This search for vertexes includes search for the vertexes within the convex hull such as $V_i$, $V_j$ and $V_k$ in FIG. 6B. The pointer variable "vertexes" is used in the first half of a divide-and-conquer process and in a backup process. "List" is a class which is necessary in the last process of the production of a convex hull, which will be described later in detail.

According to the data structure shown in FIG. 7, it is possible to take out the vertexes which are connected to a certain vertex via edges clockwise or counterclockwise by the following procedure. All the following programs are represented by the C language.

```
Edge *edumy0 = sym;
Edge *edumy1 = sym;
.
.
edumy0 = edumy0->1next->sym;      // clockwise order
.
edumy1 = edumy1->0next->sym>;     //
counterclockwise order
```

(e) Algorithm for producing three-dimensional convex hull

Figure 8:
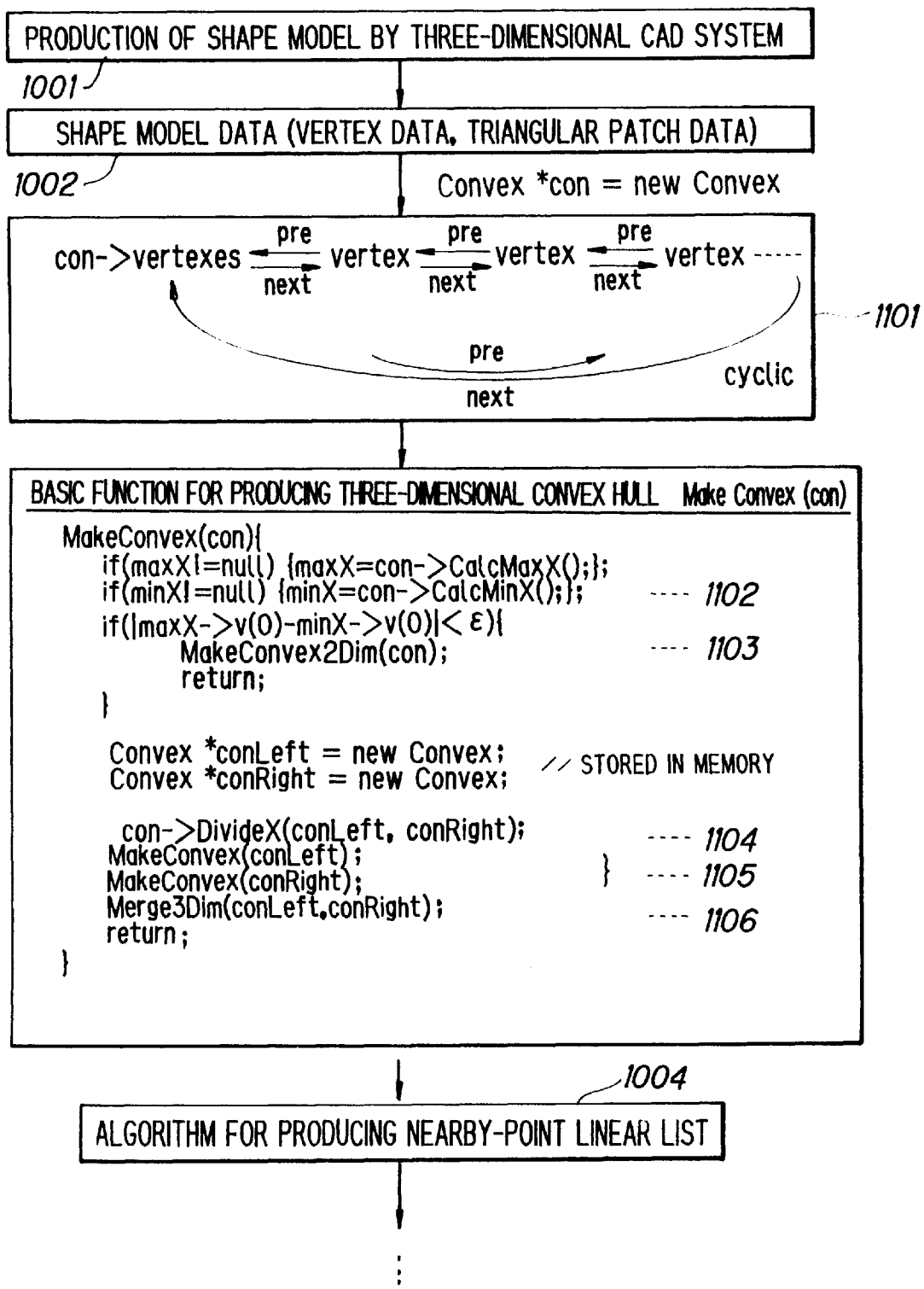
FIG. 8 shows an algorithm for producing a convex hull.

FIG. 8 shows an algorithm for producing a three-dimensional convex hull at the step 1003 in FIG. 5 and shows the basic function for producing a convex hull. This algorithm is, in a word, an algorithm for producing a convex hull by the divide-and-conquer method while sorting each vertex with respect to the X-axis. The procedure is as follows.

The vertex data of a triangle pointer are input (step 1101). The data are input in a cyclic form, as shown in the block at the step 1101 in FIG. 8. Each vertex is connected to the vertexes in the "next" and "pre" directions with the member variable con→vertexes of the pointer variable con of the class "Convex" as a leading element. The "vertex" connected to "vertexes" is obtained by connecting the vertex data in the input file shown in FIG. 7 in the order of input and sorting of vertexes in the X-axis direction.

The maxX, minX which are the max and min, respectively, in the X-axis direction are then calculated in regard to the model data con (step 1102). That is, the vertexes having the maximum value and the minimum value in the X-axis direction are retrieved from a set of vertexes "vertexes", and the respective addresses are input to maxX and minX.

It is judged whether or not the difference between the maximum value and the minimum value of the x coordinate is smaller than the very small value $\epsilon$, and if the answer is in the affirmative, a two-dimensional convex hull is produced (step 1103). In other words, when the set of vertexes "vertexes" are on a plane perpendicular to the X-axis and the difference between the maximum value maxX→v(0) and the minimum value minX→v(0) of the X coordinate is smaller than the very small value $\epsilon$, a two-dimensional convex hull is produced by using the function MakeConvex2Dim(con) for producing a two-dimensional convex hull.

If the difference between the maximum value and the minimum value of the X-coordinate is not smaller than the very small value $\epsilon$, the set of vertexes "vertexes" are divided into two parts in the X-axis direction (step 1104). The set of vertexes "vertexes" are divided into two parts, conLeft and conRight, with the central value of the maximum value maxX→v(0) and the minimum value minX→v(0) as the boundary. For example, when s is equal to (maxX→v(0)+ minX→v(0))/2, (s is a central value), if vertex→v(0)<s, the vertex is connected to conLeft→vertexes, while if vertex→v (0)≧s, the vertex is connected to conRight→vertexes.

Then, a convex hull is reflexively produced from conLeft and conRight by using the function MakeConvex( ) for producing a convex hull (step 1105). Thereafter, conLeft, conRight are merged until the set of vertexes "vertexes" cannot be divided into two parts (step 1106). In other words, the reflexively produced convex hull conLeft and conRight are merged so as to produce one convex hull.

In a general divide-and-conquer method, a process of dividing one set into two parts and reflexively merging them is repeated to obtain a final output, as shown in the above processing. In a divide-and-conquer method, the algorithm dependency is mainly expressed in the merging process. In the procedure shown in FIG. 8, the function Merge3DIM (conLeft, conRight) represents the merging process. Merge3DIM(conLeft, conRight) will be described later in detail.

(f) Algorithm for producing two-dimensional convex hull

The function for producing a two-dimensional convex hull has approximately the same structure as that for producing a three-dimensional convex hull, as shown in FIG. 9. The former is different in the process for producing a one-dimensional convex hull at step 1201 and the merging process for a two-dimensional convex hull at step 1202.

Figure 10:
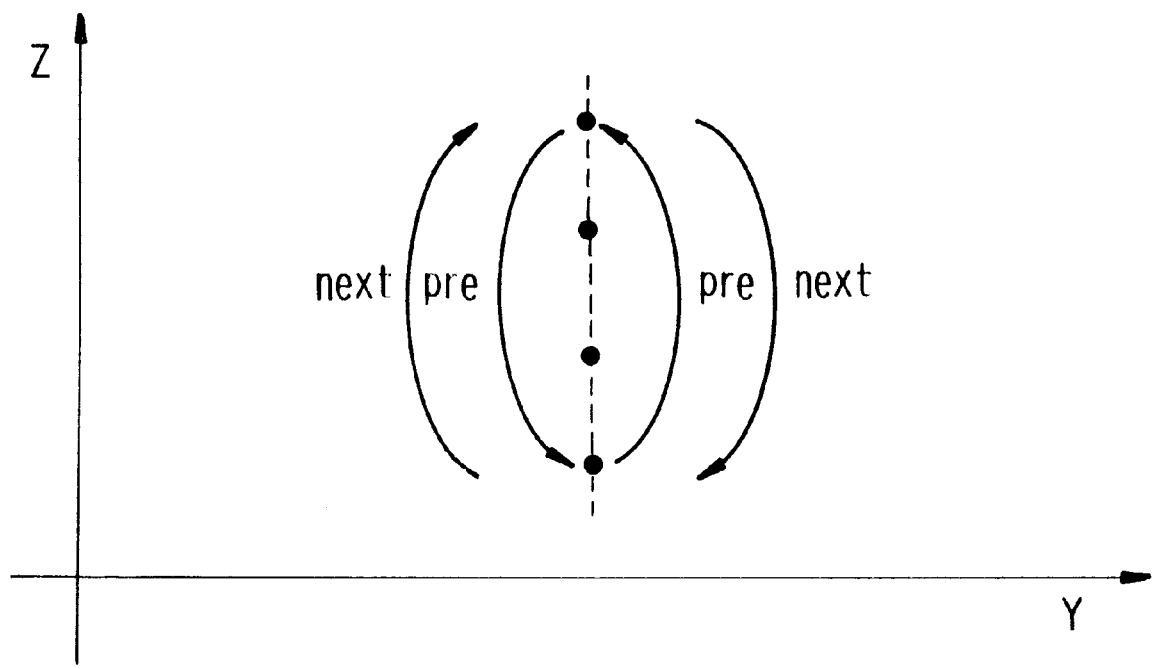
FIG. 10 is an explanatory view of a process of producing a one-dimensional convex hull.

The process for producing a one-dimensional convex hull at the step 1201 is ended by combining the top and the bottom of the vertexes which are arranged in parallel with the Z-axis in the "next and "pre" directions, as shown in FIG. 10.

Figure 11:
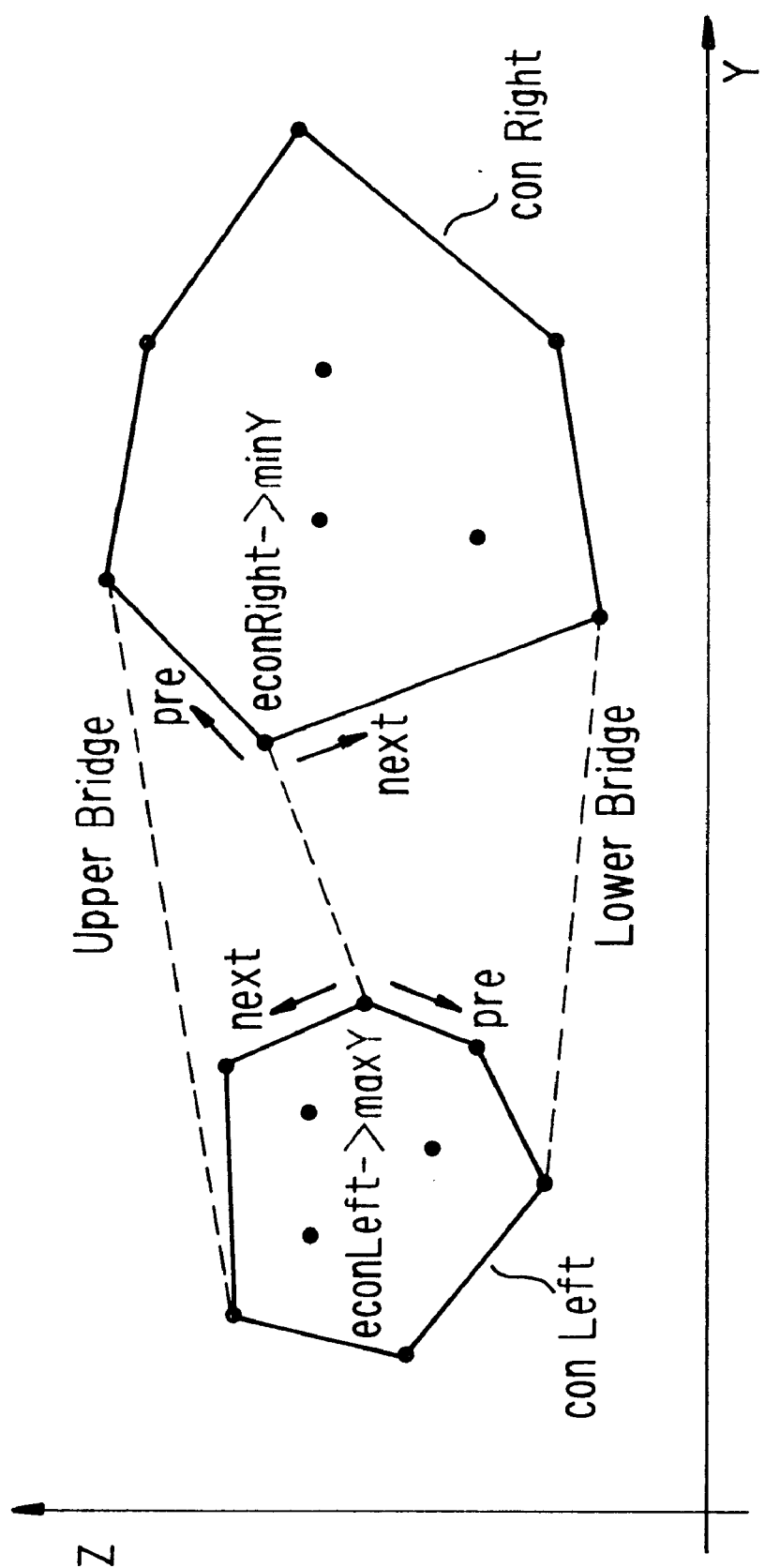
FIG. 11 is an explanatory view of a process of producing Upper Bridge and Lower Bridge.

FIG. 11 shows the details of the merging process Merge2Dim(conLeft, conRight) for a two-dimensional convex hull. As shown in FIG. 11, the merging process Merge2Dim(,) is a process for producing an edge "Upper Bridge" which covers the convex hull conLeft, conRight from above, and an edge "Lower Bridge" which covers them from below.

To produce Upper Bridge, edges are sequentially traced upward in the "next" and pre directions from the edge combining econLeft→maxY and econRight→minxY as the initial values, and the topmost edge is obtained as Upper Bridge. Similarly, by tracing downward in the "pre" and "next" directions, it is possible to produce Lower Bridge.

FIG. 12 shows the detailed structure of the merging function Merge2Dim(conLeft, conRight). At step 1301, the initial values are set, and Upper Bridge is produced by the loop (statement "do" to "while . . . ") at step 1302, and Lower Bridge by the loop (statement "do" to "while . . . ") at step 1303. W→ConvexJudgeUp2Dim(u,v) is a function for judging whether the vertex w is above or below the straight line combining the vertexes u and v.

Figure 13:
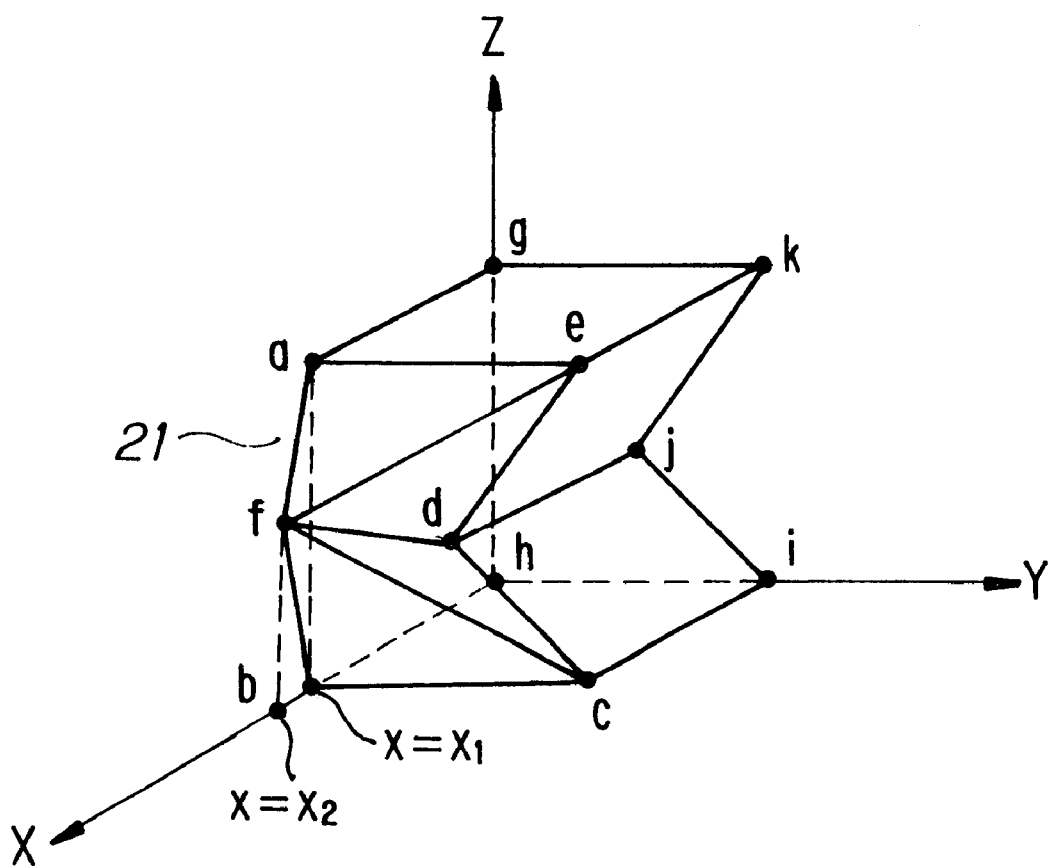
FIG. 13 is an explanatory view of a process of producing a convex hull.

FIGS. 13 to 16 are explanatory views of a process of producing a convex hull. In FIG. 13, the reference numeral 21 represents a non-convex polyhedron having vertexes a to k. The X-coordinates of the vertexes a to e are equally $X=x_1$, the X-coordinate of the vertex f is $X=x_2$, and the X-coordinates of the vertexes g to k are $X=0$.

Figure 14A:
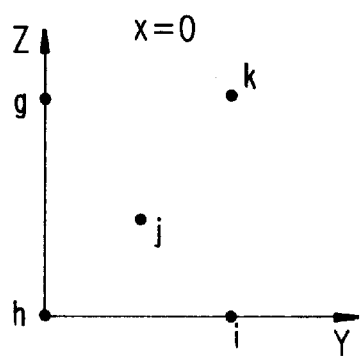
FIGS. 14A to 14C are explanatory views of a process of producing a convex hull.
Figure 14B:
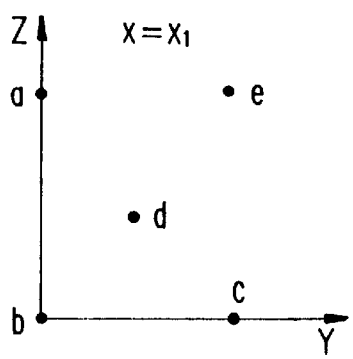
Figure 14C:
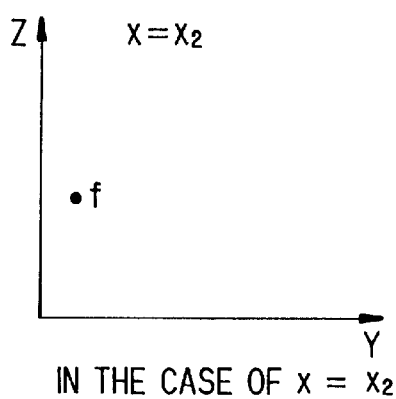
Figure 15A:
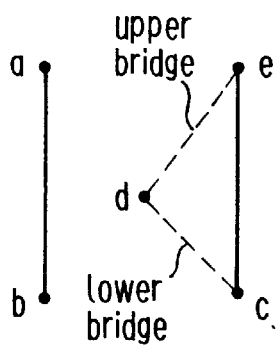
FIGS. 15A to 15D are explanatory views of a process of producing a convex hull.
Figure 15B:
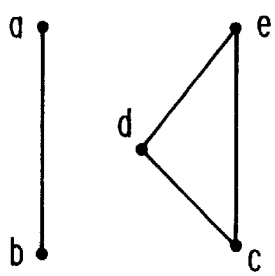
Figure 15C:
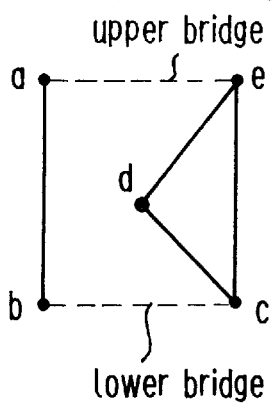
Figure 15D:
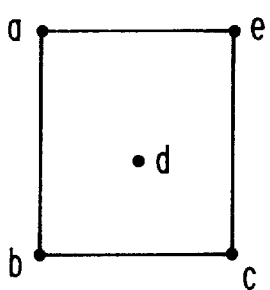

By applying the algorithm for producing a three-dimensional convex hull shown in FIG. 8 to the non-convex polyhedron shown in FIG. 13, the vertexes a to k are divided into a first vertex group consisting of vertexes g to k (see FIG. 14A) in which the difference in the X coordinate is within the very small value ε, a second vertex group consisting of vertexes a to e (see FIG. 14B), and a third vertex group consisting of a vertex f (see FIG. 14C). The algorithm for producing a two-dimensional convex hull is applied to each of these vertex groups. For example, when the algorithm for producing a two-dimensional convex hull is applied to the second vertex group consisting of the vertexes a to e, it is divided into three groups; a first vertex group consisting of the vertexes a, b in which the difference in the Y-coordinate is within ε, a second vertex group consisting of the vertex d and a third vertex group consisting of the vertexes c, e. The algorithm for producing a one-dimensional convex hull is applied to each of the vertex groups. Thereafter, the merging function Merge2Dim(,) for producing a two-dimensional convex hull is applied to the one-dimensional convex hull so as to produce a two-dimensional convex hull. For example, when the merging function is applied to the one-dimensional convex hull produced from the second and third vertex groups, the edge de constitutes an upper bridge and the edge dc a lower bridge, as shown in FIG. 15A, and a two-dimensional convex hull cde is produced (FIG. 15B). Thereafter, the merging function is applied to the one-dimensional convex hull produced from the first vertex group a, b and the two-dimensional convex hull cde. As a result, the edge ae constitutes an upper bridge and the edge bc constitutes a lower bridge, as shown in FIG. 15C, and a two-dimensional convex hull abce is produced (see FIG. 15D).

Similarly, a two-dimensional convex hull is produced by applying the algorithm for producing a two-dimensional convex hull to the first vertex group g to k.

Figure 16A:
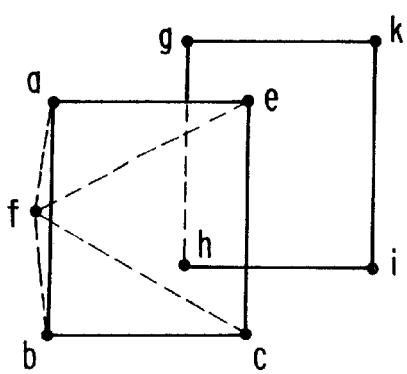
Figure 16B:
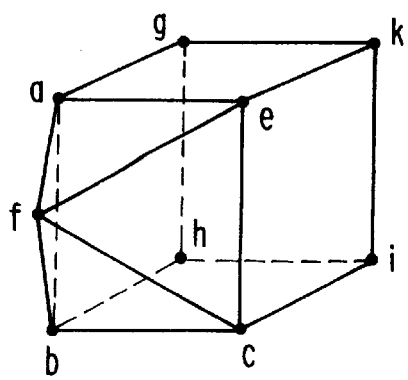

After the production of the two-dimensional convex hulls are finished, the merging function Merge3Dim(,) for producing a three-dimensional convex hull is applied to the two dimensional convex hulls, thereby producing a three-dimensional convex hull. For example, when the function Merge3Dim(,) is applied to the two-dimensional convex hull abce and the two dimensional convex hull f, a three-dimensional convex hull abcef is produced (FIG. 16A), and when the function Merge3Dim(,) is applied to the three-dimensional convex hull abcef and the two-dimensional convex hull ghik, a three-dimensional convex hull abcefghik is produced (FIG. 16B).

(g) merging process

The essence of the algorithm for producing a three-dimensional convex hull is the merging function shown in FIG. 17, which is composed of the following four phases.

Phase 0: Direct production of a convex hull when the number of vertexes is small In the direct production of a convex hull, attention must be paid when the number of vertexes is not more than 3. In this case, since it is impossible to paste a tetrahedron, which is the minimum convex hull, it is necessary to increase the number of vertexes in the merging process so as to directly produce a tetrahedron.

This phase is a process of directly producing a convex hull when the number of vertexes conLeft, conRight is small, and is expressed by functions MakeConvexLowNumber(,), MakeConvexBackL(,) and MakeConvexBackR(,). The process of function MakeConvexLowNumber(,) is branched in accordance with the values of conLeft→vent, conRight→vent. If the total number of vertexes of conLeft, conRight is less than 4, the vertexes of conLeft, conRight are pasted again in accordance with the pointers "next" and pre and stored in "vertexes". When the total number of vertexes reaches 4, a tetrahedron is directly produced by using the functions MakeTetra22(,) and MakeTetra13(,). When conLeft→vent=2 and conRight→vent=3, or conLeft→vent=3 and conRight→vent=2, or conLeft→vent=3 and conRight→vent=3, a tetrahedron is first directly produced, and a convex hull is then produced by using a backup process (FIG. 28) which will be explained later.

The function MakeConvexBackL(,) is used for merging when conLeft→vent is not more than 3 and conRight→vent is not less than 4. Since conRight already constitutes a convex hull for a tetra- or more polyhedron, the function is used for merging the vertexes of conLeft with the convex hull conRight one by one. This function is constructed by incorporating a backup process. Similarly, MakeConvexBackR(,) is used for merging when conRight→vent is not more than 3 and conLeft→vent is not less than 4.

In this manner, conLeft, conRight construct convex hulls of a tetra- or more polyhedron by processing using MakeConvexLowNumber(,), MakeConvexBackL(,) or MakeConvexBackR(,). In phase 1 and thereafter, these conLeft, conRight are used.

Phase 1: Production of Upper Bridge

Figure 18:
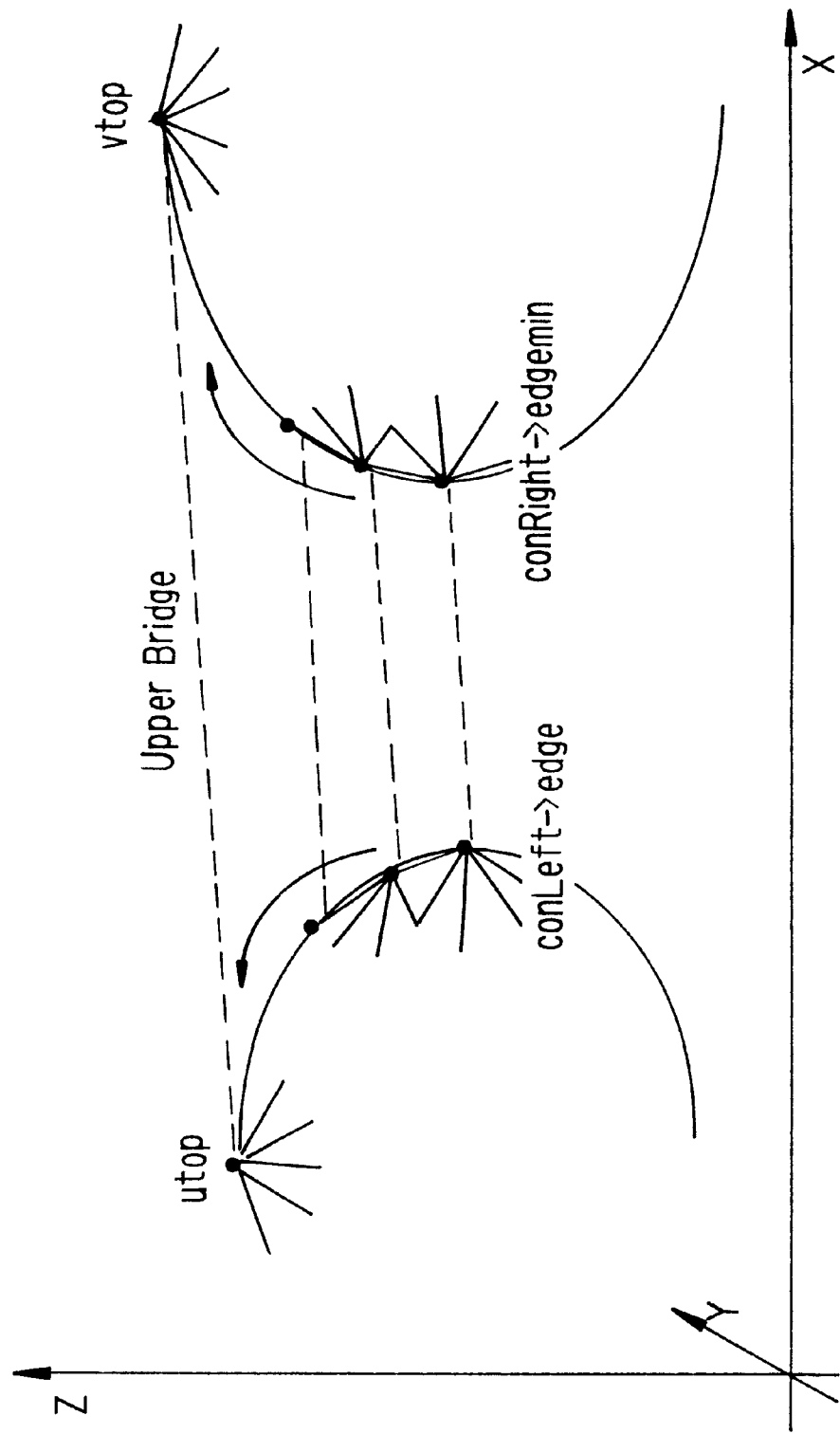
FIG. 18 is an explanatory view of a process of producing a three-dimensional convex hull.

Upper Bridge shown in FIG. 18 is produced. In order to execute the processing by as small number of times of calculation as possible, the maximum edge conLeft→edge of conLeft in the X-axis direction and the minimum edge conRight→edgemin of conRight in the X-axis direction are set at initial values, and the vertexes in the vicinity are traced upward.

For this purpose, each vertex and the vertexes in the vicinitp are projected on the X-Z plane so as to produce a two-dimensional convex hull, and judgment as to whether or not the vertex in the vicinity is above the current Bridge is repeated.

Phase 2: Wrapping process

Figure 19:
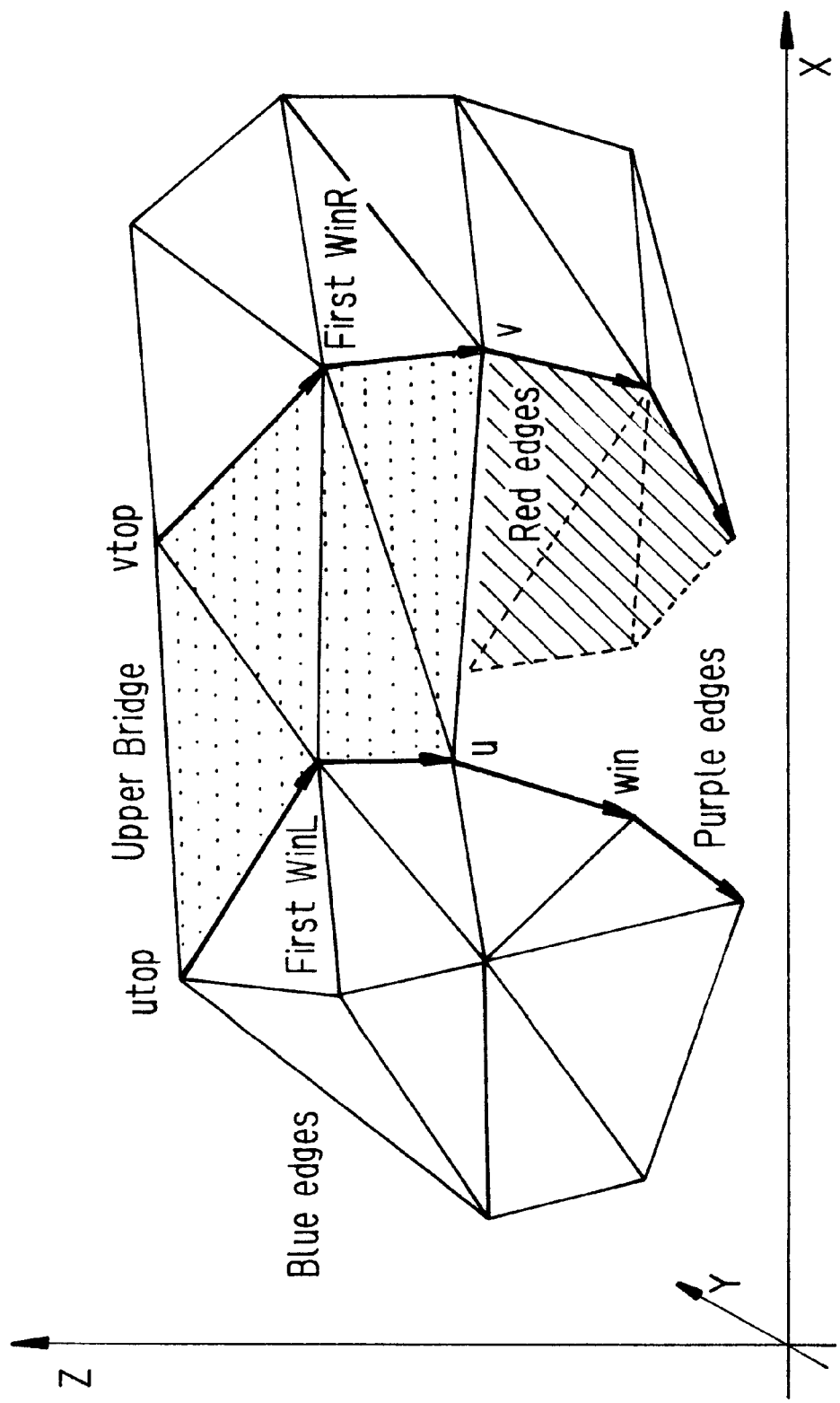
FIG. 19 is an explanatory view of a wrapping process.

The wrapping process is a base in the merging process for a three-dimensional convex hull. To sum up, it is a process of wrapping the convex hulls conLeft, conRight, as shown in FIG. 19. In the process of wrapping, the color of the edge of each of the convex hulls conLeft, conRight is changed from BLUE to PURPLE or RED. The initial color of each edge is BLUE, and the color of the edge which constitutes the boundary of wrapping is changed to PURPLE, and the color of an edge which is in the vicinity of a PURPLE edge and which is contained in the convex hull is changed to RED. The color of the other edges remains BLUE. At the point of time when merging is finally finished, the color of each edge of the merged convex hull is reset to BLUE.

The wrapping process will be schematically explained in the following.

The vertexes in the vicinity of the vertexes utop and vtop of Upper Bride are searched for to obtain the other vertex (the third vertex) of the triangular patch which constitutes a wrapping. It is assumed that the candidate in the vicinity of utop is FirstWinL and the other vertex in the vicinity of utop is situated under the plane on which the triangle utop-vtop-FirstWinL is pasted. Generally, there are two vertexes as FirstWinL in the clockwise and counterclockwise direction as seen from Upper Bridge, but it is possible to take out the vertex in the clockwise direction exclusively by setting the condition that the normal should be directed upward when the triangle is observed in the order of utop-FirstWinL-vtop. Similarly, the vertex in the vicinity of vtop is taken out as FirstWinR. Finally, it is judged whether or not FirstwinR is above the plane on which the triangle utop-FirstWinL-vtop is pasted so as to select the third vertex of the first triangle. In FIG. 19, FirstWinL is first selected. After FirstWinL is selected, similar operation is repeated while regarding FirstWinl-vtop as Upper Bridge. In the example shown in FIG. 19, as a result of retrieval the vertex in the vicinity of FirstWinL, a triangle FirstWinL-u-vtop is selected. Judgement is made as to whether or not the FirstWinR is above the triangle FirstWinL-u-vtop, and FirstWinR is selected. In this case, the triangle FirstWinL-FirstWinR-vtop is a second triangular patch. Thereafter u and v are updated until u an v agree with utop and vtop, respectively. Each of FirstWinL and FirstWinR is generally called winning vertex.

In the retrieval of a second and subsequent winning vertexes, it is not necessary to retrieve all the vertexes in the vicinity of the vertex. It is possible to select the vertex candidate exclusively by clockwise retrieval in the case of conRight and counterclockwise retrieval in the case of conLeft, while taking the preceding boundary edge as the initial value.

In the process of selecting a winning vertex, the colors of the boundary edge and the edge in the vicinity thereof are changed. In the case of a first triangular patch, only the color of the boundary edge (edge utop-FirstWinL in FIG. 19) is changed to PURPLE. In the second and subsequent triangular patches, not only is the color of the boundary edge changed to PURPLE but also the colors of all the edges that are concealed within the merged convex hull are changed to RED, among the edges in the vicinity of the winning vertex. This processing is repeated until the final triangular patch. After the final triangular patch is pasted, the edges in the vicinity of utop and vtop are examined, and the colors of the edges contained in the merged convex hull are changed to RED.

As a result, in this process, all the sets of vertexes of the triangular patches constituting a merged convex hull are selected, and they are stored for each triangular patch in the class "List" shown in FIG. 7, and produces a linear list in the "next" direction.

Phase 3: Triangular polygon patching process

Figure 20:
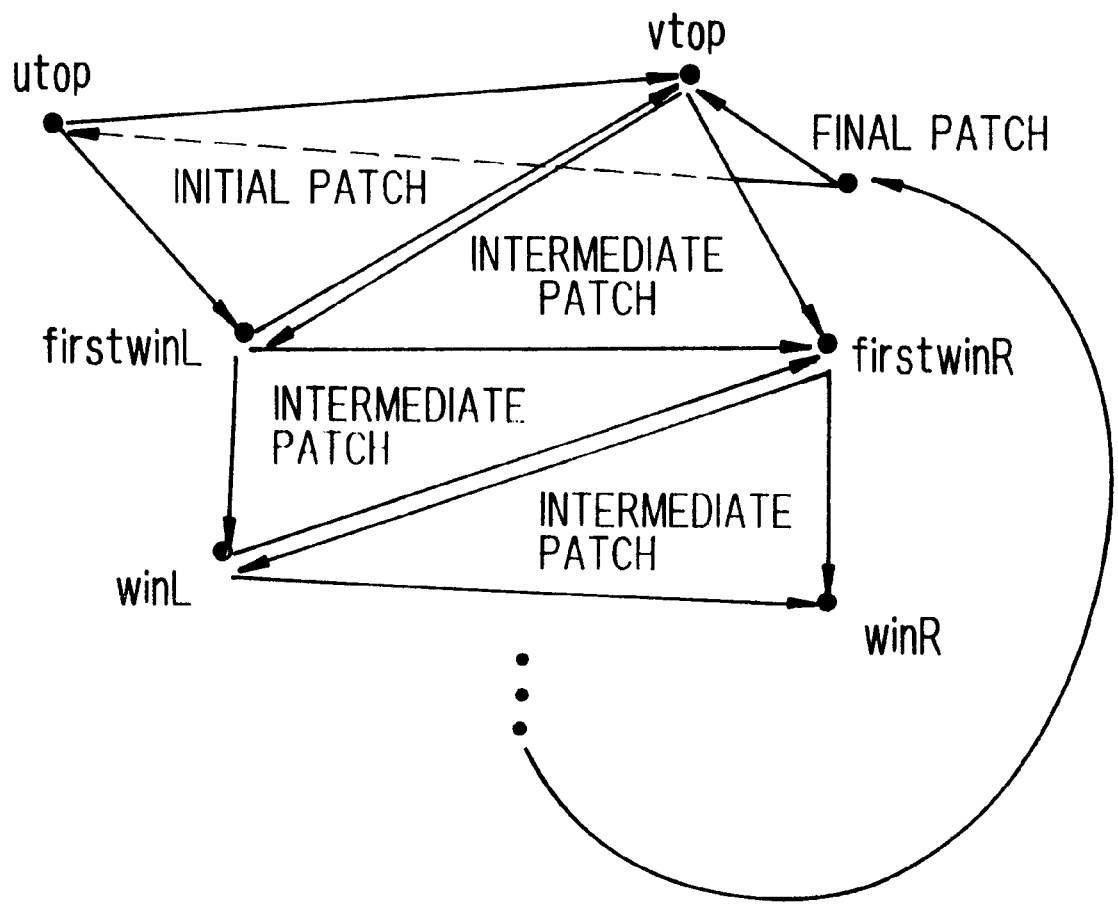
FIG. 20 is an explanatory view of a triangular polygon patching process.

This is a process of actually patching triangular polygons together on the basis of the linear list "List" consisting of the set of vertexes of the triangular patches. This process is greatly divided into three stages; initial patch, intermediate patch and final patch, as shown in FIGS. 20 and 21. The method of producing a triangular patch is slightly different in three stages. In the initial patch, a method of producing a triangular patch by using one edge and one vertex is used. In the intermediate patch, a method of producing a triangular patch by using two edges is used. In the final patch, a method of producing a triangular patch by using three edges is used. In the function PatchTriangle(,) expressing each production method, each of the pointer variables onext, lnext, sym, orig and "left" shown in FIG. 6A is set so that there is no contradiction in adjacent triangular patches.

Phase 4: Postprocessing

This is postprocessing executed after each cycle of merging process. This includes the following three steps:

(1) changing the colors of the boundary edges of conLeft and conRight after merging from PURPLE to RED;

(2) selecting the maximum edge "edge" and the minimum edge "edgemin" of the merged convex hull in the X-axis direction; and (3) selecting the maximum vertex "maxX" and the minimum vertex minx of the merged convex hull in the X-axis direction.

Attention must be paid at the step (2) to the fact that there is a possibility of the color of the selected edge being RED. In this case, the edge having the color of BLUE is retrieved clockwise or counterclockwise with the selected edge as the initial value and set it as a maximum edge "edge" and a minimum edge "edgemin". The step (3) is necessary for the backup process which will be explained later.

(h) Root of O(N·log N)

If it is assumed that the number of vertexes of conLeft is $n_1$, and the number of vertexes of conRight is $n_2$, the computation load O on the merging process (g) is O $(n_1+n_2)$. Accordingly, if it is assumed that the computation time for a set of the total number N of vertexes for producing a convex hull is T(N), the following recurrence formula is obtained:

$$T(N)=2T(N/2)+O(N)$$

This formula is solved as T(N)=O(N·log N).

(i) Random deviation method

In the above-described algorithm for producing a convex hull, there are cases in which not less than four vertexes lie on the same plane or not less than three vertexes lie on the same line. In such cases, judgement of branch is often difficult. For example, although function ConvexJudge2Dim( ) for judging whether a vertex is above or below the straight line which combines two vertexes, or a function ConvexJudge3Dim( ) for judging whether a vertex is above or below the plane which is constituted by three vertexes is used in various points, judgement may become ambiguous in the cases in which not less than four vertexes lie on the same plane or not less than three vertexes lie on the same line, which may cause an infinite loop in the algorithm.

In order to avoid this state, minute random deviations "random( )" are added to the coordinate values v(0), v(1), v(2) of the respective vertexes. More specifically, the three-dimensional vector elements dv in the class "Vertex" defined in FIG. 7 are set as follows:

dv(0)=v(0);

dv(1)=v(1)+random( );

dv(2)=v(2)+random( ).

In other words, the X-axis element is kept as it is, and deviations are added to the values of the Y coordinate and the Z coordinate. It is because the vertexes are sorted with respect to the X-axis on the basis of v(0) that the X-axis element is kept invariable.

The process of adding a random deviation to each vertex is executed in the process of producing a one-dimensional convex hull by using the function MakeConvex1Dim(con) for producing a one-dimensional convex hull shown in FIG. 9.

(j) Backup process

In the wrapping process in the algorithm for producing a convex hull, a line starting from the vertexes utop, vtop of Upper Bridge so as to produce a triangular patch sometimes does not return to these vertexes but constitutes an infinite loop. The cause is the same as that described in (i), but the random deviation added to each vertex is not always effective.

In an infinite loop in the wrapping process, a small loop is constituted in the middle of the wrapping process and takes a pattern of repeating vertexes other than utop or vtop. It is possible to judge by hashing whether or not a vertex other than utop or vtop is selected not less than twice. Therefore, at the point of time when a small loop is produced, the process leaves out of the main loop in the wrapping process and moves to a backup process shown in FIG. 22.

Figure 22:
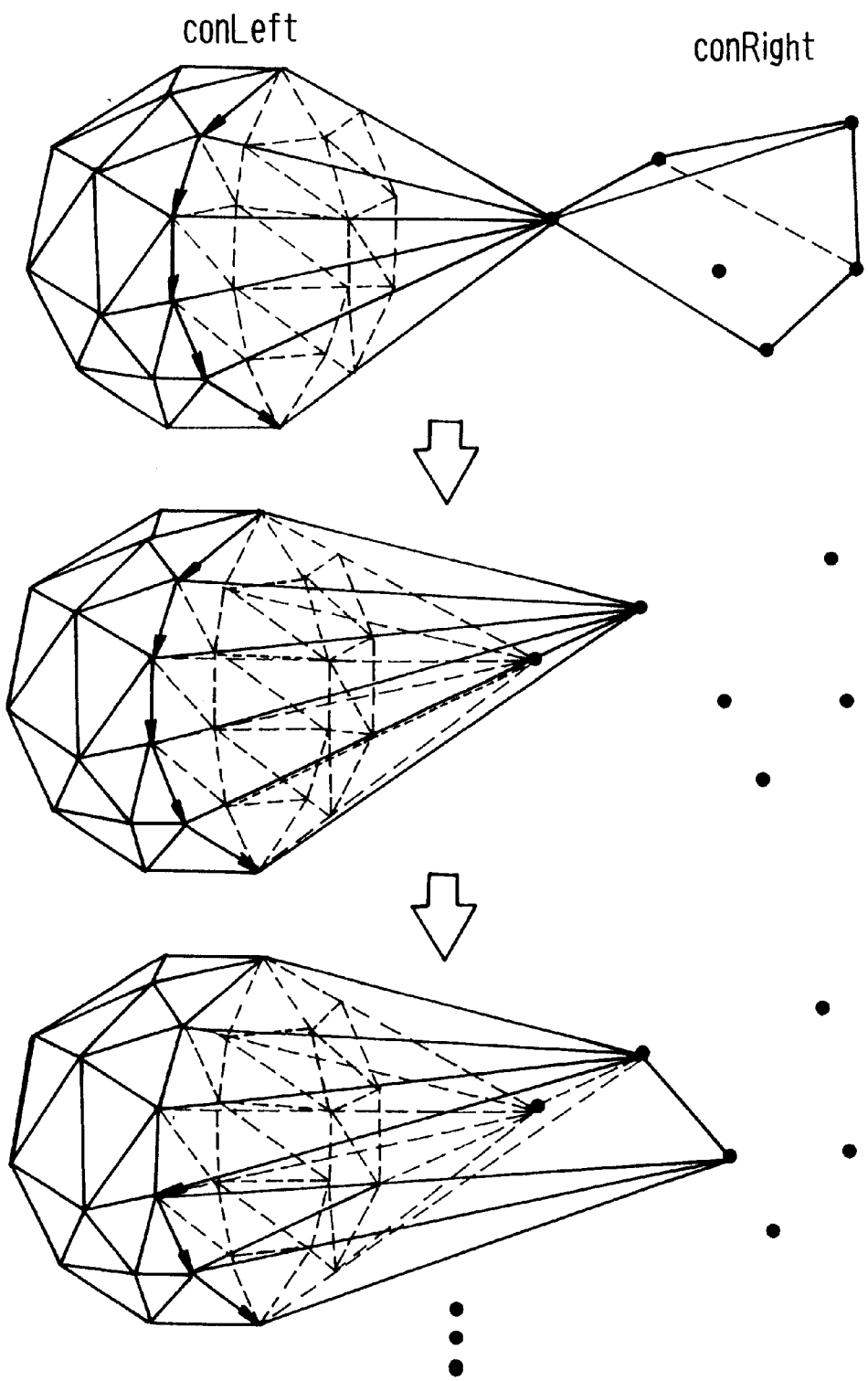
FIG. 22 is an explanatory view of a wrapping process and a patching process in the backup process for producing a convex hull.

In this process, conLeft→vent and conRight→vent are compared with each other, as shown in FIG. 22, the convex hull which has a smaller number of vertexes are disassembled, and the vertexes of the disassembled convex hull are added to the other convex hull one by one. In the process of adding the vertexes, each vertex is regarded as a convex hull consisting of one vertex and the merging process is repeated. When the vertexes are merged, they are merged in an ascending order of coordinate value if a convex hull conRight→vent is disassembled, while in a descending order of coordinate value if a convex hull conLeft→vent is disassembled.

In this process, since one vertex is stable, production of an infinite loop is avoided in most cases and secure convex hull merging is enabled. Once a merged convex hull is produced, the process returns to the ordinary merging process, which is continued until an infinite loop is produced again in the wrapping process. Accordingly, it is possible to limit an increase in the computation load attendance on the backup process to the minimum.

(C) Preprocessing to interference check (Production of nearby point linear list)

This preprocessing is preprocessing for successively searching for the points of closest approach in the interference check process for convex polyhedrons. The preprocessing greatly enhances the speed of the successive search. The preprocessing is generally executed after the production of a convex hull, as shown in FIG. 5.

The nearby-point linear list is a data structure obtained by linking the vertexes which constitute a CG model with the other vertexes which are connected thereto via the respective edges. Each vertex constituting a convex hull is successively linked in the "next" direction and the vertexes in the vicinity thereof are linked in the "branch" direction.

(a) Example of nearby-point linear list

FIG. 23 shows an example of a nearby-point linear list of a rectangular parallelepiped. As shown in FIG. 23, the nearby-point linear list has two directions, namely the "next" direction in which all of the vertexes constituting a convex hull are successively arranged, and the "branch" direction in which nearby points connected to each vertex of interest via single polygon edges are arranged successively from the vertex of interest. Placed at the beginning of the "branch" direction is the vertex per se of the branch.

(b) Algorithm for producing nearby-point linear list

Figure 24:
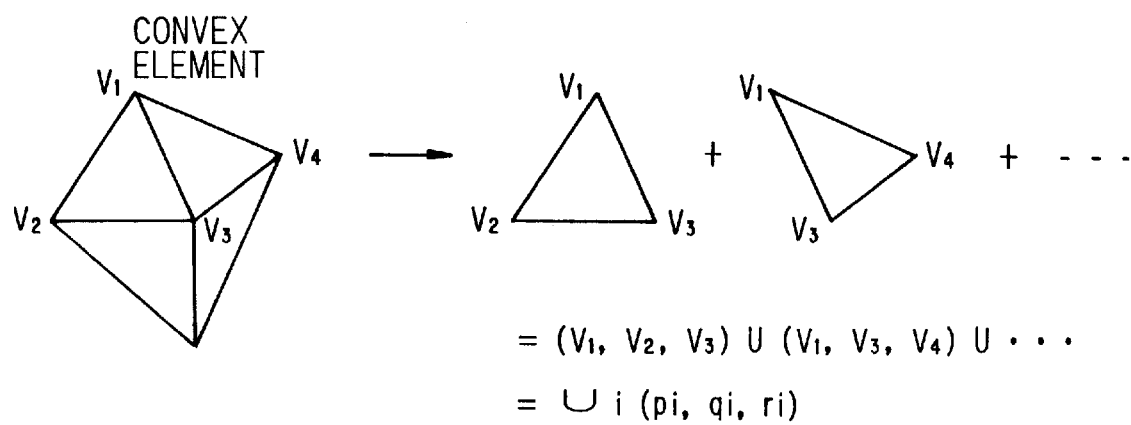
FIG. 24 is an explanatory view of polygon data of each convex element.

FIG. 24 is an explanatory view of polygon data of each convex element of an object of interest, and FIGS. 25A to 25D are explanatory views of an algorithm for producing a nearby-point linear list.

If it is assumed that an object of interest is constituted by a set of triangular polygons, the nearby-point linear list is produced in accordance with the following flow:

1) Polygon data of a convex polyhedron is prepared.

Figure 25A:
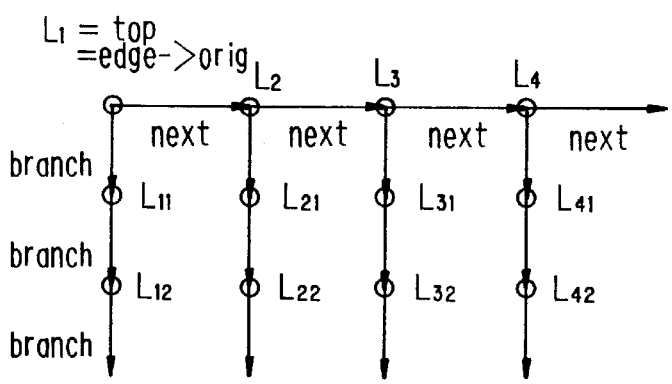
FIGS. 25A to 25D are explanatory views of an algorithm for producing a nearby-point linear list.

2) With regard to each item of polygon data (pi, qi, ri), each vertex is linked in list L. The "next" direction is the linear list direction with regard to vertexes and the "branch" direction is the nearby-point direction of each vertex. The leading element of the list L is the first vertex of the first polygon. During the course of production, the data structure is as shown in FIG. 25A. More specifically, the list is produced as follows:

2-1) The leading element "top" of the list L is assigned. That is, the first vertex of the first polygon is assigned as "top".

2-2) The following assignments are repeated with regard to polygons (pi, qi. ri).

Figure 25B:
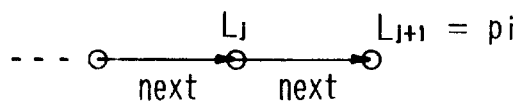
Figure 25C:
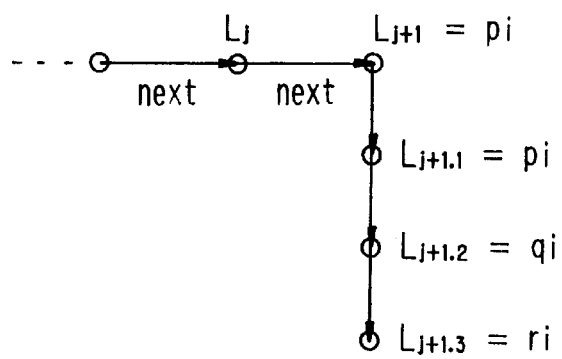
Figure 25D:
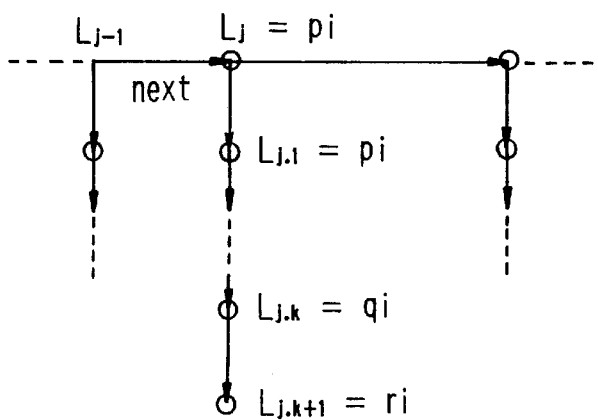

(1) If (pi≠Lj holds for all j), a new element pi is assigned to the end of the "next" direction as a vertex Lj+1 (see FIG. 25B). Next, with regard to the "branch" direction of vertex Lj+1, its own pi and qi, ri are assigned (see FIG. 25C).

(2) If (pi=Li holds with respect to a certain vertex Lj in the "next" direction), qi and ri are assigned in the "branch" direction of the vertex Lj. However, if there already exists the same vertex as qi or ri in the "branch" direction, no assignment is made (see FIG. 25D).

(3) The processing 1), 2) above is executed with respect to the vertex qi. It should be noted that "branch" candidates other than qi with respect to the vertex qi are pi, ri.

(4) The processing 1), 2) above is executed with respect to the vertex ri. It should be noted that "branch" candidates other than ri with respect to the vertex ri are pi, qi.

2-3) The processing of 2-2) is repeated for all polygon sets Ui(pi, qi, ri).

It is assumed here that the class for producing a nearby-point linear list has a different structure from that shown in FIG. 7. The class structure shown in FIG. 7 is not used for other processing than the production of a convex hull. Each polygon covering an object of interest is already automatically divided into triangles in the process of producing a convex hull, so that it is assumed that the edges combining the vertexes are already produced and have the data structure shown in FIG. 7. The algorithm for producing a nearby-point linear list is a reflexive method. A nearby-point linear list con→edge→orig, con→edge→sym→orig, con→edge→onext→sym→orig is produced, starting from the maximum edge con→edge of a convex hull and each vertex is reflexively searched for, starting from the edge con-edge→sym, con→edge→lnex→sym, con→edge→onext. In order to prevent the same vertex from being retrieved twice or more, hashing is executed each time one vertex is retrieved.

(c) Format of dump file

The format of a dump file has a structure shown in FIG. 26. In this file format, the following items are essential for high-speed loading.

1) There is an item of the total number ("count") of vertexes for producing a convex hull.

2) Each vertex is numbered.

3) There is an item which, for each vertex, defines the number ("bcount" of nearby point of the vertex.

4) There is an item which defines the coordinates of each vertex.

(d) Method of loading from dump file

1) The total number ("count") of vertexes of a convex hull is read and an array of the "count" dimension accommodating each vertex is created.

2) Each vertex of the convex hull is placed in the array and a linear list interconnecting the vertexes in the "next" direction is produced. For example, if it is assumed that the array accommodating a vertex is $V[N_1]$, V[0], V[1], . . . are successively connected in the "next" direction to produce the linear list.

3) For each vertex of the convex hull, a list of nearby points is produced in the "branch" direction with the help of the nearby-point number (the position in the array is designated) of "branch" direction. For example, if it is assumed that the array accommodating all the vertexes of the convex hull is $V[N_1]$, V[0], V[9], V[1], V[7] and V[8] are interconnected in a linear file in the "branch" direction of vertex V[0] if the numbers of "branch" of the vertex V[0] are (0, 9, 1, 7, 8).

According to the above-descirbed loading method, read-in to the same file is performed twice in total (1), 2) the first time, and 3) the second time). Since the number of branches of each vertex is held to less than several dozen in most cases, the total loading time is O(N) (N is the total number of vertexes of the convex hull). The file for a convex hull having the structure shown in FIG. 26 will be referred to as "HL file" hereinafter.

(D) First interference check for non-convex polyhedron

When convex hulls of non-convex polyhedrons and a nearby-point linear list of each convex hull are produced by the above-described preprocessing, the interference between the convex hulls is checked by adopting the Gilbert method which is proposed in Japanese Patent Application No. 209008/1994 (U.S. patent application Ser. No. 08/304,532). If there is interference between the convex hulls, each convex hull is disassembled, and the interference between convex polyhedrons constituting the non-convex polyhedron is checked in accordance with a bubble collision method which will be described later. In the interference check for the convex hulls, the vertexes which are approaching to the points of closest approach which have already been extracted from the nearby-point linear list, and the Gilbert method is applied to the interference check for the vertexes obtained so as to search for the points of closest approach after a predetermined time. In this manner, it is possible to limit the time required for interference check to not more than a constant time which is not dependent upon the number of polygons constituting the convex polyhedron.

(E) Preprossesing to interference check by bubble collision method

When convex polyhedrons begin to interfere, a bubble collision method is adopted so as to check the interference between the non-convex polyhedrons. In the bubble collision method, each polygon which constitutes a non-convex polyhedron is covered with a combination of a plurality of spheres each of which has a center on the corresponding polygon, and the spheres enveloping those spheres are produced hierarchically. In this manner, it is possible to check the interference between the non-convex polygons by checking the interference between the spheres hierarchically so as to search for the combination of polygons which are approaching closest, at a high speed, and checking the interference between the polygons.

In order to adopt such a bubble collision method, preprocessing for covering each polygon constituting a non-convex polyhedron with a combination of a plurality of spheres each of which has a center on the corresponding polygon, and arranging spheres enveloping those spheres, hierarchically. A tree which is a set of these hierarchically arranged spheres will be referred to as "sphere tree" hereinafter.

The sphere tree is produced by a divide-and-conquer method, and this process is finished in a space of time of O(N·log N) with respect to a CG model consisting of N polygons.

This process is different from the process of producing a sphere tree by the Quinlan method in that although the latter is similar to scan conversion, in the present invention, spheres are efficiently produced with the value of a scale S as a parameter with the number of polygons enveloped with the spheres taken into consideration.

(a) Production of leaf spheres

Figure 27:
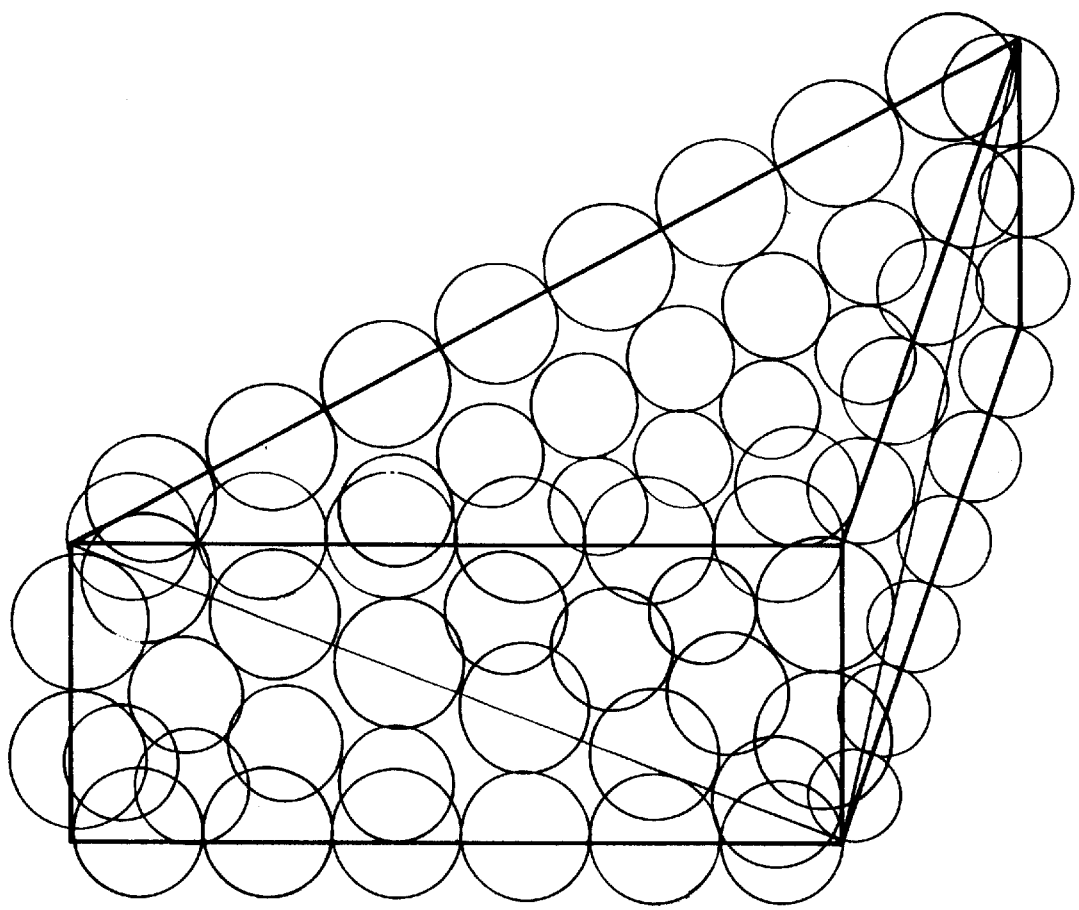
FIG. 27 is an explanatory view of leaf spheres.

A non-convex polyhedron as an object of interference check is covered with a set of triangular polygons. At this time, a basic sphere which has its center on a triangular polygon and which is situated on the bottommost side of the set of spheres covering the object is called "leaf sphere". FIG. 27 shows an example of leaf spheres. Leaf spheres are produced in the following manner.

1) Initial setting

Figure 28:
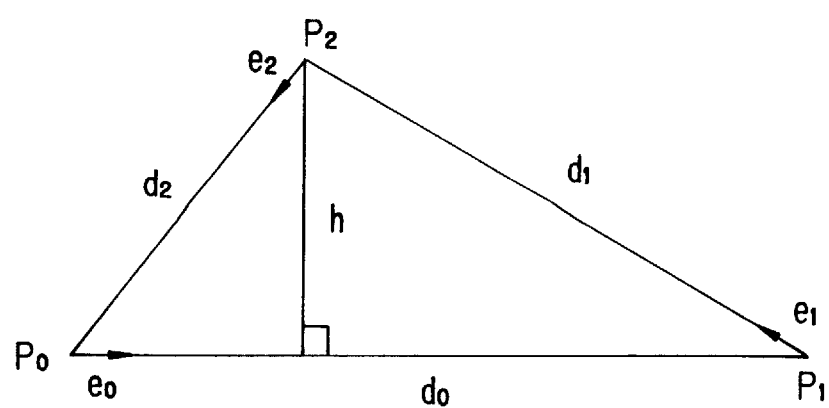
FIG. 28 is an explanatory view of a triangular polygon.

Input data are the coordinates of the vertexes of each triangular polygon, and a scale parameter S. A method of setting the scale parameter S will be described later. As shown in FIG. 28, it is assumed that when the lengths $d_0=|p_1-p_0|$, $d_1=|p_2-p_1|$, $d_2=|p_0-p_2|$ of the sides are calculated on the basis of the coordinates of the vertexes of the triangular polygon, the relationship $d0 \geq d_1 \geq d_2$ holds. If this relationship is not satisfied, the vertex numbers are changed with each other.

A unit vector $e_0$ on the side $p_0p_1$ is set to $e_0=(p_1-p_0)/d_0$.

The height h of the triangular polygon is calculated in accordance with the formula $h = \sqrt{\{d_2^2-((p_1-p_0)\cdot(p_0-p_2)/d_0)^2\}}$.

2) Main processing 2-1) Leaf spheres are produced along the side $p_0p_1$.

$N_0=[d_0/S]$ is calculated, and if $N_0=0$, the radius $r_0$ is set to $r_0=d_0/2$. If $N_0 \neq 0$, the radius $r_0$ is set to $r_0=d_0/(2 \cdot N_0)$. Accordingly, at this time, the leaf spheres with the radius $r_0$ are arrayed along the side $p_0p_1$. Herein, [a] means a maximum integer which is smaller than a.

Figure 29:
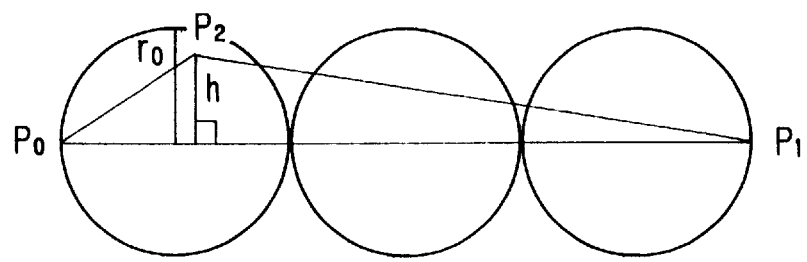
FIG. 29 is an explanatory view of a process of covering a triangular polygon with leaf spheres on one side.

2-2) $r_0$ is larger than h, entire part of the triangular polygon is covered with the leaf spheres on the side $p_0p_1$ (see FIG. 29), and the processing is finished.

2-3) If $(r_0 \leq h)$, the unit vectors $e_1=(p_2-p_1)/d_1$, $e_2=(p_0-p_2)/d_2$, and $N_1=[d_1/S]$, $N_2=[d_2/S]$ are calculated, and leaf spheres are produced along the sides $p_1p_2$, and $p_2p_0$ in the same way as along the side $p_0p_1$.

Figure 30:
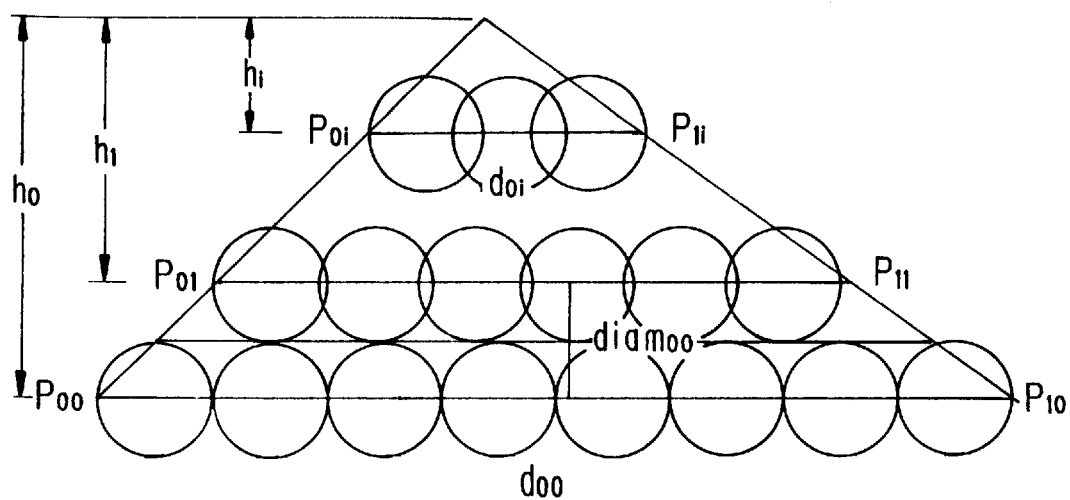
FIG. 30 is an explanatory view of a process of covering the interior of a triangular polygon with leaf spheres.

2-4) The interior of the triangular polygon is then covered with leaf spheres. As shown in FIG. 30, the base of the triangular polygon is raised by the diameter $diam_0=2 \cdot r_0$ of a leaf sphere, and the centers of leaf spheres are arranged along the raised base in the same way as along the side $p_0p_1$. When the radius r of the sphere is determined, the radius $r_1$ calculated at the current time is compared with the radius $r_{i-1}$ calculated at the preceding time, and a larger one is selected. Namely, the radius r is updated in accordance with $r=max(r_{i-1}, r_i)$. In this manner, it is possible to reduce the space between the vertically adjacent leaf spheres when they are laid with one upon another.

2-5) The processing 2-3), 2-4) is repeated until the height $h_i=h_{i-1}-diam_{i-1}$ of the triangle with the raised base satisfies the relationship $h_i < diam_{i-1}/2$.

(b) Method of producing sphere tree by divide-and-conquer method

The sphere tree is a data structure in which spheres enveloping leaf spheres as elements are hierarchically arranged in the form of a tree.

A binary tree is adopted in the present invention. This is because there is a high possibility of a binary structure being balanced best with respect to an arbitrary non-convex polyhedron.

Figure 32:
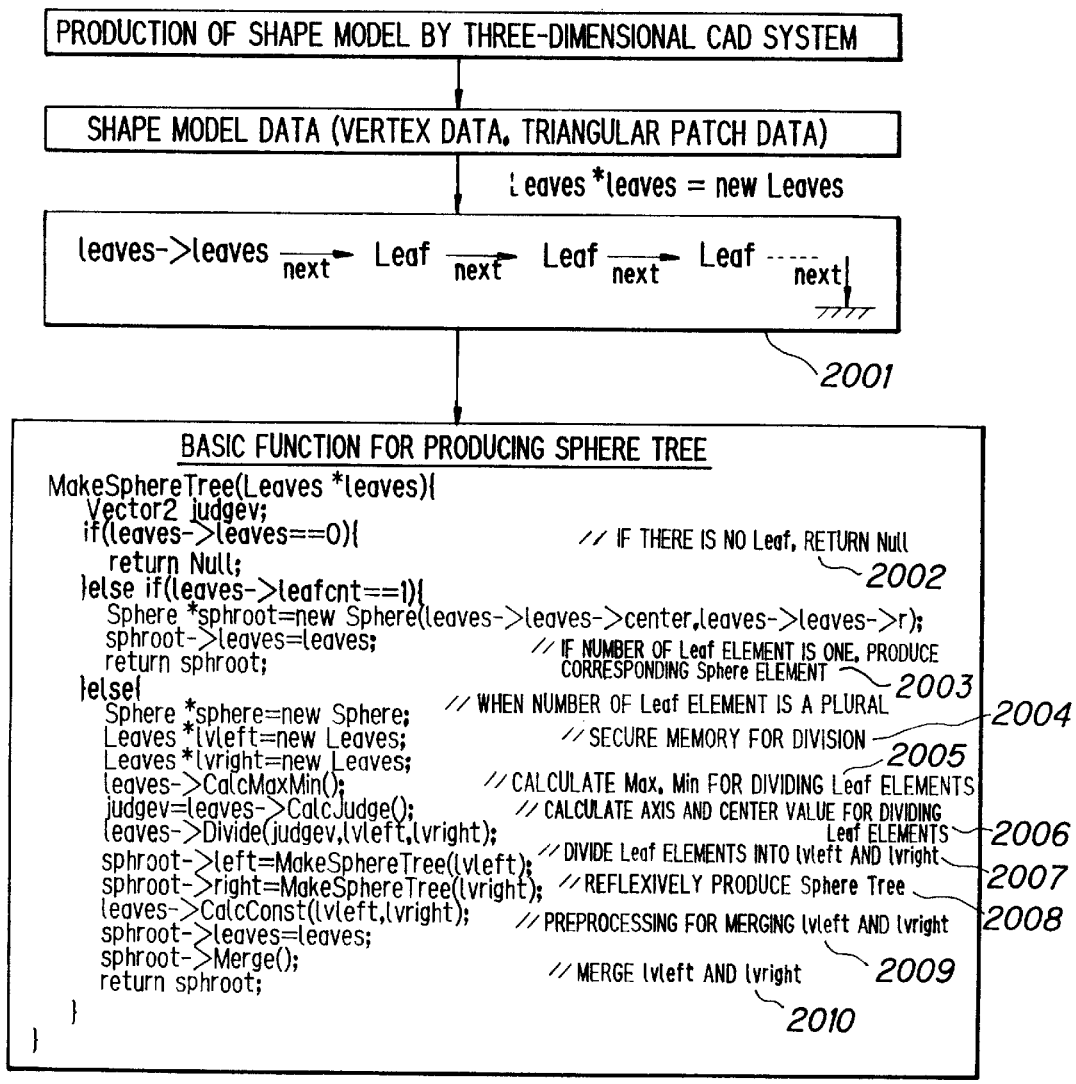
FIG. 32 shows a flow of the production of a binary tree.

FIG. 31 shows the data structure for producing a sphere tree, and FIG. 32 is a flowchart thereof. A sphere as a base of the sphere tree and which has a center on a triangular polygon is represented by "Leaf", and a set of "Leaf"s are represented by "Leaves". A sphere element arranged on each node of the sphere tree is represented by "Sphere". The center of each "Leaf" and "Sphere" is stored in "center" and the radius thereof is stored in "r". "Plane*plane" as a member of "Leaf" points the triangular polygon on which the center of "Leaf", "Sphere" exists. If it is assumed that the center of the "Leaf" element i which is connected to "Leaf*leaves" is $(x_i, y_i, z_i)$, the following values are input to members "max", "min" of "Leaves":

max=$(MAX_i\{x_i\}, MAX_i\{y_i\}, MAX_i\{z_i\})$ min=$(MIN_i\{x_i\}, MIN_i\{y_i\}, MIN_i\{z_i\})$ The number of "Leaf" elements connected to "Leaf*leaves" is input to "leafcnt" and the center of gravity obtained by dividing the sum of the coordinates of the centers of "Leaf" elements by the number of elements is input to avcenter. The members "left", "right" of "Sphere" represents a binary tree and "Leaves" points a set of "Leaf" elements contained below its grade.

The algorithm for producing a sphere tree will be schematically described in the following.

1) Polygon information which is linearly linked in the "next" direction of "Planes" is input, and a set of "Leaf" elements is produced for each polygon. All sets of "Leaf" elements are linearly linked for all sets of polygons (FIG. 32, step 2001).

2) The linear set leaves→leaves of "Leaf" is input and a sphere tree is produced by a divide-and-conquer method.

2-1) When the number of "Leaf" elements is 0 or 1, processing at steps 2002 and 2003 are executed.

2-2) When the number of "Leaf" elements is not less than 2, the memory of the binary tree is secured (step 2004).

2-3) In order to divide the sets of "Leaf" elements leaves→leaves, max and min of leaves→leaves are calculated (step 2005) and judgement is made as to in which axial direction among from the X-eaXis direction, Y-axis direction and Z-axis direction the set of "Leaf" elements extend most, thereby the axial direction in which the number of "Leaf" elements is maximum is obtained. The center value of "Leaf" elements in the axial directions obtained is calculated (step 2006).

2-4) The set of "Leaf" elements is divided in the axial direction obtained at 2-3) with the center value as the boundary (step 2007).

2-5) A divide-and-conquer method is reflexively applied to each of the divided sets of "Leaf" elements (step 2008).

2-6) The center of gravity "avcenter" and the number "leafcnt" of parent "Spheres" are obtained on the basis of the center of gravity "avcenter" and the number "leafcnt" of elements of "left" and "right" which are reflexively obtained (step 2009).

2-7) "left" and "right" are merged so as to produce a parent "Sphere" (step 2010).

When the parent "Sphere" is produced, two methods are prepared as a method of obtaining the radius and the center thereof. A first method is a method of producing the minimum sphere which envelops "left" and "right" of a child sphere, and a second method is a method of producing a minimum sphere enveloping a set of "Leaf" elements contained in lower grades. Two spheres are obtained by the above two methods, and the sphere having a smaller radius is adopted as the parent "Sphere".

Figure 33:
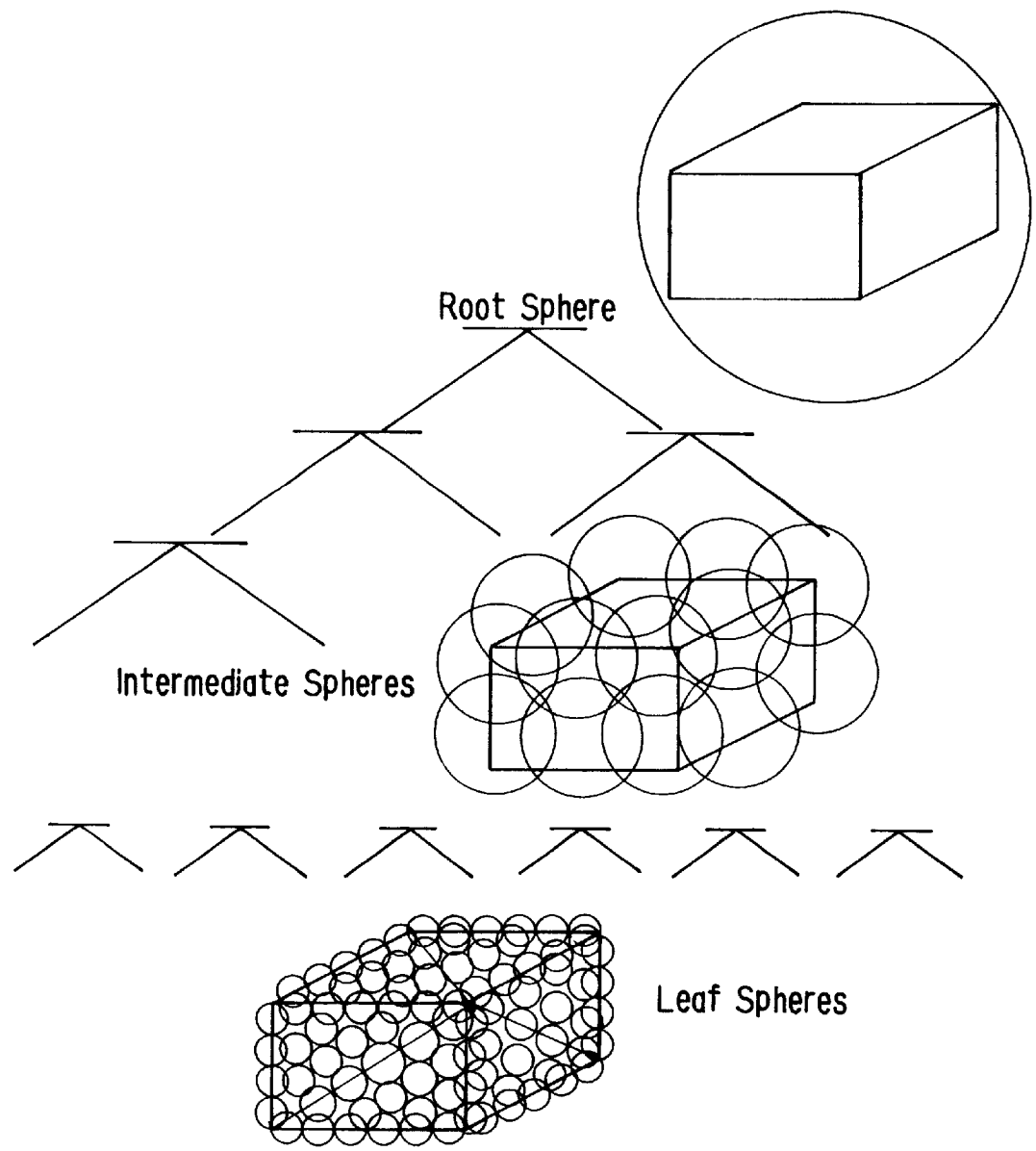
FIG. 33 shows an example of a binary tree.

FIG. 33 shows an example of a sphere tree for a rectangular parallelepiped.

(c) Scale parameter S

The number of leaf spheres covering an object of interference check largely depends on the number N of polygons which covers the object. When N is adequately large, it is not necessary to cover one polygon with small spheres. On the other hand, when N is small, it is necessary to appropriately increase the number of leaf spheres so as to make the cover by the spheres more approximate to the object. The number of polygons as the boundary is about 100. The scale parameter S is calculated in accordance with the following algorithm.

1) The radius of the sphere which envelops a convex hull is obtained by calculating max=$(MAX_1\{x_1\}, MAX_1\{y_1\}, MAX_1\{z_1\})$
min=$(MIN_1\{x_1\}, MIN_1\{y_1\}, MIN_1\{z_1\})$ with respect to a set of vertexes which constitute the convex hull.

2) When the number of polygons as an object of interference check is smaller than a predetermined threshold value PLANELIMIT,

S=R/SPHERESCALE wherein SPHERESCALE is a predetermined scale constant. In other cases,

S=R.

The typical values of PLANELIMIT and SPHERESCALE are PLANELIMIT=100, and SPHERESCALE=8.

(F) Bubble collision method in interference check process for non-convex polyhedrons In order to check the interference between non-convex polyhedrons at a high speed, a sphere tree is produced for each non-convex polyhedron, and the tree is checked by a depth-first searching method so as to search for the pair of spheres which are approaching closest. The Gilbert method is applied to the combination of the polygons on which the centers of the retrieved spheres lie so as to calculate the point of closest approach of the two non-convex polyhedrons.

This method is different from the Quinlan method in the calculation method of the distance between spheres. In this method, when the distance between spheres is obtained, the definition of the distance between spheres is changed in accordance with the grade or depth of the sphere tree in which the spheres exist. Consequently, it is possible to reduce the number of polygon pairs to be checked finally, although it is a problem of a conventional bubble collision method that the number of polygon pairs to be checked finally is large.

(a) Method of searching for points of closest approach by depth-first search method The points of closest approach of two non-convex polyhedrons are obtained in accordance with the following depth-first search algorithm. FIGS. 34 and 35 show the basic function of bubble collision check in a bubble collision method.

1) The initial value cq→dist of the distance between two objects is set to be infinity. The symbol cq represents a variable of an environment class in interference check. The details will be described later.

2) The distance between the current spheres is obtained. If the value is not more than cq→dist, the current spheres are disassembled in the vertical direction in accordance with the following rule (step 2101).

2-1) If neither of the current spheres is a leaf sphere, the sphere having a larger diameter is disassembled (steps 2102, 2105).

2-2) The distance between one of the two child spheres obtained as a result of disassembly and the sphere which is not disassembled and the distance between the other child sphere and the latter sphere are obtained, and the pair of spheres which are closer are first searched (steps 2103, 2104).

2-3) If one of the current spheres is a leaf sphere, the other sphere is disassembled, and the processing 2-2) is executed (steps 2106, 2107).

3) Both of the current spheres are leaf spheres (step 2108), the Gilbert method is applied to the pair of triangular polygons on which the leaf spheres lie, and the distance dist between the triangular polygon pair is obtained (step 2110).

4) If the distance dist obtained is smaller than cq→dist, the value cq→dist is updated and the above processing is reflexively repeated (step 2111).

In this algorithm, in the processing 3), an interference check for the same triangular polygon pair is to be executed a multiplicity of times in the processing 3). For this reason, hushing is executed for a polygon pair, thereby preventing an unnecessary interference check (step 2109).

(b) Distance between spheres

In order to enhance the efficiency of a bubble collision method, it is necessary to reduce the value cq→dist as soon as possible and to reduce the number of searching times by a depth-first search method. In order to reduce the number of searching times, the distance between spheres is defined as follows.

Figure 36:
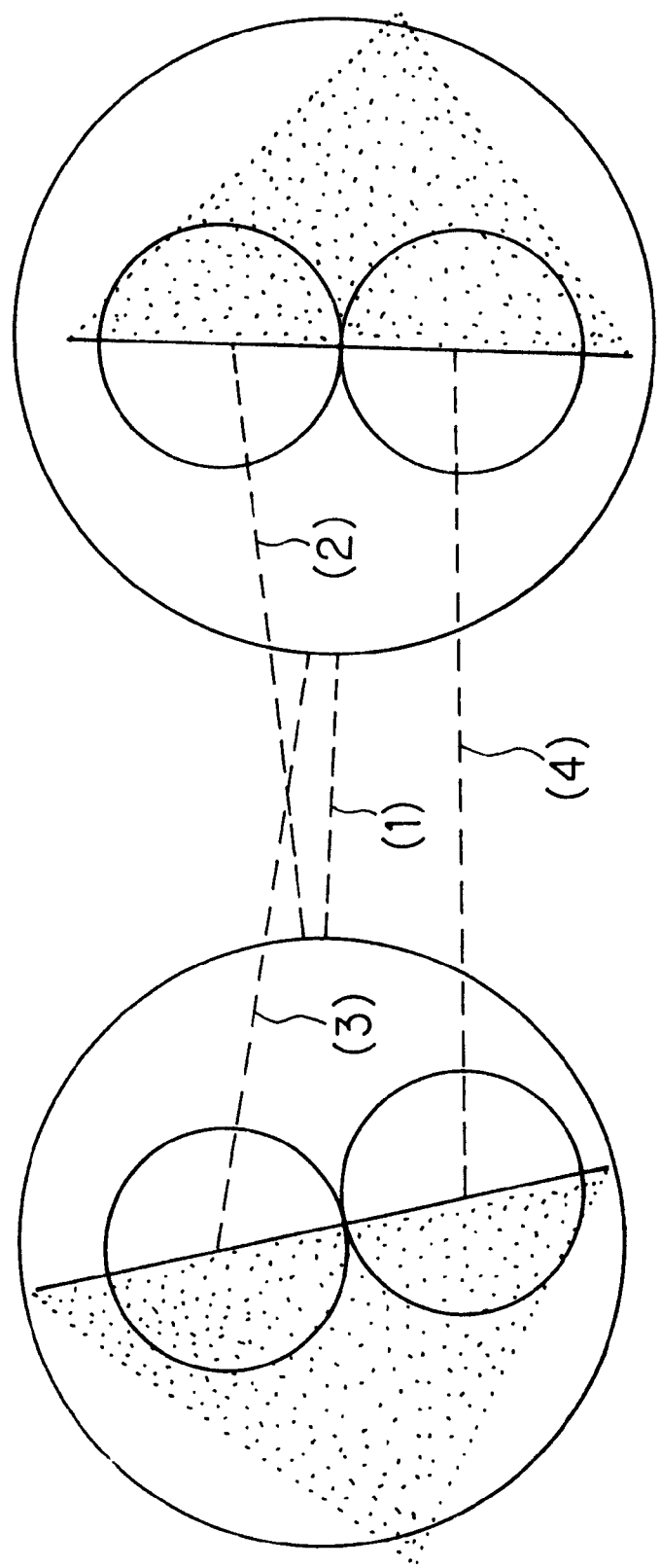
FIG. 36 is an explanatory view of the distance between spheres.

1) The distance between intermediate spheres is the value obtained by subtracting the radii of both spheres from the distance between the centers thereof ((1) in FIG. 36).

2) The distance between an intermediate sphere and a leaf sphere is the value obtained by subtracting the radius of the intermediate sphere from the distance between the centers thereof ((2), (3) in FIG. 36).

3) The distance between leaf spheres is the distance between the centers thereof ((4) in FIG. 36).

This definition enables the depth of search in another node of the sphere tree to be reduced, and prevents the same polygon pair from being checked a plurality of times at the step 2110 in FIG. 35.

This definition, however, has only one problem. It is in the case in which two objects come into contact with each other at a plurality of points. In this case, since the value cq→dist becomes approximately 0 due to one point of contact, there is a possibility of the sphere containing this point of contact being passed unmarked in searching another point of contact. To solve this problem, the following definition is added.

4) If the value cq→dist is smaller than a predetermined very small value EPS, the distance between spheres is defined as 1). The very small value EPS is typically $1/10^4$.

(c) Computation load

The computation load in a bubble collision method is $O(\log N_0 + \log N_1)$ ($N_0$ and $N_1$ each are the total numbers of leaf spheres covering the respective objects) in the most efficient case. The degree of covering, that is, the number of leaf spheres must not be too larger or too small. If it is too small, it takes a long time to reduce the value cq→dist and the number of searching times increases. If it is too large, the depth of search is increased. In order to enhance the efficiency realistically, when the number of polygons representing the object of interference check is larger, one polygon is covered with one leaf sphere, and the number of leaf spheres is increased as the number of polygons becomes smaller. More specifically, the degree of covering is adjusted in accordance with the above-described scale parameter S.

Another method of reducing the computation load is a method of introducing a relative error parameter cq→alpha. As shown at the step 2111 in FIG. 35, when the parameter cq→alpha is introduced, the updated value of cq→dist is set to be smaller than the currently obtained distance dist between the polygons, so that the conditions of search in another nod becomes more strict. The value cq→alpha is a real number between 0 and 1 and has an effect of introducing an error to the distance dist obtained. If it is assumed that the true value between the points of closest approach is d, the relationship dist≧d≧dist·(1-cq→alpha) holds.

The effect of the relative error parameter is large when the objects of inspection are largely spaced apart from each other, and the effect becomes smaller as the objects come near to each other. When the objects come into contact with each other, the effect is the same as when cq→alpha=0.

(G) Merge of successive type Gilbert method for convex hulls with bubble collision method for non-convex polyhedrons In order to check the interference between non-convex polyhedrons with as little waste as possible, when non-convex polyhedrons are adequately spaced apart from each other, a convex hull enveloping each non-convex polyhedron is produced and the successive type Gilbert method is adopted to check the interference between the convex hulls. When the convex hulls begin to interfere, the successive type Gilbert method is automatically switched over to a bubble collision method. The switching timing is determined by the distance between the convex hulls.

(a) Data structure for interference check

FIGS. 37, 38 and 39 show the main part of the data structure for an interference check which is necessary for expressing the algorithm for interference checking.

The symbol CollisionQue represents a class defining an environment for an interference check, ColQue a class expressing an object of interference checking, Prims a class expressing a vertex constituting the object, ConvesHull a class expressing a convex hull produced from the HL file, and MetaLeaf, MetaLeaves and Metasphere are classes related to a metatree which will be explained later.

The two objects of interference check are divided into two group each of which is respectively expressed by ColQue list 1 and ColQue list 2. These ColQue lists are linearly connected via the "next" pointer of the class ColQue, and the leading elements thereof are connected to "next", "next 2" of the environment class CollisionQue. By this algorithm, the points that are approaching closest are searched for in the ColQue list 1 and the ColQue list 2. For example, if each link of robot 1 and each link of robot 2 are set as the ColQue list 1 and the ColQue list 2, respectively, the interference between the robot 1 and the robot 2 is checked, and an interference check for each pair of links of the robot 1 and an interference check for each pair of links of the robot 2 are ignored. If it is assumed that the number of links of the robot 1 is L1 and the number of links of the robot 2 is L2, L1×L2 interference checks are necessary, to take things simply. A method of enhancing the speed of executing this process is a method of using a metatree., which will be described later.

(b) Summary of Gilbert method

The algorithm for executing an interference check for convex polyhedrons by a linear amount of computation with respect to the number of vertexes is the Gilbert method. FIG. 40 shows the basic logic of a method of calculating the points of closest approach by the Gilbert method. Please refer to Japanese Patent Application No. 209008/1994 (Method of Searching for Points of Closest Approach and Preprocessing Thereto) for details.

Figure 40A:
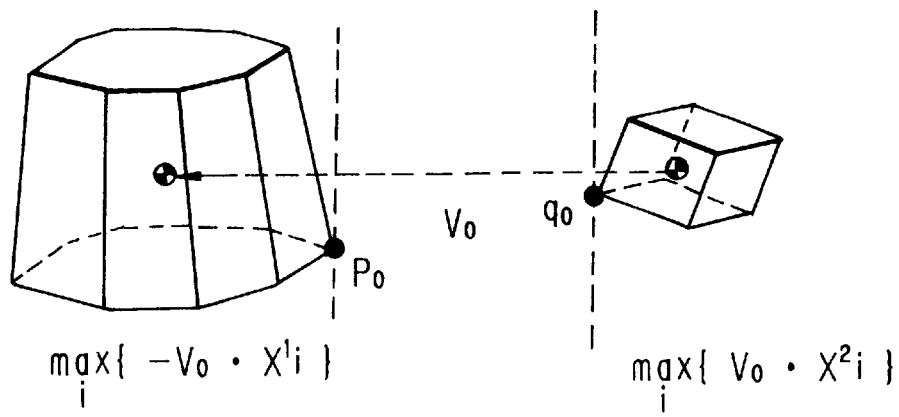
FIGS. 40A, 40B and 40C are basic explanatory views of the Gilbert method.
Figure 40B:
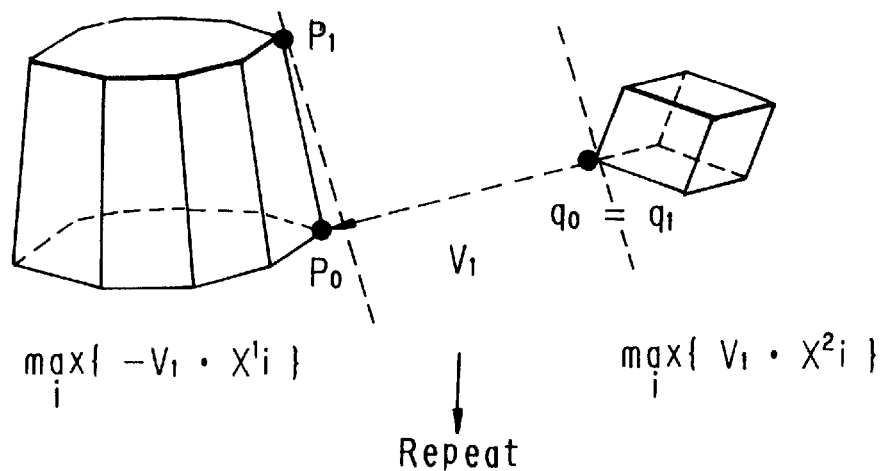
Figure 40C:
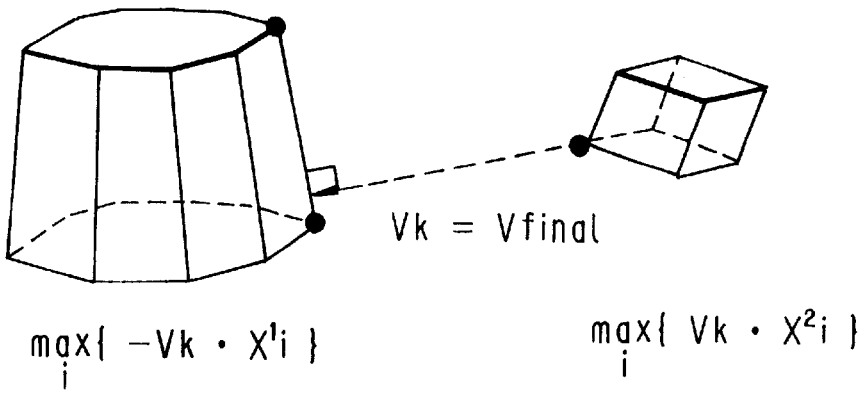

In the Gilbert method, a vector $v_0$ is produced by combining the centers of gravity of the objects of interest. The candidates $p_0$, $q_0$ of the points of closest approach are obtained by calculating the maximum value with respect to the inner product of $-v_0$ (and $v_0$) and each vertex (FIG. 40A). The vector $v_0$ is changed to a vector $v_1$ which combines $p_0$ and $q_0$, and new candidates $p_1$, $q_1$ are obtained by a similar calculation of an inner product ((FIG. 40B). If it is assumed that the vector $v_i$ is the vector of closest approach between a polygon produced by a set $\{p_k\}$ of vertexes and a polygon produced by a set $\{q_k\}$ of vertexes, the above processing is repeated several times and finished. Finally, the points of closest approach and the vectors of closest approach are obtained on each object (FIG. 40C). Since the shape which $\{p_k\}$ or $\{q_k\}$ produces is a triangle, an edge or one vertex, the distance therebetween is easily obtained.

As described above, the computation load of the Gilbert method is produced by the calculation of an inner product with respect to each vertex which constitutes an object of interference check. Therefore, the calculation order is $O(n_1 + n_2)$ ($n_1$, $n_2$: the number of vertexes of each object)

(c) Successive type Gilbert method

When the points of closest approach are obtained successively, it is possible to calculate the next points of closest approach with higher efficiency by using the information on the points of closest approach obtained at the preceding step.

Figure 41:
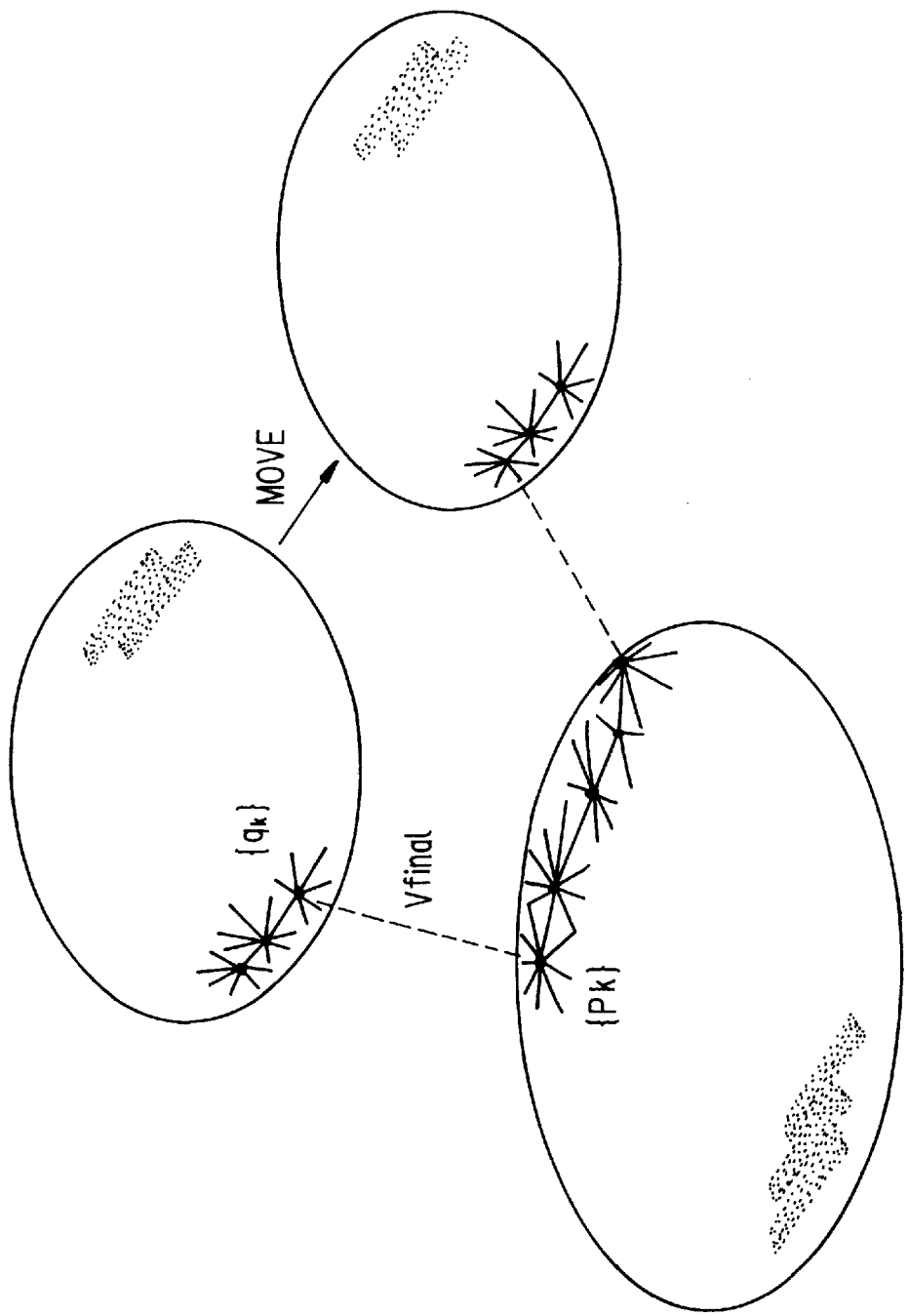
FIG. 41 is an explanatory view of the successive type Gilbert method.

FIG. 41 schematically shows the algorithms of the successive type Gilbert method. As is explained in (b) Summary of Gilbert method, the calculation of an inner product is repeated with respect to all points each time. In the case of successively tracing the points of closest approach, the points of closest approach at the next step are expected to be in the vicinity of the points of closest approach obtained at the current step. Therefore, the calculation of an inner product in the vicinity of the points of closest approach is sufficient. To state this more concretely, the sum-set of nearby vertexes is produced with respect to each of the sets $\{p_k\}$ or $\{q_k\}$ of vertexes which constitute $v_{final}$ (FIG. 40) by searching for the nearby vertexes in the direction of the pointer variable "branch", and an inner product is calculated with respect to each set of nearby vertexes. In producing the sum-set of nearby vertexes, the overlapping of the same vertexes is avoided by hushing.

The computation load in the successive type Gilbert method is proportional to the number of elements of the sum-set of nearby vertexes. Strictly speaking, this value depends on the number of polygons expressing the object and the patching method. For example, if the bottom surface of a cone or a column is patched with polygons in the shape of very fine petals, the number of elements in the sum-set of nearby vertexes in the vicinity of the center is much larger than that in another region. However, in most cases other than such an exception, the number of elements can be limited to an adequately small value (not more than 20 to 30). Consequently, it can be said that the computation load in the successive type Gilbert method is not more than a predetermined value irrespective of an object of interference check.

As a result of rough evaluation using a computer machine of 16 Mflops, the computation load was 0.5 ms/cycle with respect to almost any object.

(d) Merging algorithm

Figure 42:
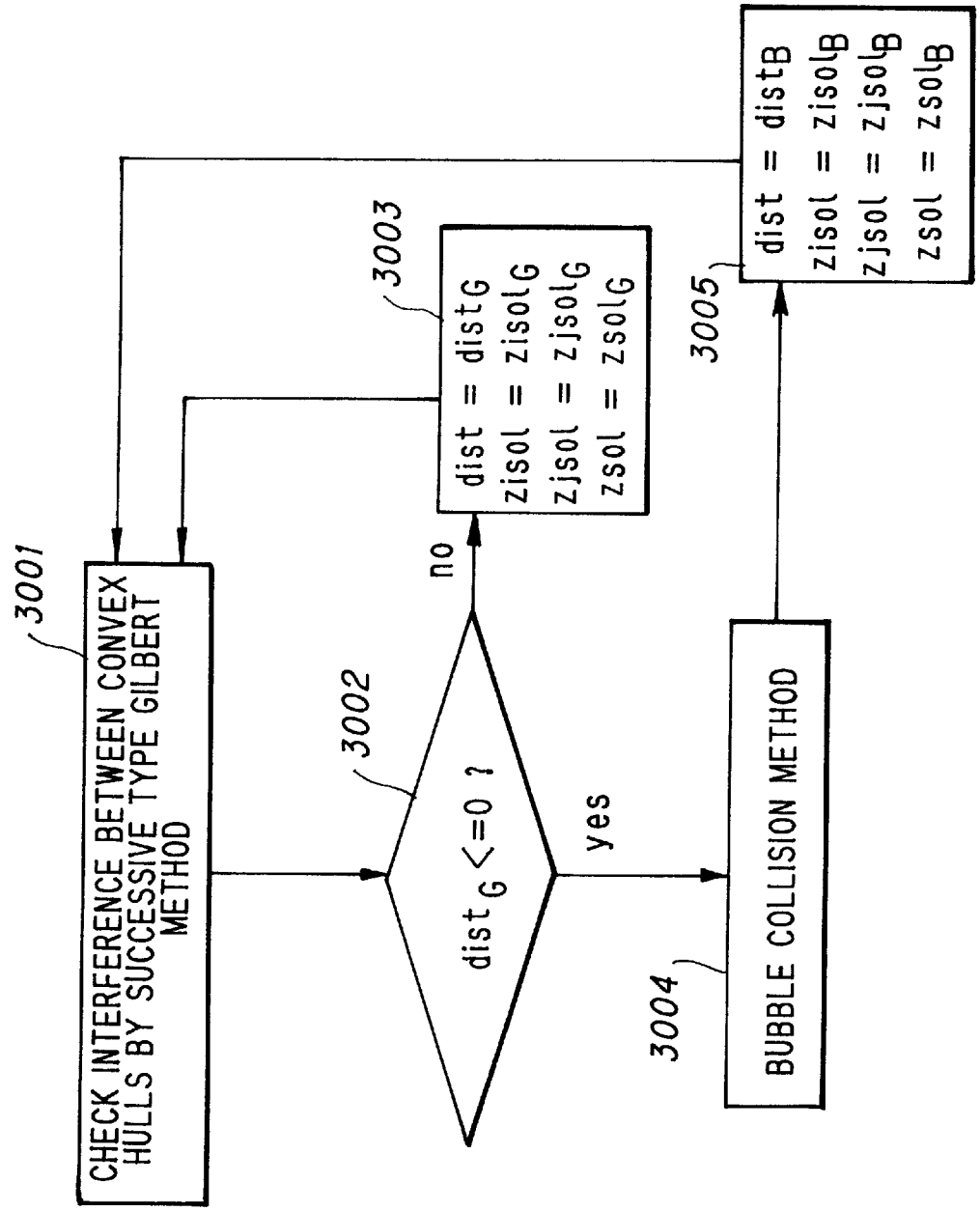
FIG. 42 shows a flow of a merging algorithm.

FIG. 42 shows a flow of an algorithm for merging the successive type Gilbert method and a bubble collision method. Outside of the convex hulls, an interference check is executed by the successive type Gilbert method (step 3001). If there is no interference, the answer is "no" at step 3002, and the points of closest approach are obtained (step 3003). When the convex hulls begin to interfere with each other, the answer is "yes" at the step 3002, and the Gilbert method is switched over to a bubble collision method (step 3004). The points of closest approach are obtained by the bubble collision method (step 3005). Thereafter, the distance between the objects becomes long, and the distance calculated by the successive Gilbert method becomes larger than 0, the answer at the step 3002 is "no". At this time, the bubble collision method is changed over to the successive type Gilbert method, and the points of closest approach are obtained by this method.

The problem in this algorithm is whether or not the distance O is calculated by the successive Gilbert method even in the state one object absorbs the other object after the objects begin to interfere with each other. It is possible to solve this problem by expanding the three-dimensional Gilbert method to the four-dimensional Gilbert method.

(e) Four-dimensional Gilbert method.

It is assumed that in the case of switching from a method of successive search between convex hulls over to a bubble collision method for non-convex polyhedrons, or vice versa, the switching timing is determined by the distance calculated by the successive type Gilbert method for convex hulls. When the convex hulls begin to interfere with each other, the algorithm for calculating the distance is switched from the three-dimensional successive type Gilbert method over to the (3+Extra-Dim)-, namely, four-dimensional successive type Gilbert method. In this manner, even if one convex hull is absorbed into the other convex hull, the vector of nearby vertexes can be calculated without contradiction.

Figure 43:
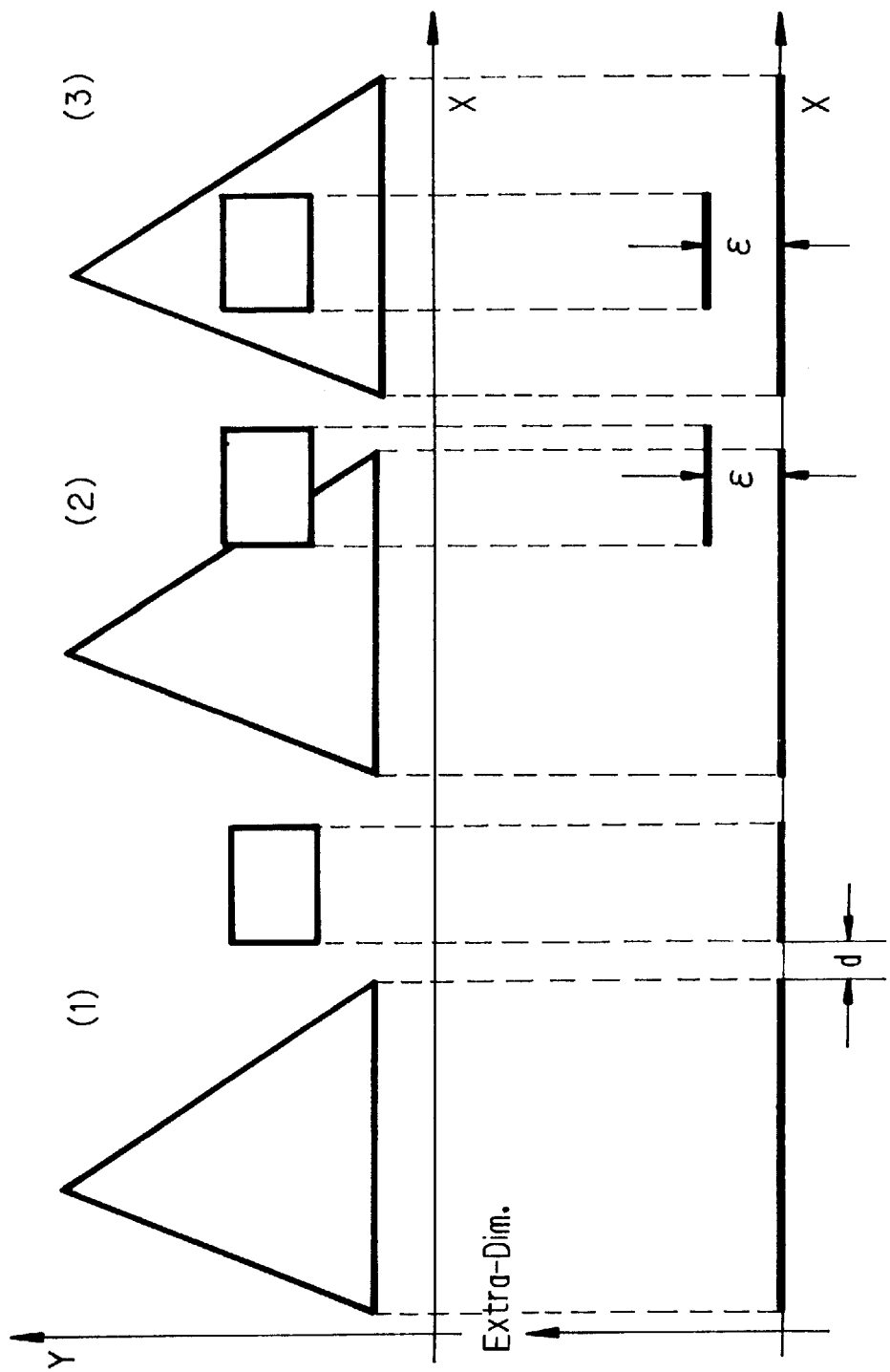
FIG. 43 is an explanatory view of an interference check in the (2+1) dimension.

FIG. 43 shows the above-described state in the (2+Extra-Dim) dimension. As shown in (1) in FIG. 43, when two convex hulls are not interfered with each other, the distance between the convex hulls is defined by a two-dimensional distance d. The value d is calculated by the two-dimensional successive type Gilbert. method. When the value d becomes small than a predetermined very small value, two convex hulls are considered to begin to interfere with each other, and one convex hull is raised by $\epsilon$ in the direction of Extra Dimension ((2), (3) in FIG. 43). In this state, the vector of nearby vertexes is calculated by the three-dimensional successive type Gilbert method. At this time, the vector of nearby vertexes faces in the direction of Extra Dimension, and the component on the X-Y plane is 0. Therefore, the distance d between the two convex hulls is constantly 0, so that the two convex hulls are judged to be interfered with each other. When the X-Y plane component takes any value other than zero, the interference state of the two convex hulls is judged to be cancelled, and the interference check method is switched from the (2+Extra-Dim)-, namely, three-dimensional successive type Gilbert method over to the two-dimensional successive type Gilbert method.

The value $\epsilon$ for raising a convex hull in the direction of Extra Dimension may be any value other than 0.

(f) Enhancement of speed by metatree

In a case where the interference between two objects each of which is composed a set of non-convex polyhedrons is checked, in order to search the pair of non-convex polyhedrons which are approaching closest, a metatree is produced by covering each non-convex polyhedron with spheres and then hierarchically enveloping these spheres with envelope spheres. In place of respectively checking interference between each pair of polyhedrons which constitute the respective object, the interference between envelope spheres is checked on the basis of the metatree by a depth-first search method so as to retrieve the pair of spheres which are approaching closest. By applying the successive type Gilbert method to the interference check between the convex hulls on which the centers of the retrieved spheres lie, it is possible to calculate the points of closest approach with high efficiency.

Figure 44:
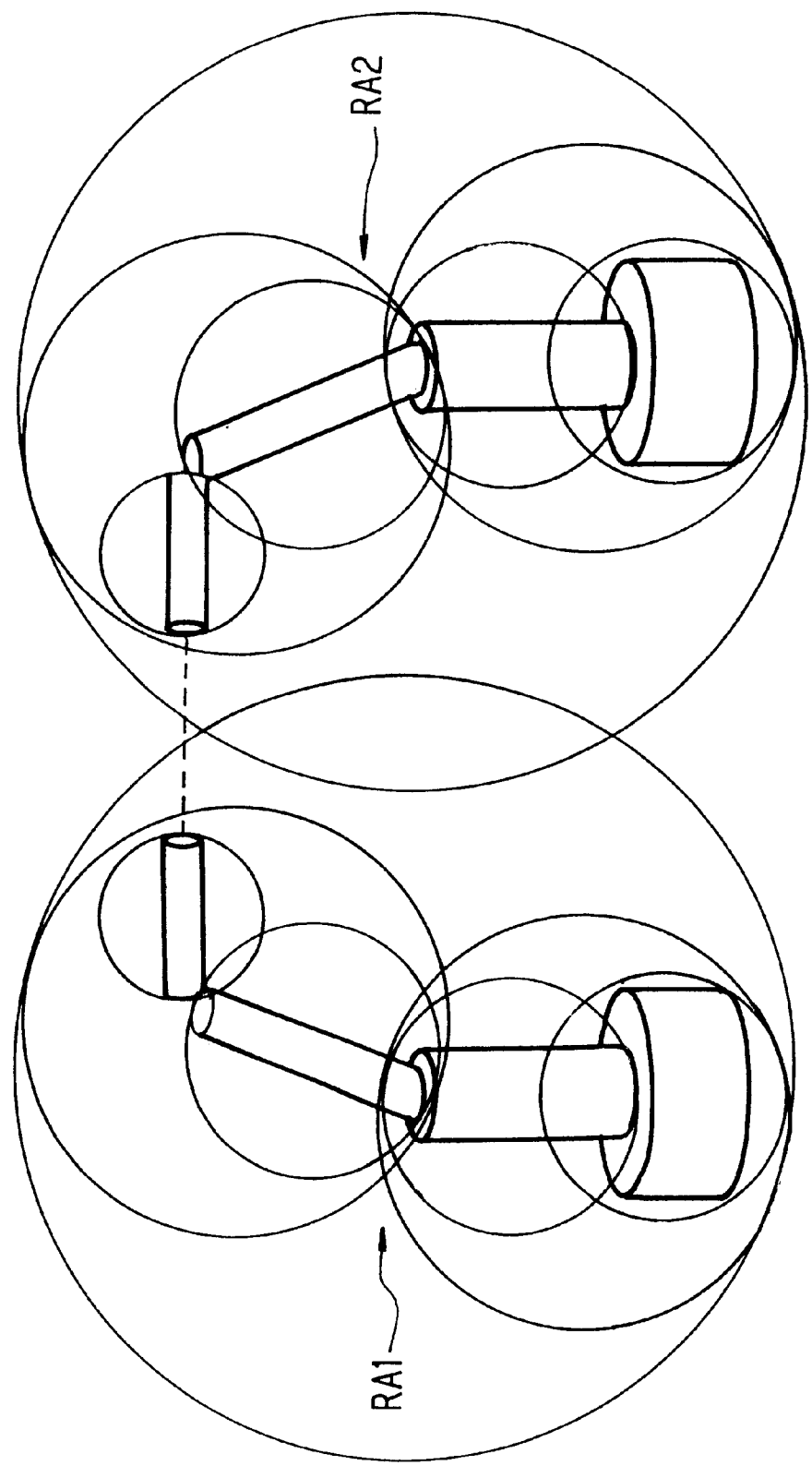
FIG. 44 is an explanatory view of a metatree.

FIG. 44 shows metatree which are produced for robot arms RA1 and RA2, and which are checking the interference therebetween. Spheres corresponding to "Leaf spheres" which constitute a metatree are defined as follows.

The vector max, min with respect to each non-convex polyhedron which constitute object of interference check are defined as follows:

max=($MAX_i\{x_i\}$, $MAX_i\{y_i\}$, $MAX_i\{z_i\}$)

min=($MIN_i\{x_i\}$, $MIN_i\{y_i\}$, $MIN_i\{z_i\}$)

wherein i runs on each vertex of a non-convex polyhedron.

At this time, the center and the radius r of a sphere are defined center=(max+min)/2 r=|max−min|/2

A metatree is produced in the same way as a sphere tree in a bubble collision method. After the metatree is produced, a pair of non-convex polyhedrons which have a possibility of interference are detected by depth-first search of the metatree in the same way as in the bubble collision method. The distance between Meta Spheres is set to a value obtained by subtracting the radii of both Meta Spheres from the distance between the centers thereof.

(g) Successive interference checking method including the production of a metatree When the points of closest approach between arbitrary non-convex polyhedrons are successively searched for, each of the production of a metatree, the Gilbert process and the bubble collision process is executed only once every several cycles, and in the other cycles, the Gilbert method is applied repeatedly to the polygon pairs used in the preceding cycle to obtain the shortest distance, thereby greatly reducing the computation load.

Figure 45:
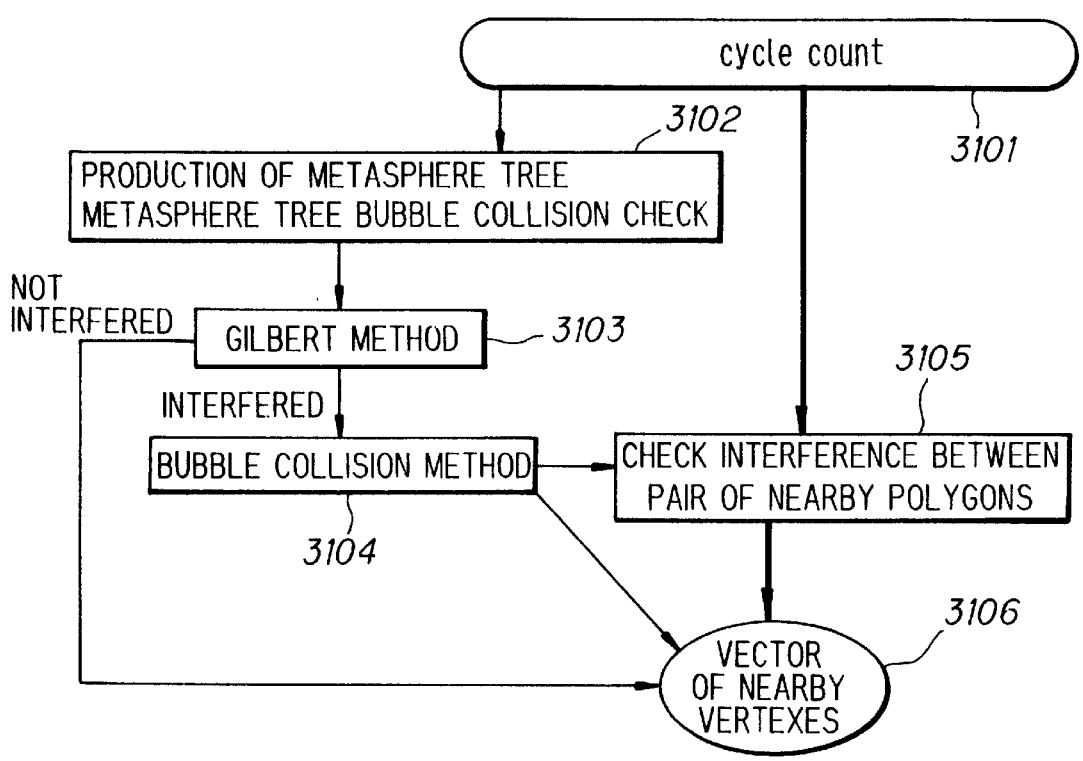
FIG. 45 shows a flow of the algorithm for a successive interference check process including the production of a metatree.

FIG. 45 shows a flow of the algorithm for a successive interference checking process including the production of a metatree. The cycle is first counted and judgement is made as to whether or not the current cycle can be divided by a constant CYCLE without a remainder. If the answer is in the affirmative, processing at steps 3102 to 3106 is executed. If the answer is in the negative, processing at steps 3105 and 3106 is executed. For example, if CYCLE=100, the processing at the steps 3102 to 3106 is executed every 100 cycles, and the processing at steps 3105 and 3106 is executed at any other time.

If the current cycle can be divided by a constant CYCLE without a remainder, a metatree explained with reference to FIG. 44 is produced, and a pair of non-convex polyhedrons which have a possibility of interference are detected by depth-first search of the metatree. By this process, the pair of convex hulls to which the Gilbert method is applied is determined, and an interference check process by the Gilbert method is executed with respect to the determined pair of convex hulls at the step 3103. If the pair of convex hulls is the same as that at the preceding time, the Gilbert method adopted at the step 3103 is the successive type Gilbert method. In the other cases, the non-successive type Gilbert method is adopted. If the convex hulls are not interfered with each other, a vector of nearby vertexes is obtained as the result of the Gilbert process (step 3106). If they interfere with each other, the Gilbert method is changed over to a bubble collision method at the step 3104, and a vector of nearby vertexes is obtained as the result of the bubble collision process (step 3106). The pair of nearby polygons picked out during the bubble collision process are stored at the step 3105. If the current cycle is not a multiple of CYCLE, the Gilbert method is applied to the polygon pair stored at the step 3105 so as to pick out the pair of polygons approaching closest, and the vector of nearby vertexes is calculated.

(h) Cycle time automatic adjusting type successive interference checking method

In the successive interference checking method shown in FIG. 45, the value CYCLE is fixed. In this cycle time automatic adjusting type successive interference checking method, the time required for the steps 3102 to 3104 is directly measured from a clock of a computer, and CYCLE is varied on the basis of this value.

Figure 46:
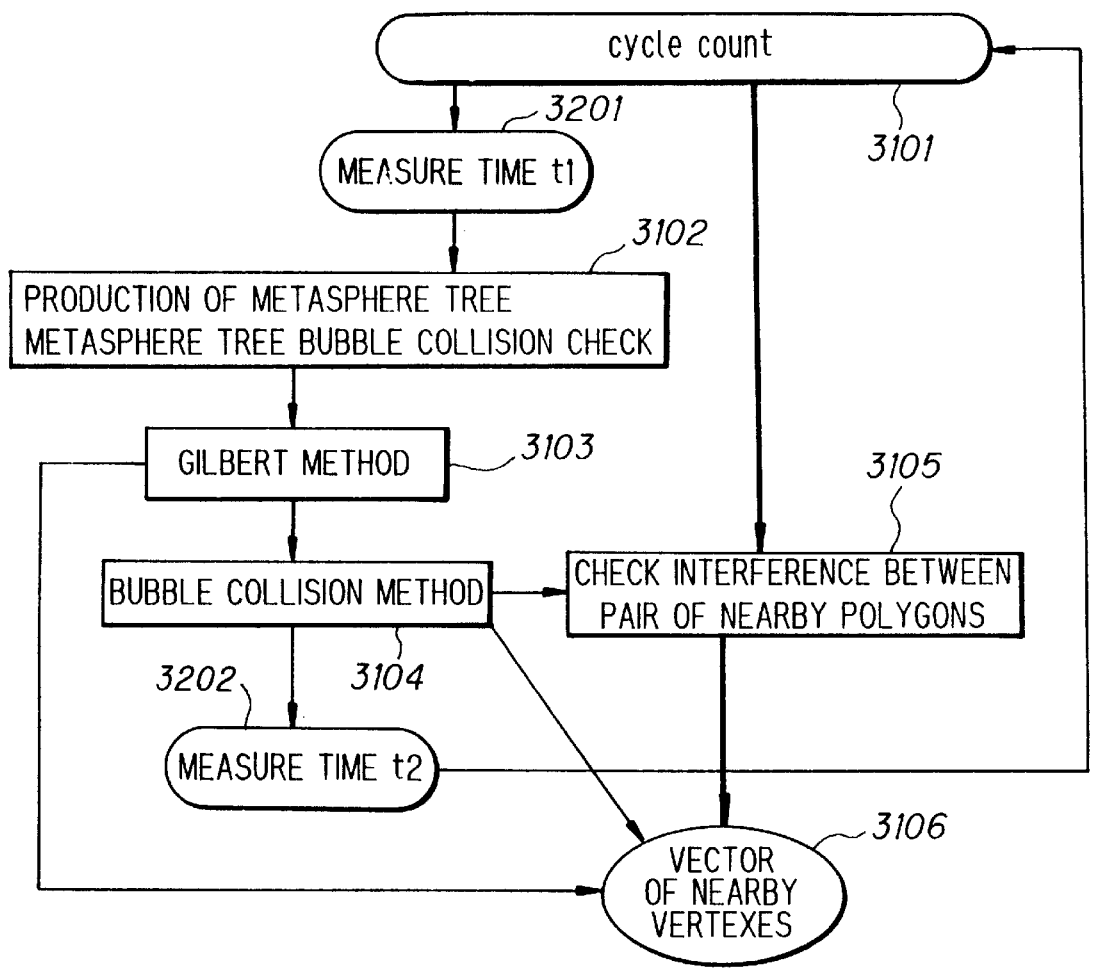
FIG. 46 shows another flow of the algorithm for a successive interference check process including the production of a metatree.

FIG. 46 is a flowchart of a cycle time automatic adjusting type successive interference check process. This flow is different from that shown in FIG. 45 in that step 3201 for measuring the processing start time $t_1$ at the step 3102, and step 3202 for measuring the processing end time $t_2$ when the step 3104 are added, and in that the value CYCLE is more dynamically determined by the following formula at the step 3101:

CYCLE=$[A/(t2-t1)]$ wherein A is a constant dependent upon the CPU power of a computer. Due to these steps, when the value (t2-t1) is large, that it, when the processing time from the start of the production of a metatree to the end of the bubble collision is long, the value CYCLE become small, so that the frequency of processing at the steps 3102 to 3104 is increased. On the other hand, when value (t2-t1) is small, the above frequency is reduced, and the frequency of processing at the step 3105, which requires a smaller computation load, is increased.

Figure 47:
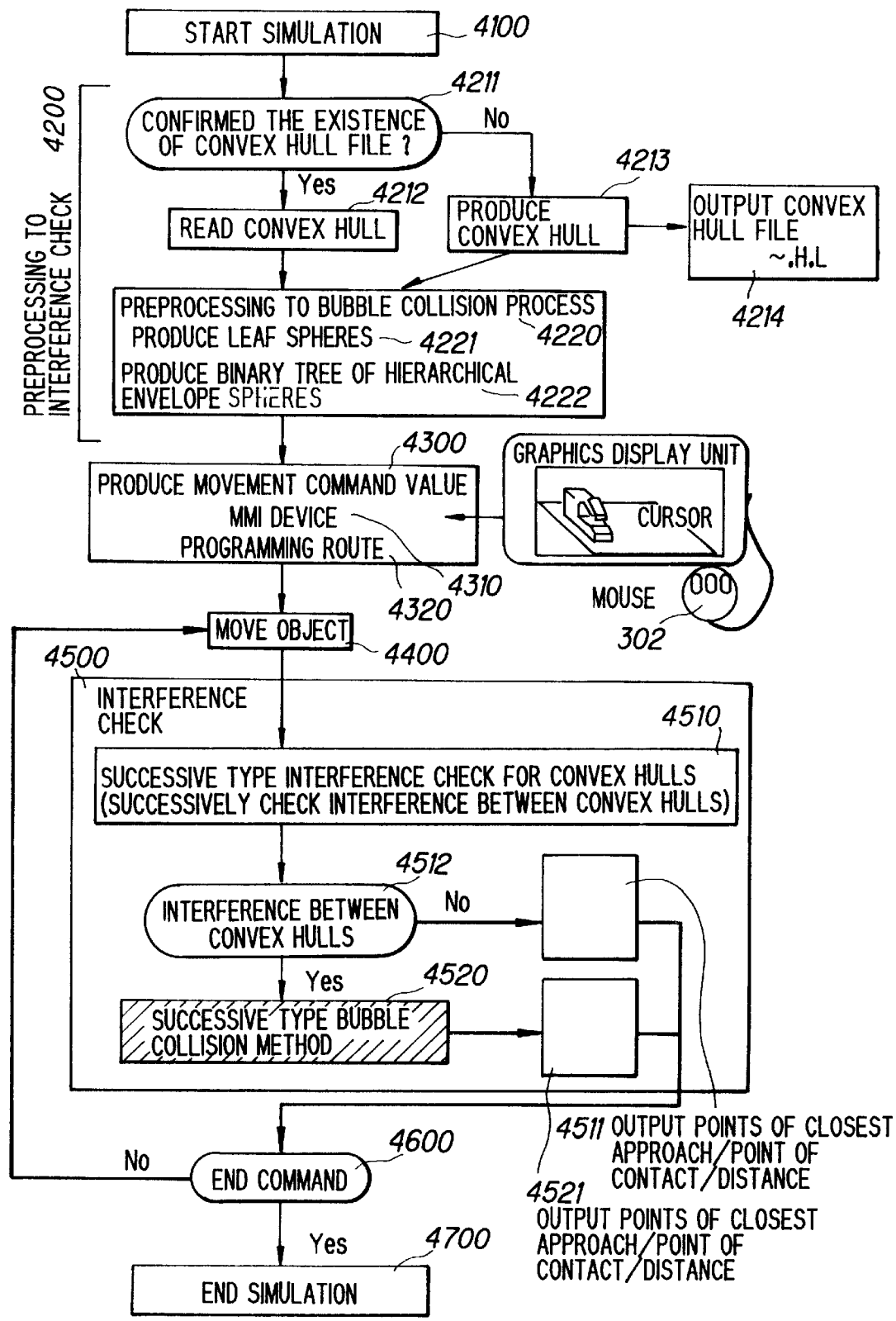
FIG. 47 shows the entire flow of interference check process.

(H) Successive type bubble collision method (a) Entire flow of real-time interference check process FIG. 47 shows the entire flow of al real-time interference check process.

When simulation is started (step 4100), preprocessing to an interference check is executed (step 4211). In the preprocessing to a successive type interference check for non-convex polyhedrons, judgement is made as to whether or not there is a convex hull file (HL file) (step 4211). Since there is no HL file in the beginning, a convex hull is produced for a CG model to be fetched (step 4213), and a convex hull file (HL file) is output (step 4214). From the next time on, if there is a convex hull file, it is read (step 4212).

In the preprocessing to a bubble collision process (step 4220), leaf spheres are produced on a triangular polygon of a non-convex polyhedron (step 4221), and the leaf spheres are enveloped with hierarchical envelope spheres, thereby producing a binary tree consisting of the envelope spheres (step 4222).

Figure 48:
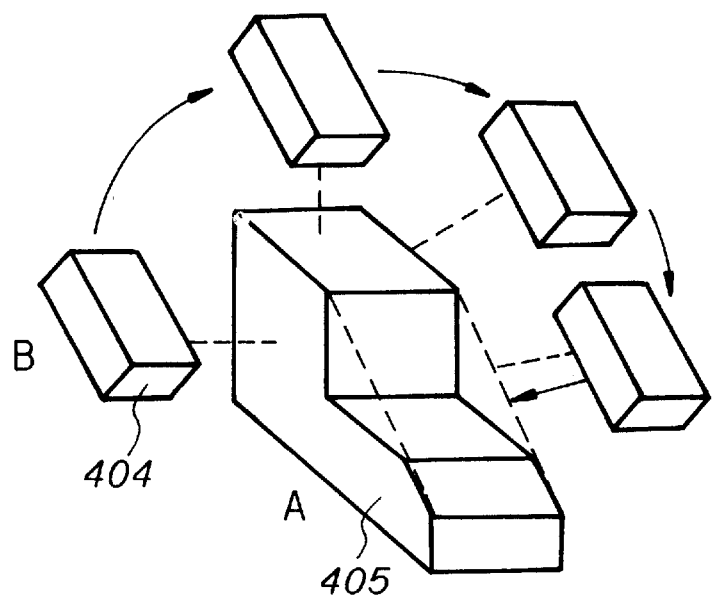
FIG. 48 is an explanatory view of the environment in a CG.
Figure 49:
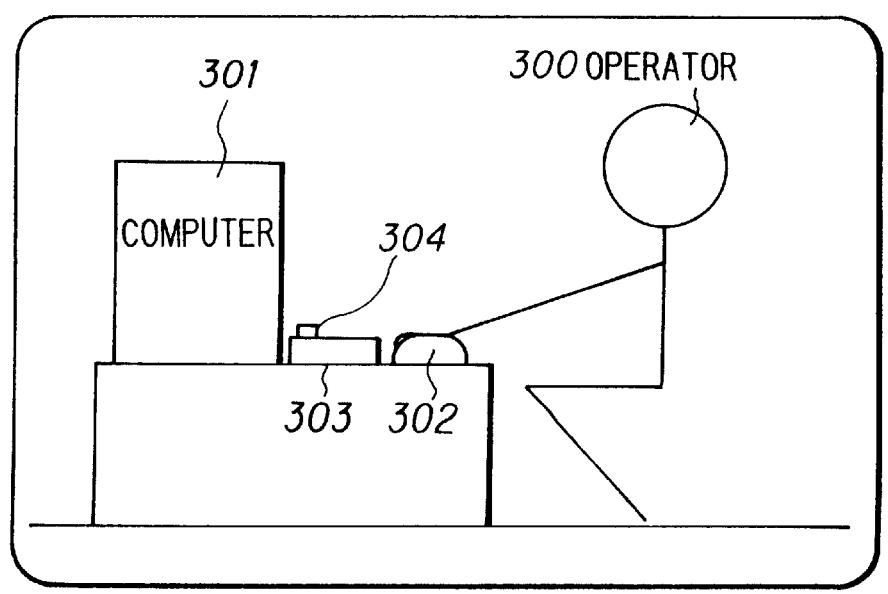
FIG. 49 shows the structure of a three-dimensional data inputting system using a mouse.
Figure 50:
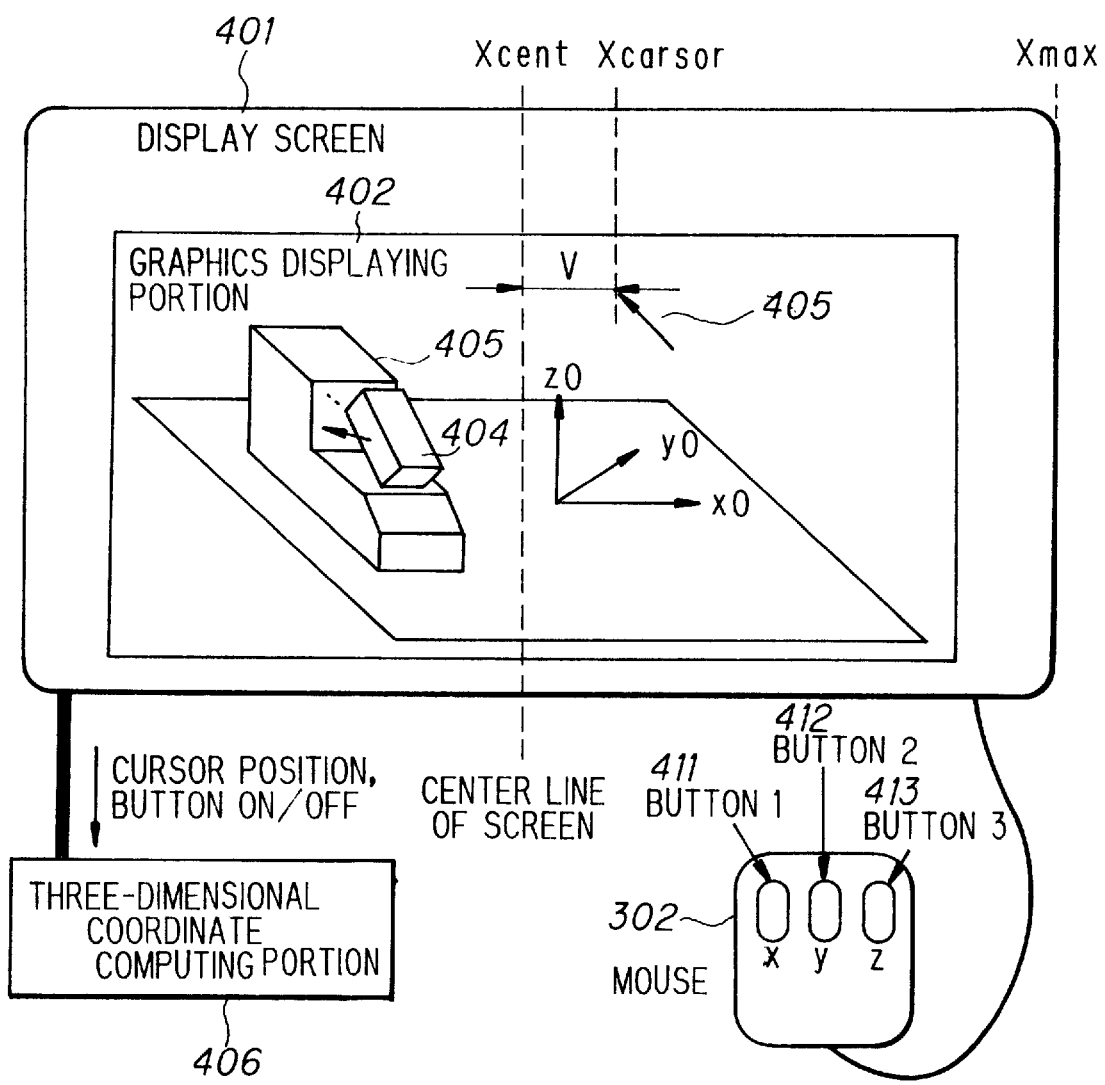
FIG. 50 is an explanatory view of a three-dimensional coordinate inputting portion.

A movement command value is produced on the basis of a three-dimensional input data which is input from a man machine interface device (MMI device) such as a mouse 302 at step 4300 for producing a movement command value, (step 4310). Alternatively, a movement command value is produced along a programmed path (step 4320). Thereafter, as shown in FIG. 48, an object 404 is moved (here, rectangular parallelepiped B) is moved relative to an object 405 (here non-convex polyhedron A) (step 4400), and the environment in the CG is changed. A three-dimensional data inputting system using a mouse will now be explained simply. FIG. 49 shows the structure of a three-dimensional data inputting system using a mouse. In this system, an operator 300 uses a three-button mouse attached to a computer 301 and a function key 304 on a keyboard 303 which are attached to a computer 301, so that no other special device is necessary. It is assumed that the CG model shown in FIG. 50 is displayed on a screen of the computer 301. In the state shown in FIG. 50, a three-dimensional coordinate computing portion 406 produces a speed command value in accordance with the position of a cursor 405, and the command value is integrated to calculate the three-dimensional coordinates. The buttons 1, 2 and 3 (411 to 413) of the mouse 302 correspond to the respective direction x, y and z, and when the buttons are ON, the velocities Vx, Vy and Vz are produced in correspondence with the position of the cursor. When the cursor is positioned on the center line Xcent of the screen, the velocity is zero, and if the amount V of displacement of the cursor is small, the velocity is small, while if the amount of displacement V is large, the velocity is large.

An interference check is then executed on the updated environment in the CG (step 4500). When the objects are spaced apart from each other, a successive type interference check for convex hulls is executed at a high speed (step 4510) and the points of closest approach, the point of contact and the distance are obtained (step 4511). The interference between the convex hulls is checked again (step 4512), and a successive type interference check for convex hulls is repeated until the interference between convex hulls is detected. If the interference between convex hulls is detected, a successive type bubble collision method is adopted (step 4520), and the points of closest approach, the point of contact and the distance are obtained with respect to the non-convex polyhedrons as the object of interference check (step 4521). When a simulation end command is output through a function key or the like (step 4600), simulation is finished (step 4700). If a simulation end command is not output, the processing of producing a movement command value and the subsequent processing is repeated.

As explained above, a real-time interference check system is effective for a system for sequentially checking interference in real time while moving objects interactively by using a mouse. This system is also effective for a system for checking the interference between objects while moving them on a programmed path. The successive type bubble collision method at the 4520 will be explained in detail in the following.

(b) Preprocessing to bubble collision process

Figure 52A:
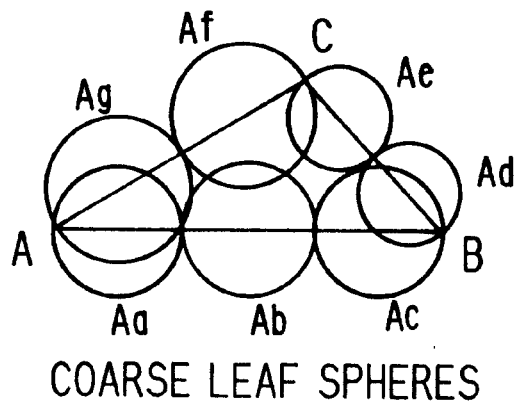
FIGS. 52A and 52B are explanatory views of leaf spheres on a triangular polygon.
Figure 52B:
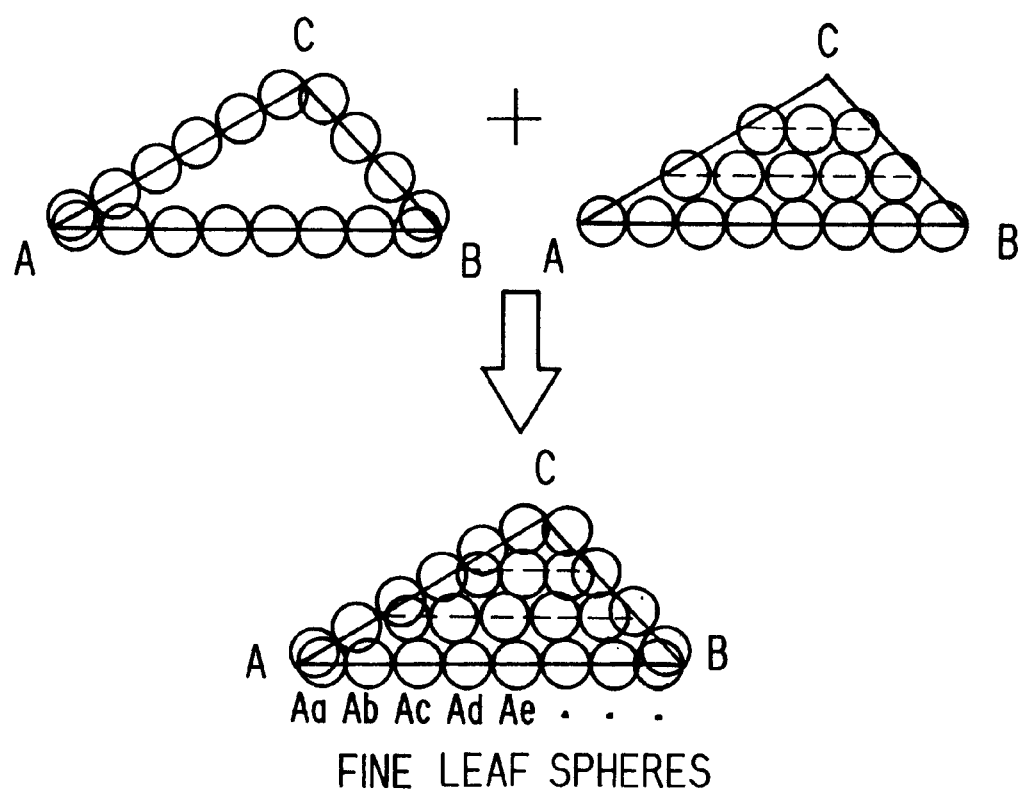

In the preprocessing, smallest spheres which are leaf spheres are arranged on a triangular polygon which constitutes a polyhedron 404 (405) (FIG. 51). FIGS. 52A and 52B show examples of a triangular polygon covered with leaf spheres. In FIG. 52A, the leaf spheres are comparatively large, while in FIG. 52B, the leaf spheres are small. In the example shown in FIG. 52B, since there is a gap in the triangular polygon, the gap is filled with spheres having an approximately the same radius. The radius of a leaf sphere is determined by the scale parameter S described above. This preprocessing is executed on all the triangular polygons and, as a result, the object is filled with leaf spheres.

Figure 53:
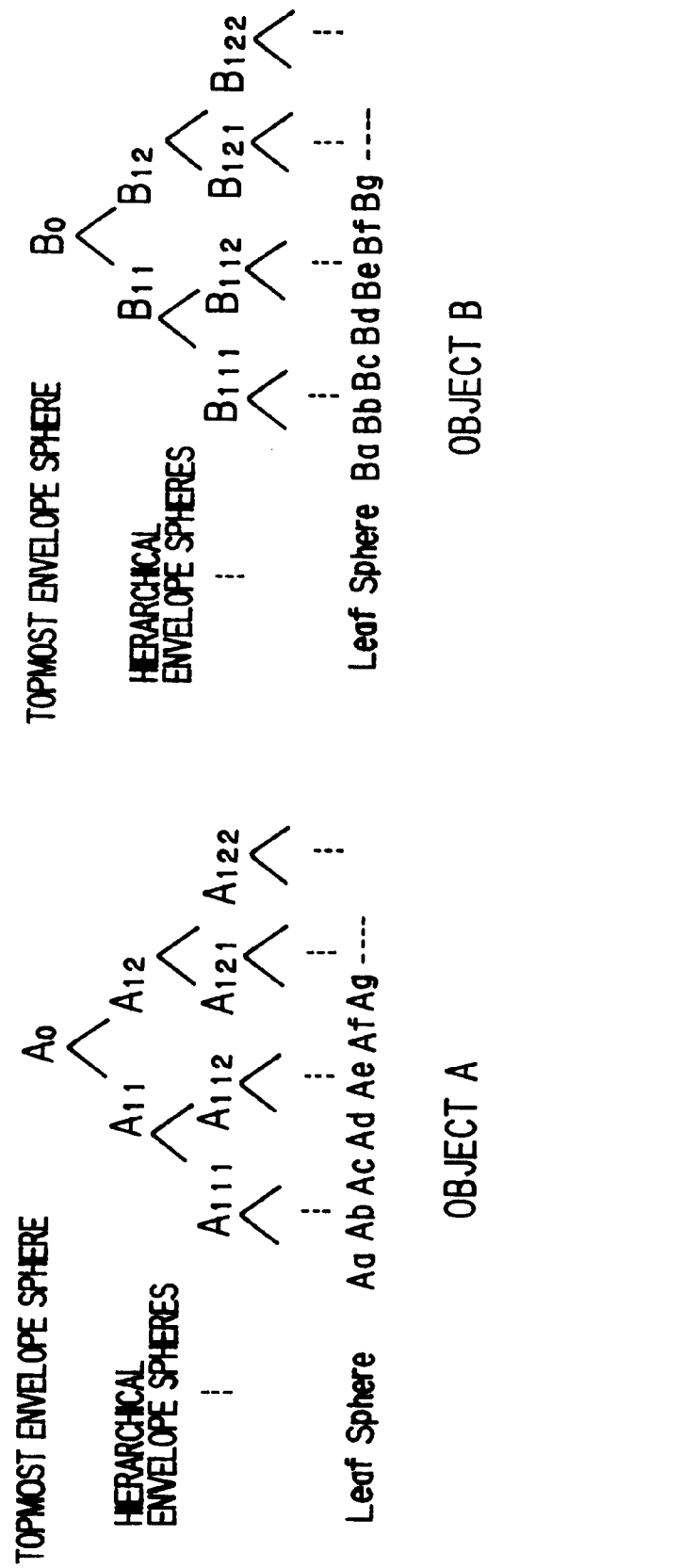
FIG. 53 is an explanatory view of a binary tree of hierarchically envelope spheres.
Figure 54:
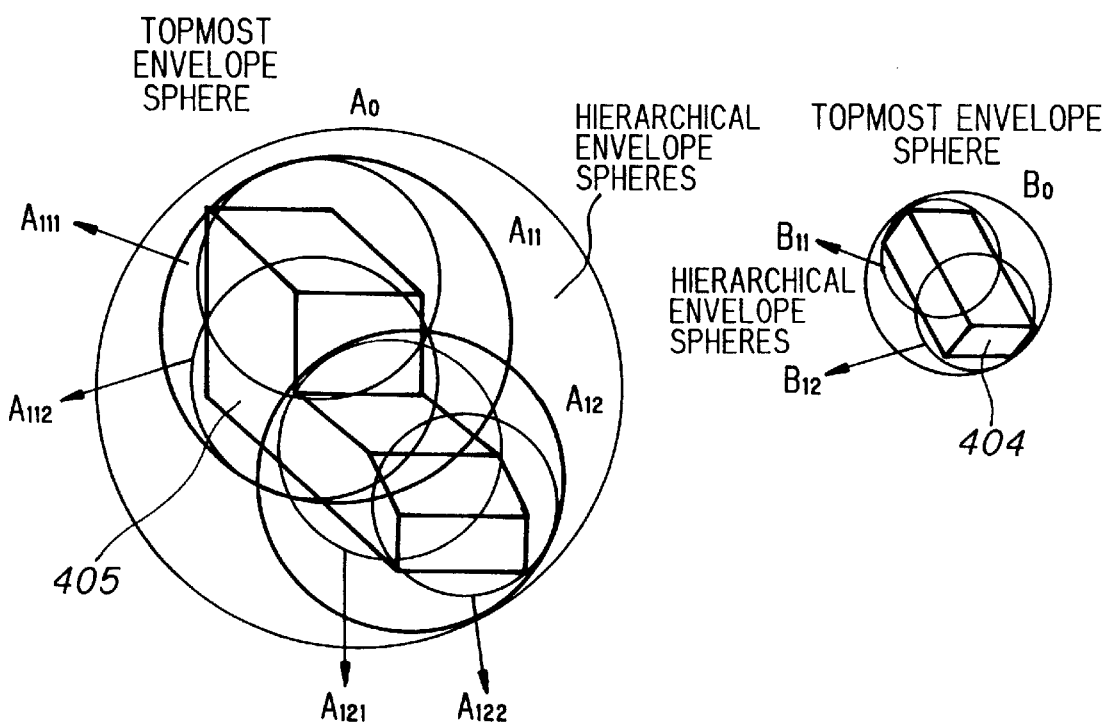
FIG. 54 is an explanatory view of a three-dimensional image of the structure of a binary tree of hierarchically envelope spheres.
Figure 55:
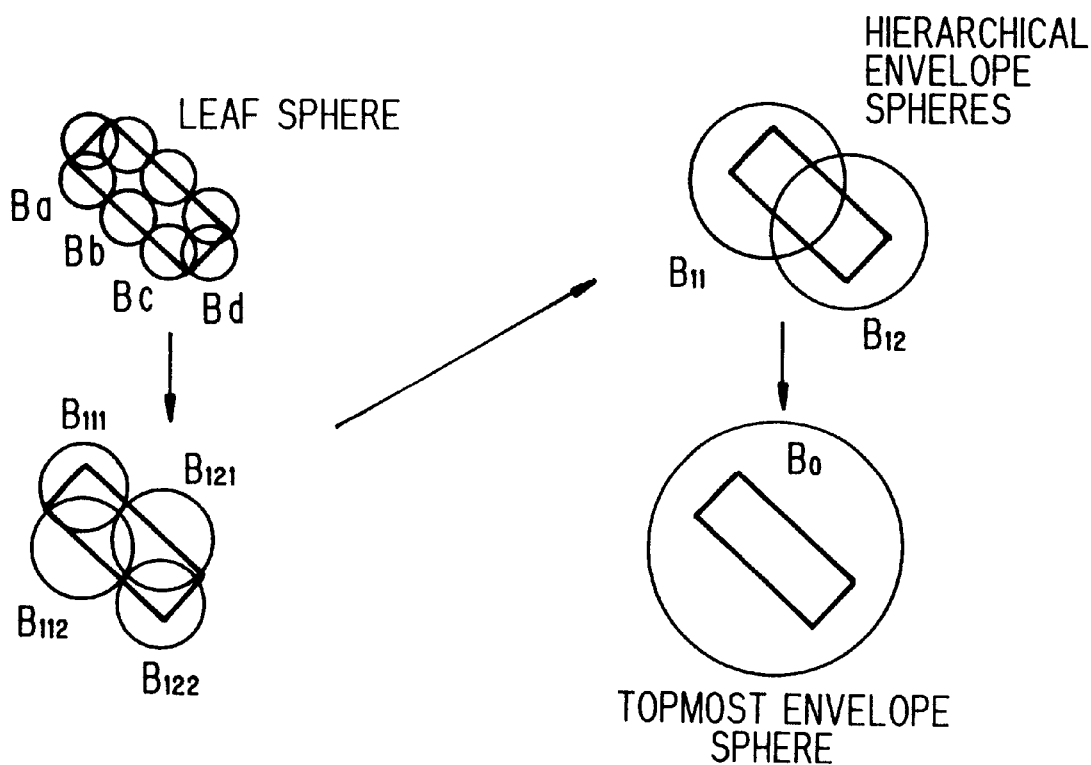
FIG. 55 shows an example of the structure of hierarchically envelope spheres (for a rectangular parallelepiped)
Figure 56:
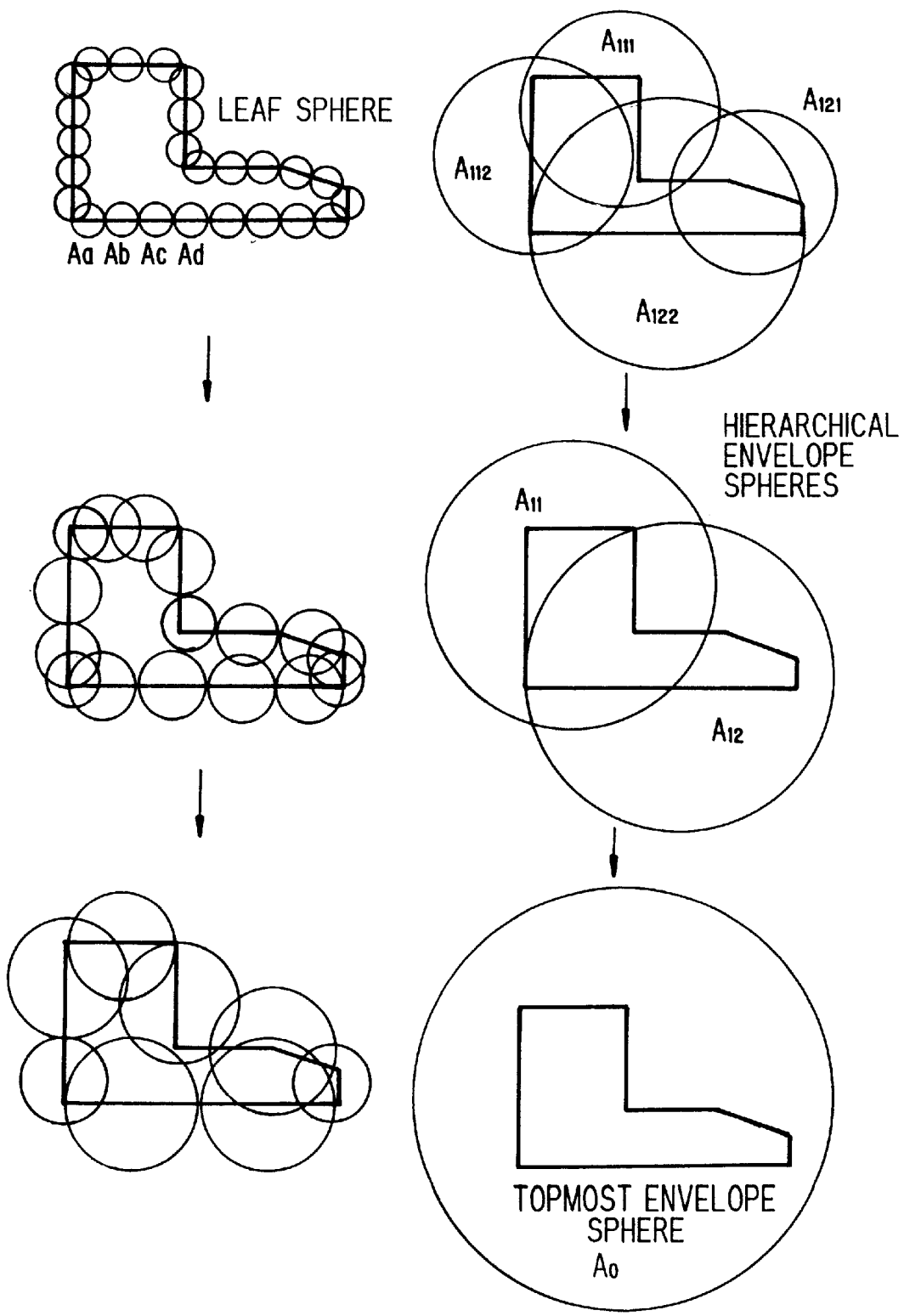
FIG. 56 shows an example of the structure of hierarchically envelope spheres (for a non-convex polyhedron)

The leaf spheres are enveloped with hierarchical envelope spheres by a divide-and-conquer method, thereby producing a binary tree of hierarchical envelope spheres (FIG. 53). FIG. 54 is a three-dimensional image of a binary tree of hierarchical envelope spheres. FIG. 55 hierarchically shows an example of the structure of hierarchical envelope spheres for the object 404 (rectangular parallelepiped B). FIG. 56 hierarchically shows an example of the structure of hierarchical envelope spheres for the non-convex polyhedron 405 (object A). In FIGS. 55 and 56, however, the structure is simplified by arranging leaf spheres only on the contour portion because the entire part of a triangular polygon with leaf spheres arranged thereon is very complicated.

(c) Successive type bubble collision method

Figure 57A:
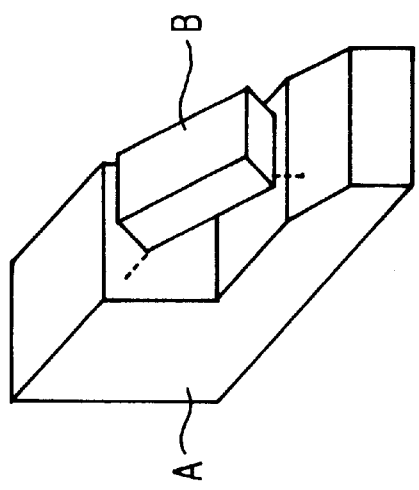
FIGS. 57A to 57C are explanatory view of a successive type bubble collision method.
Figure 57C:
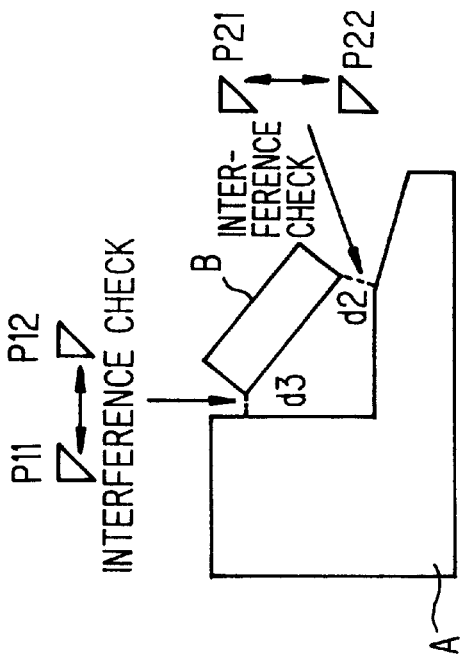
Figure 57B:
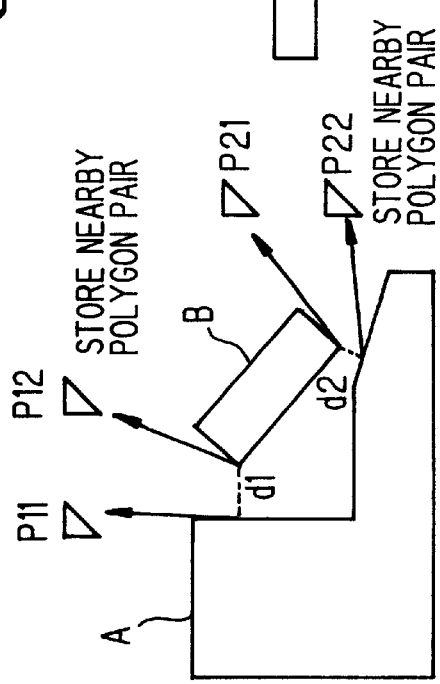
Figure 58:
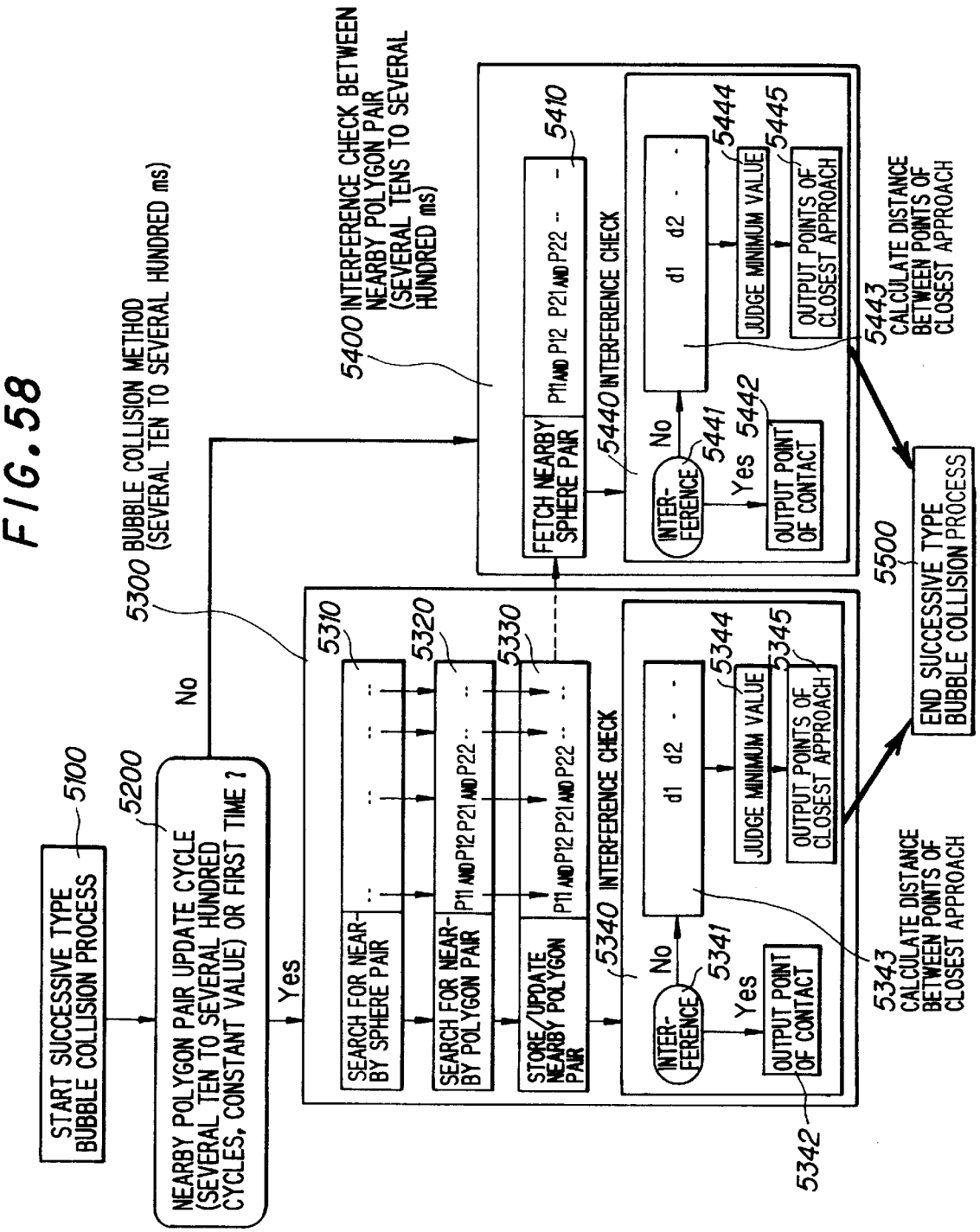
FIG. 58 is a flowchart of a successive type bubble collision method.

A successive type bubble collision method is a method for enhancing the speed of a bubble collision method. The state of an object in the successive type bubble collision method is shown in FIGS. 57A to 57C and a flow of processing by the successive type bubble collision method is shown in FIG. 58. A non-convex polyhedron A and a rectangular parallelepiped B will be cited as an example. The successive type bubble collision method is applied to an interference check for non-convex polyhedrons having a complicated shape when an object moves into a convex hull in very close to the other object (see FIGS. 57A to 57C).

1) When a successive type bubble collision process is started (step 5100), if it is a first time, or a nearby polygon pair update cycle (step 5200), a bubble collision process is executed (step 5300). If the answer is negative at the step 5200, the interference between a nearby polygon pair stored in the preceding process is checked (step 5400).

Figure 59A:
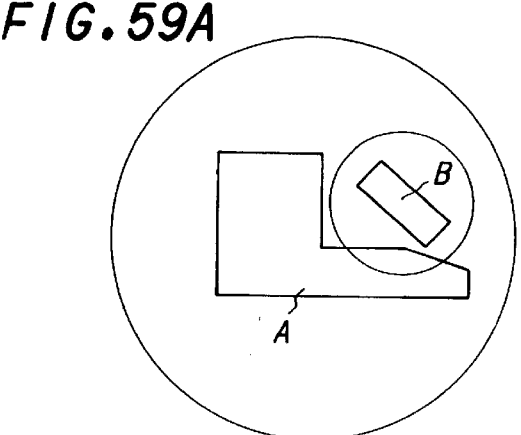
FIGS. 59A to 59G are explanatory views of a method of searching for nearby sphere pair/nearby polygon pair.
Figure 59B:
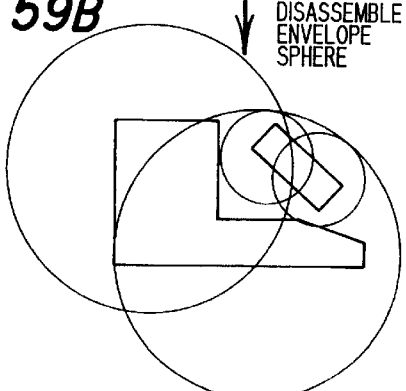
Figure 59C:
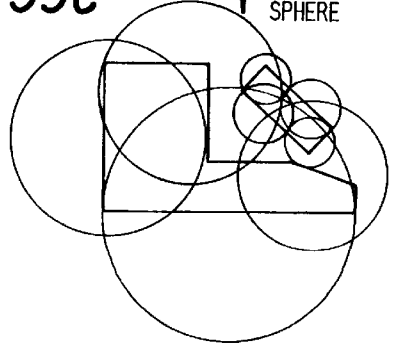
Figure 59D:
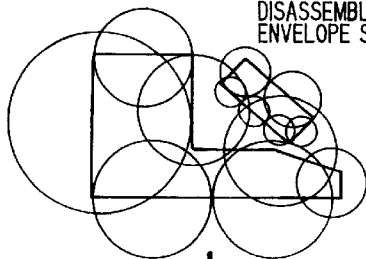
Figure 59E:
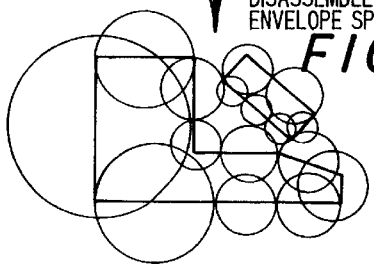
Figure 59F:
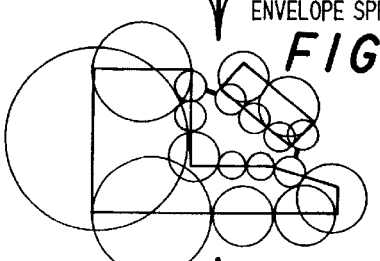
Figure 59G:
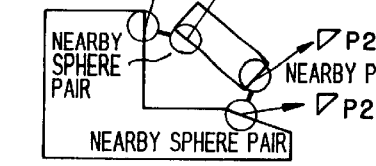

2) Bubble collision method 2-1) At the nearby sphere pair checking step (step 5310), the interference between the envelope spheres produced in the preprocessing is checked by a depth-first search method on the basis of the binary tree, and the pair of spheres of closest approach are searched for. FIGS. 59A to 59G show the process of search for a nearby sphere pair and search for nearby polygon pair. When the interference between envelope spheres of a higher grade for the objects A, B is detected, as shown in FIG. 59A, the interference between envelope spheres of a lower grade to the higher grade is checked. If the interference between the envelope spheres is detected, the interference check is repeated in that part with respect to envelope spheres of a further lower grade. Finally, a pair of spheres which are approaching closest is obtained, as shown in FIG. 59G.

2-2) At the nearby polygon pair checking step (at 5320), the pair of polygons on which the centers of the spheres obtained lie are searched (P11 and P12, P21 and P22 are searched in FIG. 59(G)). These are pairs of polygons (nearby polygon pair) which have a possibility of containing the points of closest approach.

2-3) At the nearby polygon pair storing step (at 5330), nearby polygon pairs such as the polygons P11 and P12, P21 and P22 obtained at the step 5320 are stored.

2-4) At the interference checking step (step 5340), the Gilbert method is applied to the nearby polygon pair so as to calculate the point of contact. or the points of closest approach and the distance therebetween. If the interference is detected (step 5341), the point of contact is output (step 5342). If there is no interference, the distance d1 between the points of closest approach is obtained by the interference check for the polygons P11 and P12, the distance d2 between the points of closest approach is obtained by the interference check for the polygons P21 and P22, and this processing is repeated (step 5343). Thereafter, the shortest distance is output as the distance between the points of closest approach (judgement of minimum value, step 5344). In FIG. 57B, since the distance d2 is shorter than the distance d1, the former is determined as the distance between the points of closest approach and output (step 5345).

3) Interference check for nearby polygon pair 3-1) The rectangular parallelepiped B is moved leftward, as shown in FIG. 57C, in the next cycle. However, since it is not the nearby polygon pair update cycle, the interference between a stored nearby polygon pair is checked (step 5400). If it is assumed that the rectangular parallelepiped B is moved a little, the nearby polygon pairs P11 and P12, P21 and P22 are the same as at the step 5320. Therefore, an interference check is executed only for the nearby polygon pairs stored at the step 5330 so as to obtain the points of closest approach or the point of contact. At nearby polygon pair fetching step 5410, the nearby polygon pairs such as P11 and P12, P21 and P22 stored at the step 5330 are fetched.

3-2) An interference check is executed for the fetched nearby polygon pairs P11 and P12, P21 and P22, etc. so as to obtain the point of contact or the points of closest approach (step 5440). In FIG. 57C, since the distance d3 is shorter than the distance d2, the former is output as the distance between the points of closest approach.

Since it is assumed that the distance of movement/change of attitude is small, a nearby polygon pair check (step 5400) for checking the interference between each of these several pairs of nearby polygons is repeated for a while. It is possible to shorten the computation time by checking the interference only between each of the stored several pairs of nearby polygons. However, since there is a possibility of a nearby polygon pair changing when the distance of movement becomes long, the bubble collision process (step 5300) is executed every several cycles so as to update the nearby polygon pairs. When the distance of movement becomes long, false points of closest approach are temporarily displayed on the CG, but these are immediately corrected at the next nearby polygon update cycle. If the cycle of nearby polygon pair updating process is appropriate, even if false results are displayed temporarily, since the correct results are immediately displayed, there is no problem in use. In this embodiment, the cycle of nearby polygon updating process is adjusted not so as to produce problem in use and manually input.

(d) Effect of successive type bubble collision method

Figure 60A:
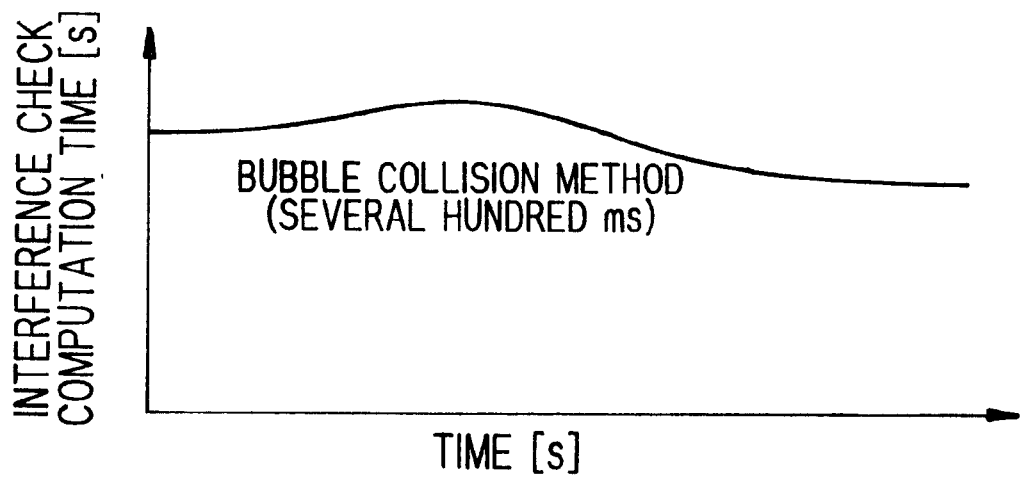
FIGS. 60A and 60B are explanatory views of the computation time in the successive type bubble collision method.
Figure 60B:
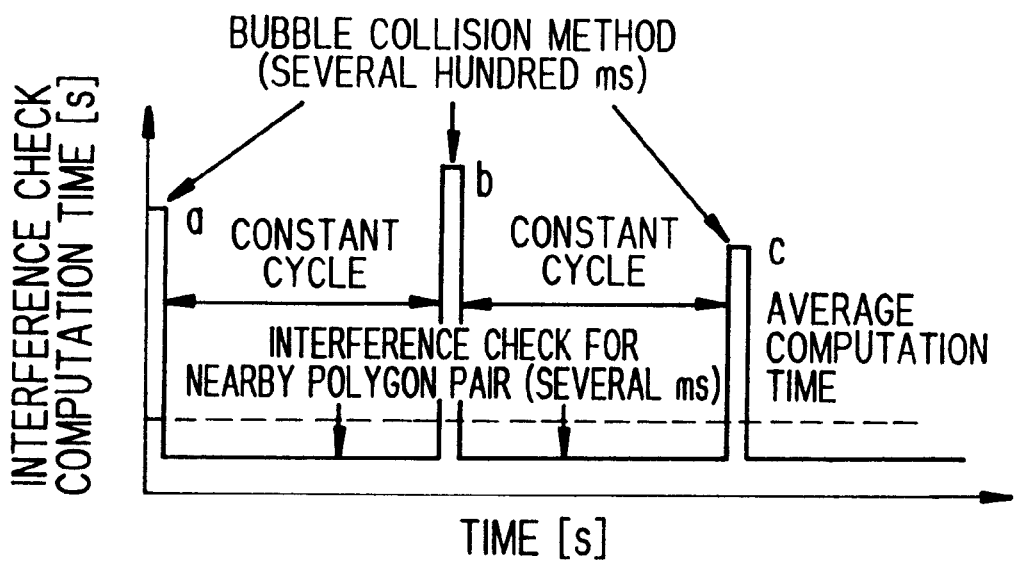

FIG. 60A shows the computation time required for an interference check only by a bubble collision method. The computation time is constantly several ten to several hundred ms. On the other hand, according to the present invention, although an interference check takes several ten to several hundred ms by a collision bubble method, a nearby polygon check takes only several ms, so that if an interference check is executed mostly by a nearby polygon check, the average computation time is as short as indicated by the broken line in FIG. 60B. For example, if it is assumed that the processing time by a bubble collision method is 100 ms, the processing time by the nearby polygon check is 1 ms and the nearby polygon pair updating process due to the bubble collision process is performed every 100 cycles, the average computation time is about 2 ms (=(100+99·1)/100). It goes without saying that the successive type bubble collision method is applicable to an arbitrary non-convex polyhedron.

The successive bubble collision method enables a real-time interference check for arbitrary non-convex polyhedrons at any time in correspondence with the moving speed of an object. For example, this method is applicable to the production of an environment in which a real-time interference check using an MMI such as a mouse at the time of interactive operation is possible and the results are displayed on a CG model for the user.

If the successive bubble collision method is applied to a CAD system for designing a mechanism, it is possible to assemble parts while executing a real-time interference check in CG, so that it can be judged whether or not assembly is possible. In addition, it is possible to check the movement of an assembled mechanism part, thereby it is possible to detect an error in designing that results in quick feedback to designing or reduction in the number of prototypes. This method is also applicable to various fields such as path generation for manipulators and mobile robots such as self-propelled vehicles, creation of animations for multimedia use and game software.

Figure 61:
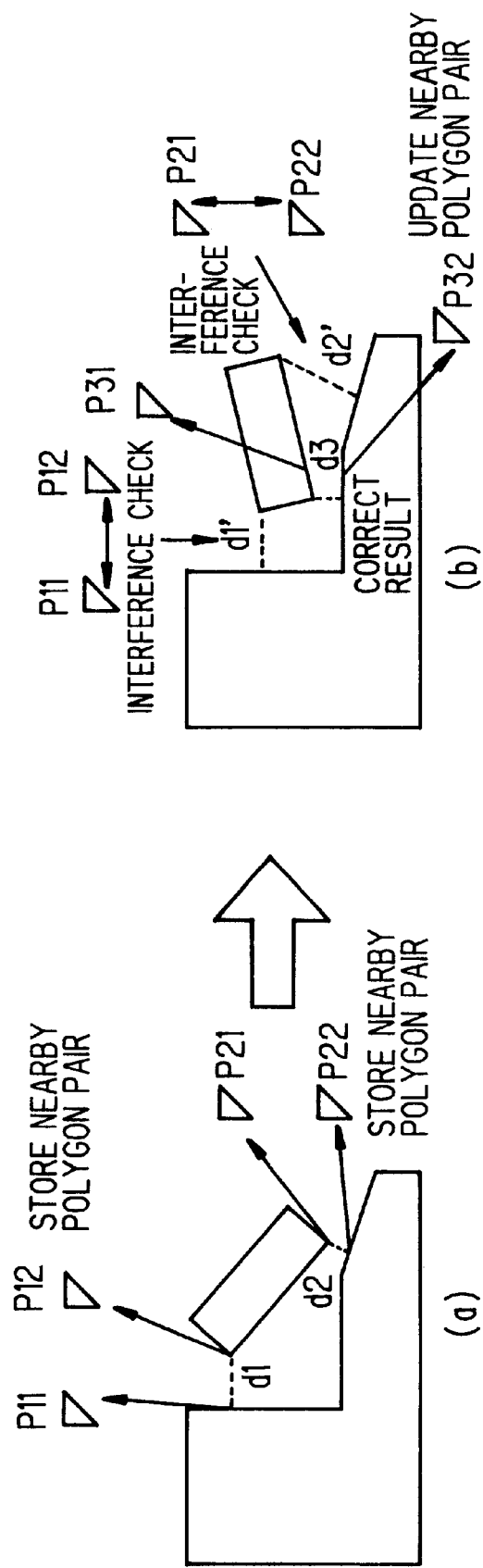
FIG. 61 is an explanatory view of a method of updating a nearby polygon pair.

(I) Method of automatically determining the cycle of nearby polygon pair updating process in successive type bubble collision method In the successive type bubble collision method, it is necessary to adjust the cycle of nearby polygon pair updating process (cycle of bubble collision process) in accordance with the shape of an object and the moving speed thereof. In the embodiment in (H), the constant value obtained by adjusting the cycle of nearby polygon updating process and manually input is used as the cycle of nearby polygon pair updating process, but if this cycle is inappropriate, the following problems are produced. For example, if the bubble collision process is performed every 200 cycles, the cycle is so long that updating a pair of nearby polygons is delayed. As a result, an interference check is executed for the wrong polygon pair P21, P22 as shown in FIG. 61 and the distance d2' between the points of closest approach thereof is output. On the other hand, if the bubble collision process is performed every 10 cycles, since a nearby polygon pair is updated in a short time, the distance d3 between the correct nearby polygon pair is calculated and output. However, the number of times of execution of a bubble collision process is increased, so that an interference check takes a long time. Adjustment of the cycle by the method of trial and error is therefore difficult.

Figure 62:
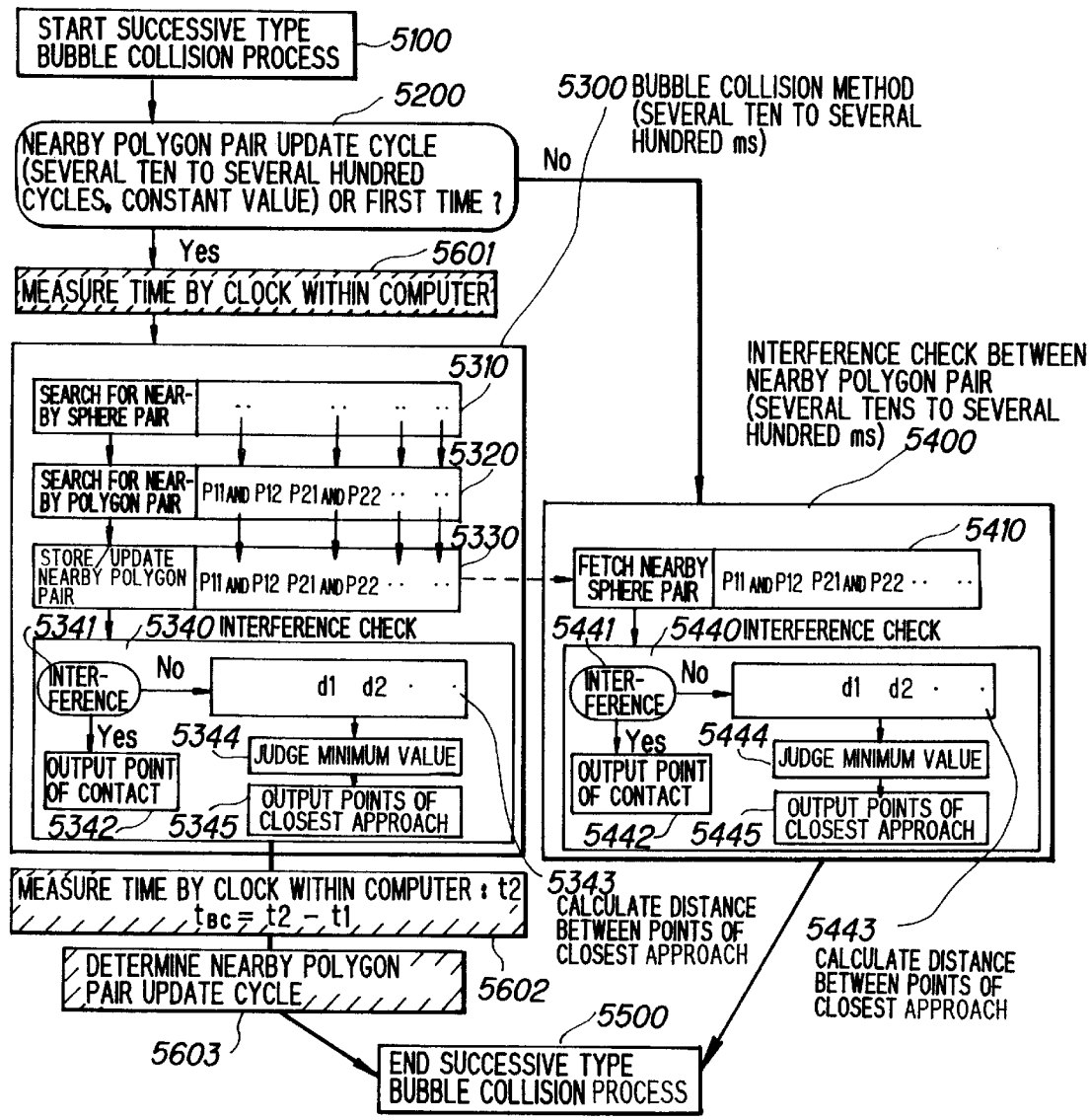
FIG. 62 is a flowchart of a method of automatically determining a nearby polygon pair update cycle in the successive type bubble collision method.

In the present invention, the computation time necessary for the execution of the bubble collision process is measured each time, and the cycle of nearby polygon pair updating process is automatically determined from the computation time not by the method of trial and error. Since this cycle is automatically determined in correspondence with a change in the computation time in a bubble collision method, the reduction of the computation time is well-balanced with the updating timing. FIG. 62 shows the flow of a method of automatically determining the cycle of nearby polygon pair updating process in the successive type bubble collision method. This is a flowchart the same as that shown in FIG. 58 except that steps 5601 to 5603 indicated by the hatched areas are added thereto. To obtain the computation time, the current time t1 is first measured by a clock provided within a computer before executing a bubble collision process (step 5601). Next, the bubble collision process is performed, thereafter, the current time t2 is similarly obtained, and the computation time in the bubble collision process is calculated from the following formula:

$$t_{BC}=t2-t1 \qquad \text{(step 5602).}$$

The cycle of nearby polygon pair updating process is then obtained, for example, from the following formula:

$$\text{Cycle of updating process}=t_{BC}\times\alpha \qquad \text{step 5602.}$$

However, it is necessary to adjust α. If it is assumed that an interference check by the bubble collision method takes 100 ms, an interference check by the successive type bubble collision method takes 1 ms, and α=1.5, the cycle of updating process is 150 which means the bubble collision process is performed every 150 cycle, and the average computation time is about 1.66 ms (=(100+149·1)/150).

Figure 63A:
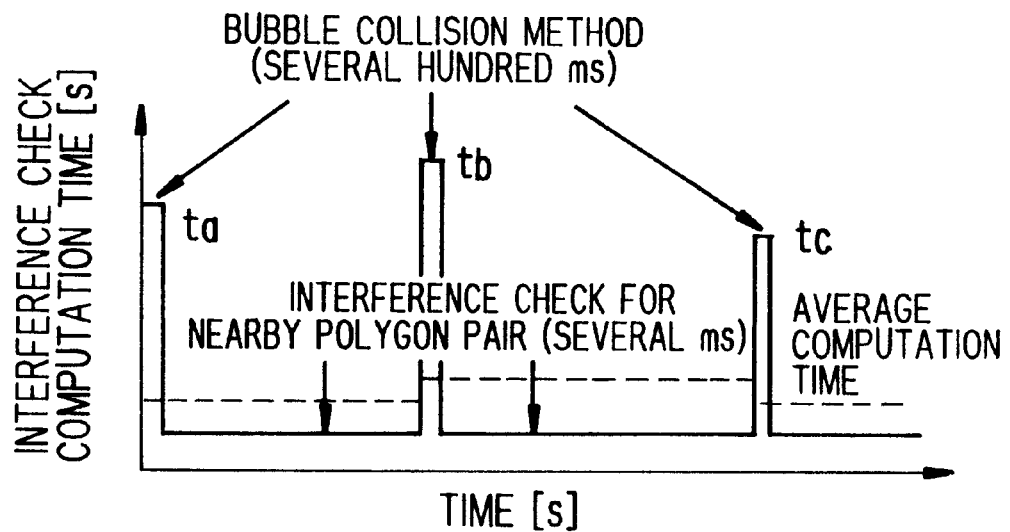
FIGS. 63A and 63B are explanatory views of the computation time in a successive type bubble collision method.

In FIG. 63A, since the second computation time $t_b$ is longer than the first computation time $t_a$, the cycle of updating process becomes long. Since the third computation time $t_c$ is short, the cycle of updating process is shortened. Although the average computation time slightly varies, as indicated by the broken lines, it is reduced as compared with the average computation time in a case where only a bubble collision method is adopted. In this manner, by lengthening the cycle of updating process as the computation time $t_{BC}$ becomes longer, it is possible to shorten the average computation time and, in addition, quick response is enabled. Although there is a possibility of false results being output, the nearby polygon pair is updated by the bubble collision method, so that the correct results are output.

In FIG. 63A, the cycle of updating process is lengthened as the computation time $t_{BC}$ becomes longer. However, if strictly correct output is necessary, the cycle is shortened as the computation time $t_{BC}$ becomes longer.

Figure 63B:
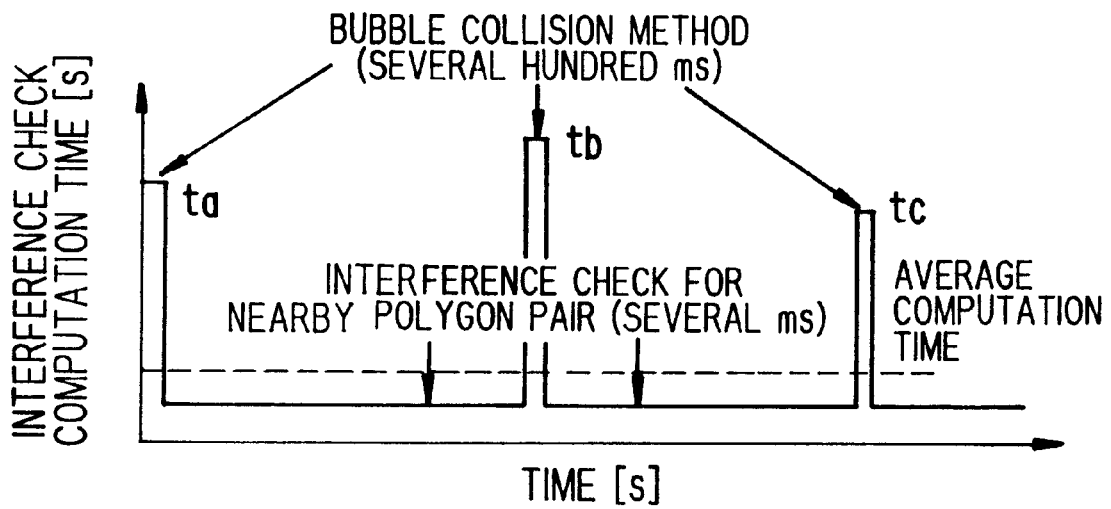

In FIG. 63B, since the second computation time $t_b$ is longer than the first computation time $t_a$, the cycle of updating process becomes short. Since the third computation time $t_c$ is short, the cycle of updating process is lengthened. Although the average computation time slightly varies, as indicated by the broken lines, it is greatly reduced as compared with the average computation time in a case where only a bubble collision method is adopted. When $t_{BC}$ is long, the cycle of polygon pair updating process is short and the average computation time becomes long. However, this method enables a strict and correct interference check for a nearby polygon pair so that the correct points of closest approach and the distance between the points of closest approach are output.

As described above, since the computation time necessary for the execution of the bubble collision process is measured each time, and the cycle of updating process is automatically determined in correspondence with a change in the computation time, it is possible to balance well the reduction of the computation time with the updating timing.

(J) First modification of successive type bubble collision method

Since it is assumed in the successive type bubble collision method that the distance of movement/change of attitude is small, if an object moves to a large extent, the distance between a false polygon pair is displayed (FIG. 61B). To prevent this, when the distance of movement/change of attitude is larger than a predetermined threshold value, an interference check by a bubble collision method is executed so as to update a nearby polygon pair even if the next nearby polygon pair updating cycle does not come. In this manner, it is possible to obtain the correct results of an interference check. For example, if

Figure 64:
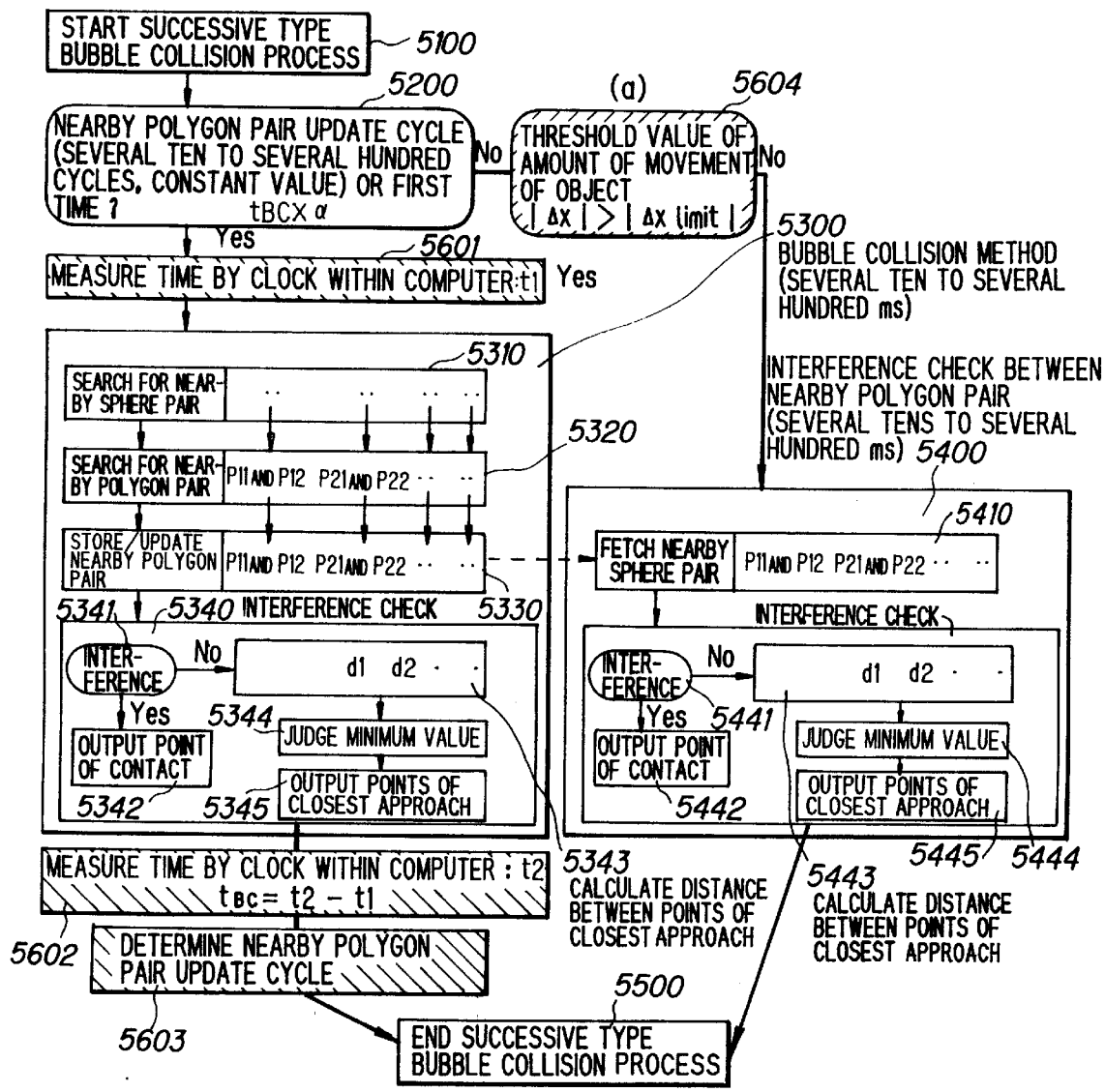
FIG. 64 is a flowchart of a modification of the successive type bubble collision method.

|Δx|>|Δxlimit|, an interference check by a bubble collision method is executed so as to update a nearby polygon pair. FIG. 64 is a flowchart of such processing. This flowchart same as that shown in FIG. 62 except that step 5604 indicated by the hatched area is added thereto. In the above formula, Δx represents the amount of movement of an object during one cycle, and Δxlimit a threshold value.

Figure 65A:
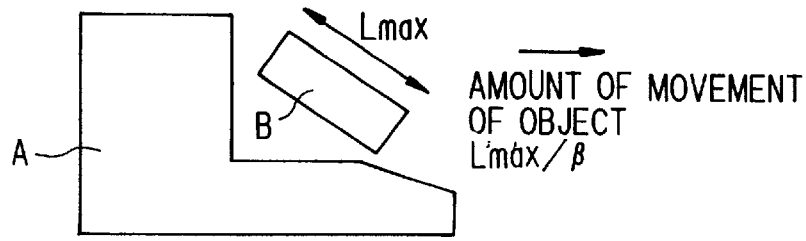
FIGS. 65A, 65B and 65C is an explanatory view of a method of determining a threshold value of an mount of movement of an object.
Figure 65B:
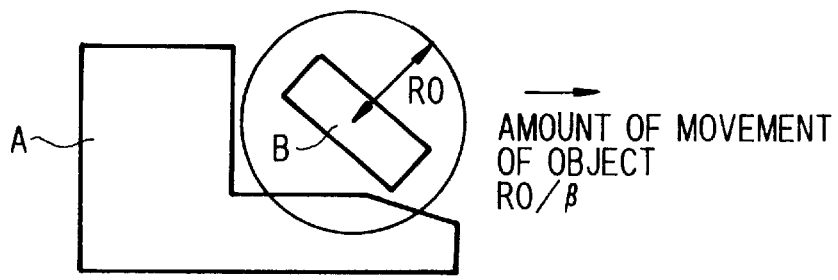
Figure 65C:
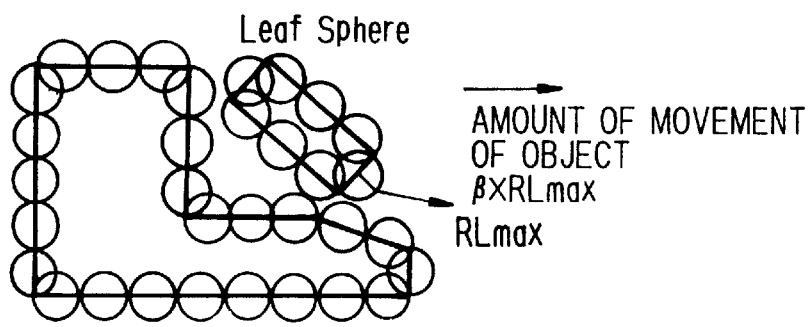

The threshold value Δxlimit is determined Lmax/β if the length of the longest side of a moving object B is assumed to be Lmax, or it is determined by RO/β if the radius of the biggest envelope sphere of the moving object B is assumed to be RO, or it is determined by RLmax·β if the largest radius of the leaf spheres of the moving object B is assumed to be RLmax (wherein β is about 2 to 4 and it is necessary to adjust β), as shown in FIGS. 65A to 65C.

The threshold value Δxlimit can also be determined by Lmax'/β if the length of the longest side of the smallest one among the objects of interference check is assumed to be Lmax', or it is determined by RO'/β if the radius of the biggest envelope sphere of the smallest one among the objects of interference check is assumed to be RO', or it is determined by RLmax'/β if the largest radius of the leaf spheres of the smallest one among the objects of interference check is assumed to be RLmax'.

(K) Second modification of successive type bubble collision method

Since it is assumed in the successive type bubble collision method that the distance of movement/change of attitude is small, if an object moves to a large extent, the distance between a false polygon pair is displayed (FIG. 61B). To prevent this, when the moving speed is larger than a predetermined threshold value, an interference check by a bubble collision method is executed so as to update a nearby polygon pair even if the next nearby polygon pair updating cycle does not come. In this manner, it is possible to obtain the correct results of an interference check. For example, if

Figure 66:
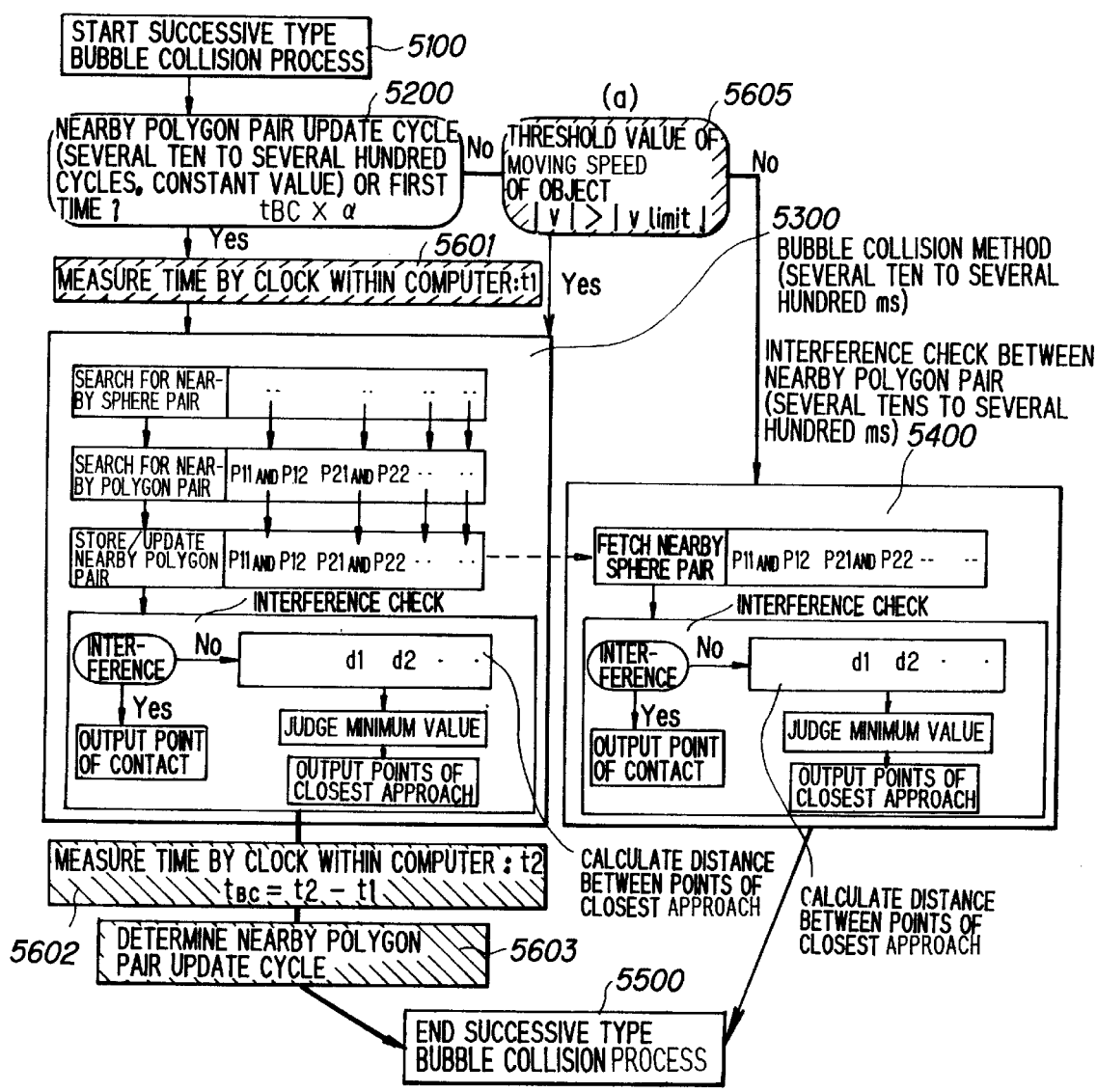
FIG. 66 is a flowchart of a modification of the successive type bubble collision method.

|v|>|vlimit|, an interference check by a bubble collision method is executed so as to update a nearby polygon pair. FIG. 66 is a flowchart of such processing. This flowchart is same as that shown in FIG. 62 except that step 5605 indicated by the hatched area is added thereto. In the above formula, v represents the moving speed of an object, and vlimit a threshold value.

The threshold value vlimit is determined by Lmax/β·dt if the length of the longest side of a moving object is assumed to be Lmax, or it is determined by RO/β·dt if the radius of the biggest envelope sphere of the moving object is assumed to be RO, or it is determined by RLmax/β·dt if the largest radius of the leaf spheres of the moving object is assumed to be RLmax (wherein dt is minute time interval, and β is about 2, 3 and 4 and it is necessary to adjust β), as shown in FIGS. 65A to 65C.

The threshold value vlimit can also be determined by Lmax'/β·dt if the length of the longest side of the smallest one among the objects of interference check is assumed to be Lmaxβ, or it is determined by RO'/β·dt if the radius of the biggest envelope sphere of the smallest one among the objects of interference check is assumed to be RO', or it is determined by RLmax'/β·dt if the largest radius of the leaf spheres of the smallest one among the objects of interference check is assumed to be RLmax'.

(L) Third modification of successive type bubble collision method

Since it is assumed in the successive type bubble collision method that the distance of movement/change of attitude is small, if an object moves to a large extent, the distance between a false polygon pair is displayed (FIG. 61B). To prevent this, when the ratio of the current distance between the points of closest approach and the preceding distance between the points of closest approach is larger than a predetermined threshold value, an interference check by a bubble collision method is executed so as to update a nearby polygon pair even if the next nearby polygon pair updating cycle does not come. In this manner, it is possible to obtain the correct results of an interference check. For example, if (ratio of the current distance between the points of closest approach and the preceding distance between the points of closest approach)>γ, wherein γ is about 3 to 5, an interference check by a bubble collision method is executed so as to update a nearby polygon pair. This is because that the current distance between the points of closest approach is 5 times as large as the preceding distance means that an object moves to a large extent.

The ratio of the current distance between the points of closest approach and the preceding distance between the points of closest approach is |d1'/d1| in the nearby polygon pair P11, P12, and |d2'/d2| in the nearby polygon pair P21, P22 in FIG. 67. If it is assumed that γ=3, since |d1'/d1|>3 and |d2'/d2|>3, a bubble collision process is executed so as to update a nearby polygon pair, check the interference between the updated nearby polygon pair and output the correct distance d3 between the points of closest approach.

Figure 68:
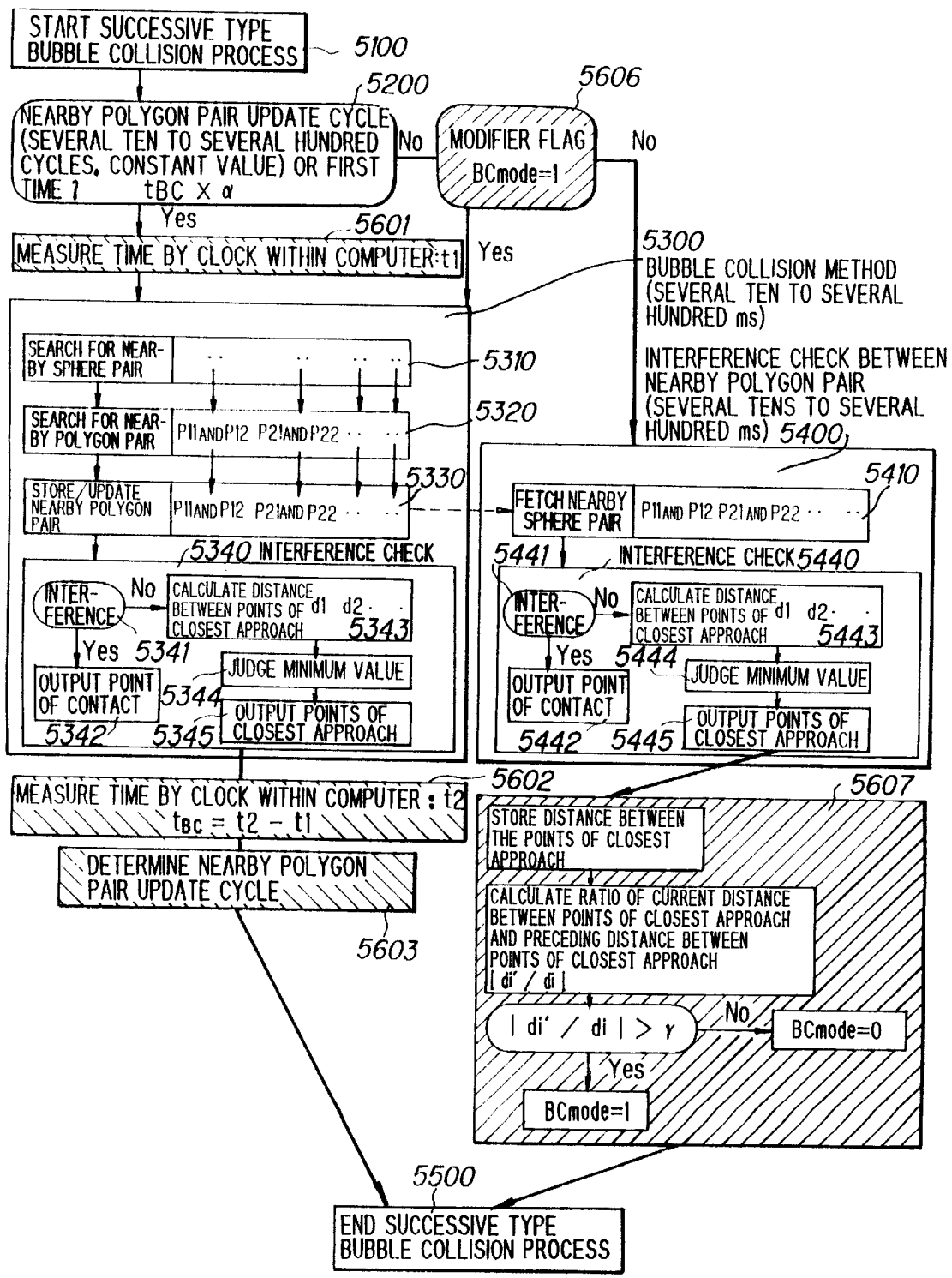
FIG. 68 is a flowchart of a modification of the successive type bubble collision method.

FIG. 68 is a flowchart of such processing. This flowchart is same as that shown in FIG. 62 except that steps 5606 and 5607 indicated by the hatched areas are added thereto. At the step 5606, a modifier flag BCmode is judged. If BCmode is 1, a bubble collision method is adopted so as to update a nearby polygon pair and check the interference therebetween. If BCmode is 0, the interference between a nearby polygon pair is checked. At the step 5607, the distance di' between the points of closest approach, and the nearby polygon pair at that time are first stored. The ratio |di'/di| of the current distance between the points of closest approach and the preceding distance between the points of closest approach is then calculated (di is the distance between the points of closest approach in the preceding cycle). If |di'/di|>γ (γ is about 3 to 5), the modifier flag BCmode is set at 1, and if |di'/di|<γ, the modifier flag BCmode is set at 0. If the modifier flag BCmode is 1, a bubble collision process is executed in the next cycle so as to update a nearby polygon pair.

In the first to third modification, only the successive bubble collision method shown in FIG. 62 is modified, but it is also possible to modify the successive bubble collision method shown in FIG. 58 similarly.

(M) Enhancement of efficiency in interference check when objects are stationary (a) Enhancement of efficiency of interference check outside of convex hulls when objects are stationary Conventionally, importance is made on the enhancement of speed in an interference check so as to enable a real-time interference check. Therefore an interference check is executed at each step so as to keep the real-timeness. However, after an interference check is executed once, if all the objects of check are stationary, the results are the same as the results in the preceding cycle, so that it is not necessary to update the results of the interference check. The speed command and the position deviation are monitored, and if the speed command and the position deviation are zero, the results of the interference check in the previous cycle are used as they are so as to omit the calculation in the interference check. This method produces a large effect when there exist more than two groups of objects of interference check. This is because in this case, calculation is necessary only in the interference check for the groups which contain a moving object, so that the efficiency is enhanced.

Figure 69:
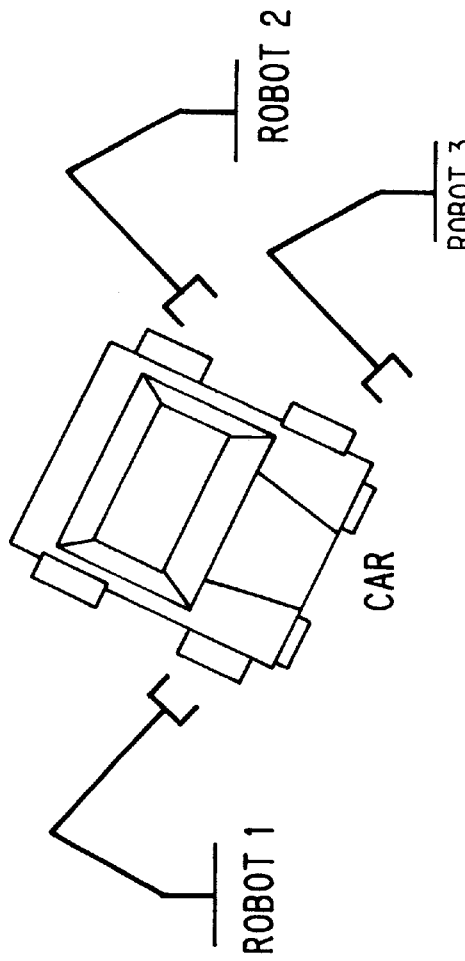
FIG. 69 is a flowchart of a method of checking the interference of robots in an automobile factory.

An interference check for robots in an automobile factory such as that shown in FIG. 69 will be taken as an example. It is assumed that a robot 1 and a robot 2 are in the process of a painting operation in a programmed operation path, and a robot 3 is executing a screw-tightening operation or the like in accordance with an interactive command value supplied from an MMI (man machine interface) such as a mouse. In this case, there are three groups of objects of interference check. A first group consists of the robot 1 and a car, a second group consisting of the robot 2 and the car, and a third group consists of the robot 3, robot 2 and the car. If it is assumed that the computation time required for an interference check for each group is 10 ms, the following enhancement of efficiency is possible.

1) When the robot 1 is stationary

The results of the interference check for the first group are maintained, and the total computation time is 20 ms.

2) When the robot 2 is stationary

The results of the interference check for the second group are maintained, and the total computation time is 20 ms.

3) When the robots 1 and 2 are stationary

The results of the interference check for the first and second groups are maintained, and the total computation time is 10 ms.

Enhancement of efficiency is also possible to the case in which the car is replaced by another equipment or product, and the number of robots are increased.

(b) Enhancement of the efficiency of interference check within convex hulls when the objects are stationary In (a), efficiency in an interference check is enhanced when objects are stationary outside of convex hulls. This method is also applicable to the situation in which an object is within a convex hull and is stationary. There is only a slight difference in (a) and (b).

After an interference check is executed once in the convex hulls by the successive bubble collision method, if all the objects of check are stationary, it is not necessary to update the results of the interference check in the preceding cycle. The speed command and the position deviation are monitored, and if the speed command and the position deviation are zero, the results of the interference check in the preceding cycle are used as they are so as to omit the calculation in the interference check. It is, however, necessary to execute the bubble collision process once to obtain the correct pair of nearby polygons in the nearby polygon update cycle after the objects become stationary. According to this method, when there exist more than two groups of objects of interference check, calculation is necessary only in the interference check for the groups which contain a moving object, so that the efficiency is enhanced.

Figure 70:
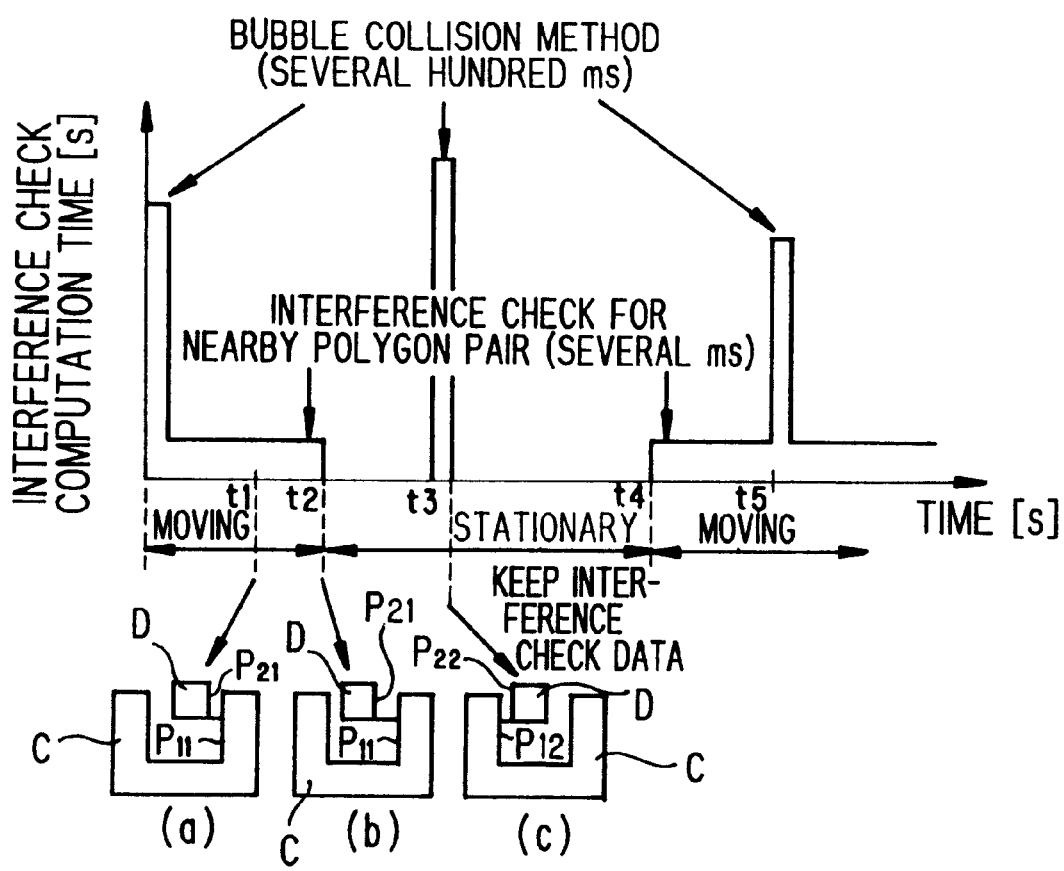
FIG. 70 is an explanatory view of the enhancement of the efficiency of an interference check when an object is stationary in a convex hull.

For example, a simple model consisting of a U-shaped object C and a cubic D shown in FIG. 70 will be explained as an example. At the time t1, when the object D is moving, a correct interference check is executed for the nearby polygon pair P11 and P21. However, thereafter the amount of movement is increased and if the object D stops at the time t2, the objects C and D assume the state shown in (b). In this state, an interference check is executed for the false nearby polygon pair P11 and P21, so that the false result is output. If the method of using the results of the interference check in the preceding cycle as they are as to omit the calculation at the time when the speed command and the position displacement are zero is adopted, the false polygon pair P11, P12 is maintained as it is until the time t5 when the object D begins to move again. To prevent this, after the object D stops at the time t2, a bubble collision method is only once adopted in the nearby polygon pair update cycle at the time t3 so as to obtain the correct nearby polygon pair P12, P22, and the interference between the polygons P12, P22 is checked. The results are stored and they are used as they are until the time t4, thereby omitting an unnecessary interference check.

If this method is applied to the interference check for robots in an automobile factory as shown in FIG. 69, the efficiency of interference check is also enhanced when objects are approaching closely and an object is contained in a convex hull.

(N) Industrial application fields

The present invention is applicable to the following fields.

(a) CAD system for designing mechanism

In designing a mechanism, inadvertent interference frequently occurs when manufactured pats are assembled. In order to prevent this, it is important to take great care in checking the margins of manufactured parts and the relationship of joints between parts. By applying a real-time interference checking method according to the present invention to a CAD system for designing a mechanism, it is possible to perform pre-check of manufactured parts in a form approximating the actual parts.

(b) Path planning in mobile robots

In a manipulator or a mobile robot such as a self-propelled vehicle, it is often the case that a path is planned so as to avoid collision between the manipulator or the mobile robot and another object before driving it. For example, at the step of assembling parts by using a manipulator, part models and a manipulator model are placed on a CAD system for designing a mechanism and the step of assembling each part by using the manipulator is planned. In this case, it is necessary to program a path while checking the interference between parts and between a part and the manipulator. In a self-propelled robot such as a cleaning robot, a guarding robot and a conveyance robot, it is necessary to program a path so as to avoid collisions between the robot and an obstacle such as wall, column and desk during movement between two points. The interference checking method of the present invention is applicable to such path planning so as to check interference before programming (c) Animation in multimedia In multimedia, various applications of computer graphics, real images, sound, etc., in a mixed form are expected. In the field of commercial and picture, the creation of highly realistic animation using computer graphics is desired. In conventional computer graphics, an animation is generally created off-line, and interference is checked individually. The mainstream of the future animations is a real-time/interactive animation created by using high-speed computer graphics. In this case, the key is how fast the interference problem between CG models is solved. For example, in the case of moving an android model (CG model in the shape of a human being), the problem of contact between the android model and the ground must be solved. In the case of simulating a vehicular collision, the problem of interference between vehicles must be solved. The high-speed interference checking method of the present invention is an essential technique to the creation of a real-time/interactive animation.

(d) Game software

Although conventional game software is generally two-dimensional, it is predicted that three-dimensional displays using computer graphics will become prevalent in the future. In game software, there are many problems involving the interference between objects, such as the problem of collision between missiles and fights in shooting game, and collision between cars in racing games. The interference checking method of the present invention thus provides powerful means for solving these problems.

As described above, according to the present invention, it is possible to check the interference between non-convex polyhedrons at a high speed.

In addition, according to the present invention, it is possible to produce convex hulls, a nearby-point linear list and hierarchical spheres at a high speed with good efficiency as preprocessing to an interference check.

According to the present invention, it is possible to check the interference between non-convex polyhedrons at a high speed when the non-convex polyhedrons are closely approaching.

Furthermore, according to the present invention, it is possible to effectively check the interference between objects when they are stationary.

As many apparently widely different embodiments of the present invention can be made without departing from the spirit and scope thereof, it is to be understood that the invention is not limited to the specific embodiment thereof except as defined in the appended claims.

What is claimed is:

1. An interference checking method implemented using a computer system for checking the interference between a non-convex polyhedron and another object, comprising:

dividing the vertexes constituting said non-convex polyhedron into a plurality of vertex groups in each of which the difference between the coordinate values of a first axis (X-axis) of two arbitrary vertexes is zero or not more than a very small number $\epsilon$;

producing a two-dimensional convex hull using a computer program stored in a memory for each of said groups of vertexes on the plane of second and third axes (YZ plane);

producing three dimensional convex hulls using a second computer program stored in said memory by merging each pair of adjacent two-dimensional convex hulls, and thereafter sequentially merging adjacent three-dimensional convex hulls, thereby producing an intended convex hull of said non-convex polyhedron;

checking the interference between said intended convex hull and said other object;

disassembling said convex hull when said convex hull and said another object begin to interfere with each other; and checking the interference between said non-convex polyhedron and said other object.

2. An interference checking method according to claim 1, wherein said step of merging adjacent three-dimensional convex hulls includes the steps of:

obtaining an upper bridge which is situated on the topmost of the edges which connect the vertexes of said adjacent three-dimensional convex hulls;

obtaining a triangular polygon which incorporates said upper bridge as one side and which is situated at the topmost position;

wrapping the space between adjacent three-dimensional convex hulls with said triangular polygon;

obtaining a triangular polygon which is situated at the topmost position with the exception of the already obtained triangular polygons and is adjacent to one of them;

wrapping the space between adjacent three dimensional convex hulls with said triangular polygon: and repeating said obtaining process and said wrapping process so as to merge three-dimensional convex hulls.

3. An interference checking method according to claim 1, wherein said step of producing a two-dimensional convex hull for each of groups of vertexes in which the difference in the coordinate value of said first axis is zero or not more than a very small value $\epsilon$ includes the steps of;

dividing said vertexes into a plurality of vertex groups in each of which the difference between the coordinate values of a second axis (Y-axis) of two arbitrary vertexes is zero or not more than a very small value;

producing a one-dimensional convex hull by linking the vertexes in a descending order of coordinate value of a third axis (Z-axis) in each of said groups of vertexes;

merging adjacent one-dimensional convex hulls so as to produce a two-dimensional convex hull; and sequentially merging adjacent two-dimensional convex hulls so as to produce an intended two-dimensional convex hull.

4. An interference checking method according to claim 3, wherein said step of merging adjacent two-dimensional convex hulls includes the steps of:

obtaining an upper bridge and a lower bridge which are situated on the topmost and the lowermost, respectively, among from the edges which connect the vertexes of said adjacent two-dimensional convex hulls; and producing a new two-dimensional convex hull by linking the adjacent two-dimensional convex hulls by each of said upper bridge and said lower bridge.

5. An interference checking method according to claim 1, further comprising the step of:

producing and outputting a nearby-point linear list having a data structure obtained by arranging the vertexes of all triangular polygons which constitute said convex hull so as to link said vertexes in a first direction ("next" direction) and arranging vertexes each of which is connected to a vertex of interest via a polygon edge, so as to link said vertexes to the vertex of interest in a second direction ("branch" direction), wherein said step of checking interference between said convex hull and said another object is performed using said nearby-point linear list.

6. An interference checking method according to claim 5, further comprising the step of:

storing said nearby-point linear list in an external storage medium as a file;

and reading said nearby-point linear list when said nearby-point linear list is necessary so as to develop said nearby-point linear list in a memory of a system.

7. An interference checking method implemented using a computer system, for checking the interference between two objects in the shape of non-convex polyhedrons, comprising:

covering each of polygons which constitute each of said non-convex polyhedrons with a plurality of leaf spheres which have a predetermined radius and which are arranged on each polygon, and sequentially enveloping said leaf spheres with hierarchical spheres so as to produce a binary tree of hierarchical envelope spheres;

obtaining a pair of nearby spheres between said two objects by checking interference between envelope spheres if an upper grade on the basis of the structure of said binary tree, disassembling the interfering envelope spheres into envelope spheres of a lower grade, checking the interference between the envelope spheres of said lower grade, and repeating the interference check process and the disassembly process until no interference is detected;

obtaining a nearby polygon pair which corresponds to said pair of nearby spheres; and checking the interference between said nearby polygon pair;

wherein said radius of said leaf spheres is determined on the basis of the radius of spheres which envelope the corresponding non-convex polyhedron and the number of polygons constituting said non-convex polyhedron in which the smaller the number of polygons constituting said non-convex polyhedron is, the smaller said radius of said leaf spheres is.

8. An interference checking method implemented using a computer system for checking the interference between two objects in the shape of non-convex polyhedrons, comprising:

covering each of polygons which constitute each of said non-convex polyhedrons with a plurality of leaf spheres which have a predetermined radius and which are arranged on each polygon, and sequentially enveloping said leaf spheres with hierarchical spheres so as to produce a binary tree of hierarchical spheres;

obtaining a pair of nearby spheres between said two objects by checking the interference between envelope spheres of an upper grade, disassembling the interfering envelope spheres into envelope spheres of a lower grade, checking interference between the envelope spheres of said lower grade, and repeating the interference check process and the disassembly process until no interference is detected;

obtaining a nearby polygon pair which corresponds to said pair of nearby spheres; and checking the interference between said nearby polygon pair;

wherein the distance between leaf spheres is the distance between centers of said leaf spheres, the distance between a leaf sphere and a non-leaf sphere is the distance obtained subtracting the radius of said non-leaf sphere from the distance between the centers of the two spheres, and the distance between non-leaf spheres is the distance obtained by subtracting the radii of the two non-leaf spheres from the distance between the centers of said two non-leaf spheres.

9. An interference checking method implemented using a computer system for checking the interference between two objects in the shape of non-convex polyhedrons, comprising:

producing a convex hull for each of said non-convex polyhedrons, and checking the interference of said convex hull of one object with said convex hull of the other object;

covering each of polygons which constitute each of said non-convex polyhedrons with a plurality of leaf spheres which have a predetermined radius and which are arranged on each polygon when the distance between said convex hulls becomes not more than a preset value, and sequentially enveloping said leaf spheres with hierarchical spheres so as to produce a binary tree of hierarchical envelope spheres;

obtaining a pair of nearby spheres between said two objects by checking the interference between envelope spheres of an upper grade on the basis of the structure of said binary tree, disassembling the interfering envelope spheres into envelope spheres of a lower grade, checking the interference between the envelope spheres of said lower grade, and repeating the interference check process and the disassembly process until no interference is detected;

obtaining a nearby polygon pair which corresponds to said pair of nearby spheres; and checking the interference between said nearby polygon pair.

10. An interference checking method according to claim 9, wherein when said distance between said convex hulls in a rectangular coordinate system becomes not more than a predetermined value, a virtual fourth axis is imagined, and a distance between said two convex hulls in the direction of said fourth axis is set at a constant value $\epsilon$.

11. An interference checking method implemented using a computer system for checking the interference between two objects each of which is composed of a set of non-convex polyhedrons, said method comprising:

producing, with regard to each object, a metatree of hierarchical envelope spheres by covering each non-convex polyhedron with spheres and then hierarchically enveloping said spheres with envelope spheres;

obtaining a pair of nearby spheres between said objects by checking the interference between envelope spheres of an upper grade on the basis of the structure of said metatree, disassembling the interference envelope spheres into envelope spheres of a lower grade, checking the interference between the envelope spheres of said lower grade, and repeating the interference check process and the disassembly process until no interference is detected;

obtaining a pair of nearby non-convex polyhedrons which correspond to said pair of nearby spheres and producing a convex hull for each non-convex polyhedron of said pair;

checking the interference between said convex hulls;

disassembling each of said convex hulls when said convex hulls begin to interfere with each other; and checking the interference between said non-convex polyhedrons.

12. An interference checking method according to claim 11, wherein said step of checking the interference between said non-convex polyhedrons includes the steps of:

covering each of polygons which constitute each of said non-convex polyhedrons with a plurality of leaf spheres which have a predetermined radius and which are arranged on each polygon, and sequentially enveloping said leaf spheres with hierarchical spheres so as to produce a binary tree of hierarchical envelope spheres;

obtaining a pair of nearby spheres between said non-convex polyhedrons by checking interference between envelope spheres of an upper grade on the basis of the structure of said binary tree, disassembling the interfering envelope spheres into envelope spheres of a lower grade, checking the interference between the envelope spheres of the said lower grade, and repeating the interference check process and the disassembly process until no interference is detected;

obtaining a nearby polygon pair which corresponds to said pair of nearby spheres; and checking the interference between said nearby polygon pair.

13. An interference checking method according to claim 12, further comprising the steps of:

repeating said interference check for said nearby polygon pair;

updating said pair of nearby non-convex polyhedrons and said nearby polygon pair at intervals of predetermined cycles; and repeating said interference check for a new nearby polygon pair.

14. An interference checking method implemented using a computer for checking the interference between two objects in the shape of a polyhedron, comprising:

covering each of polygons which constitute each of said polyhedrons with a plurality of spheres which have a predetermined radius and which are arranged on each polygon, and sequentially enveloping said spheres with hierarchical spheres so as to produce a binary tree of hierarchical envelope spheres as preprocessing;

performing a bubble collision algorithm which includes a first step of obtaining a pair of nearby spheres by checking the interference between envelope spheres of an upper grade on the basis of the structure of said binary tree, disassembling the interfering envelope spheres into envelope spheres of a lower grade, checking the interference between the envelope sphere of said lower grade, and repeating the interference check process and the disassembly process until no interference is detected, a second step of obtaining and storing the pair of polygons which correspond to said pair of nearby spheres as a nearby polygon pair, and a third step of executing an interference check for said nearby polygon pair;

repeating said interference check for said nearby polygon pair for a predetermined number of times;

updating said nearby polygon pair in accordance with said bubble collision algorithm every time the predetermined number of interference checks for said nearby polygon pair are finished; and repeating said interference check for a new nearby polygon pair.

15. An interference checking method according to claim 14, further comprising the steps of:

producing a convex hull for each of said non-convex polyhedrons; and checking the interference between said convex hulls;

wherein when said convex hulls begin to interfere with each other, the interference check is executed in accordance with said bubble collision algorithm.

16. An interference checking method according to claim 14, further comprising the steps of:

measuring the computation time in said bubble collision algorithm; and changing the cycle of nearby polygon pair updating process on the basis of said computation time.

17. An interference checking method according to claim 14, further comprising the steps of:

monitoring the amount of movement of a moving object: and updating said nearby polygon pair in accordance with said bubble collision algorithm even in the middle of the cycle of nearby polygon pair updating process when said amount of movement is larger than a preset value.

18. An interference checking method according to claim 14, further comprising the steps of:

monitoring the moving speed of a moving object: and updating said nearby polygon pair in accordance with said bubble collision algorithm even in the middle of the cycle of nearby polygon pair updating process when said moving speed is larger than a preset speed.

19. An interference checking method according to claim 14, further comprising the steps of:

measuring the distance between said polygon pair: and updating said nearby polygon pair in accordance with said bubble collision algorithm even in the middle of the cycle of nearby polygon pair updating process when the ratio of the current distance and the preceding distance is larger than a preset value.

20. An interference checking method according to claim 15, further comprising the step of:

holding the results of the preceding interference check for said convex hulls or said nearby polygon pair when said two objects of interference check are stationary; and outputting said results as those of the current interference check.

* * * * *